Dec. 28, 1954 A. B. MILLER 2,698,425

REMOTE-CONTROL SYSTEM

Filed Sept. 29, 1953 10 Sheets-Sheet 1

Dec. 28, 1954 A. B. MILLER 2,698,425

REMOTE-CONTROL SYSTEM

Filed Sept. 29, 1953 10 Sheets-Sheet 2

Dec. 28, 1954 A. B. MILLER 2,698,425

REMOTE-CONTROL SYSTEM

Filed Sept. 29, 1953 10 Sheets-Sheet 3

Dec. 28, 1954 A. B. MILLER 2,698,425

REMOTE-CONTROL SYSTEM

Filed Sept. 29, 1953 10 Sheets-Sheet 5

Dec. 28, 1954 A. B. MILLER 2,698,425

REMOTE-CONTROL SYSTEM

Filed Sept. 29, 1953 10 Sheets-Sheet 6

Dec. 28, 1954 A. B. MILLER 2,698,425

REMOTE-CONTROL SYSTEM

Filed Sept. 29, 1953 10 Sheets-Sheet 8

Dec. 28, 1954 A. B. MILLER 2,698,425

REMOTE-CONTROL SYSTEM

Filed Sept. 29, 1953 10 Sheets-Sheet 9

INVENTOR.
Alfred B. Miller
BY W. L. Stout
HIS ATTORNEY

United States Patent Office 2,698,425

Patented Dec. 28, 1954

2,698,425

REMOTE-CONTROL SYSTEM

Alfred B. Miller, Edgewood, Pa., assignor to Westinghouse Air Brake Company, Wilmerding, Pa., a corporation of Pennsylvania Application September 29, 1953, Serial No. 382,885

15 Claims. (Cl. 340—163)

Figure 1A:
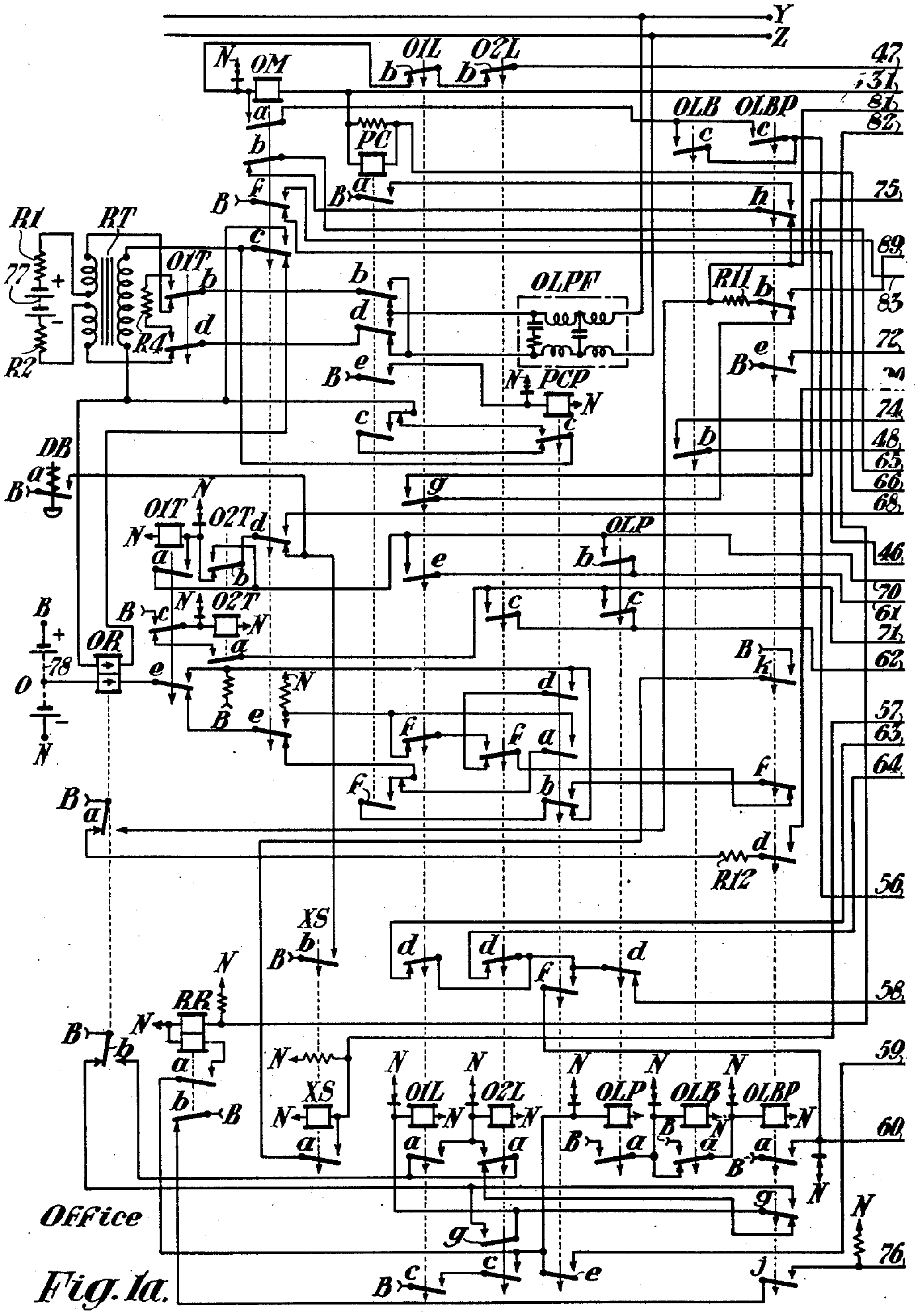

My invention relates to a remote control system, and more particularly to a centralized traffic control system for railroads. The system of my invention comprises an office and a plurality of stations connected by line wires over which impulse code signals are transmitted to effect the operation of devices, mostly for governing traffic, located along the trackway, and to indicate at the office the position or condition of such devices.

My invention is an improvement on the system shown in Letters Patent of the United States, No. 2,411,375, and No. 2,442,603, issued November 19, 1946, and June 1, 1948, respectively, to A. P. Jackel, each for a Remote Control System. The system of my invention is thus of the time code type employing codes of long and short elements which are transmitted one at a time over a single line circuit.

The components of the system of my invention are preferably assembled in the form of coding, storage, and extension units, each containing a group of relays. The system employs a station coding unit at each field location for transmitting indication codes and for selectively receiving control codes, together with extension units as required, for associating the devices at that location with the station coding unit. The office equipment preferably includes an individual control panel for each unit group of controlled traffic governing devices and an office coding unit which is connected over the line circuit with the station coding unit to establish communication selectively between each panel and the corresponding station unit.

In most systems of this type in present use including the systems described in the previously mentioned Patents 2,411,375 and 2,442,603, the length of all control and indication codes is a fixed number of steps such as the number 16. Normally, the first half of each code is required to provide a distinct code call for each station. This station selection is necessary so that the control code may be selectively received by the proper field station and the indication codes recorded on the correct panel in the office. Since the last code step is required for resetting the system, only seven steps of the usual 16 steps are thus available for carrying control or indication functions. If the number of devices to be controlled or indicated at a field location exceeds 7 it is then necessary to use an entire additional code, assigning a separate station code call, for each additional group of 7 functions. Also, additional storage and selective equipment is required at the field location.

In the past, 7 code steps have usually been sufficient for the control or indication functions desired at most field locations in a centralized traffic control system (hereinafter designated by the symbol C. T. C.). However, due to the increasing complexity of railway signal systems, the need for extra code steps at field locations is becoming more frequent, especially to provide additional indications to increase the operating efficiency of the system. Since the number of station assignment code calls available with one office coding unit is mathematically limited, being 35 in a 16 step coding system, the use of additional station assignment codes at many field locations may require the use of more than one line section in C. T. C. installations where one line section would otherwise suffice. This requires additional office coding equipment and either more line wire or high frequency carrier equipment, all of which add to the cost of the installation.

It would be a decided advantage to be able to provide, at a station, additional code steps as desired without the necessity of using another station assignment code and with a minimum of additional equipment. In other words, the flexibility to make the regular code at a station of any desired length would increase the efficiency and the usefulness of the system and decrease the initial cost. Also desirable is the ability to make the control and indication codes at any station of different lengths, each code including only the minimum number of steps required to perform the functions desired with neither code restricted to an exact multiple of some basic number, such as eight. That is, the codes would not be limited in length to only 16, 24, 32 or 40 steps. This increases the number of codes which can be transmitted per unit of time, a definite advantage in a busy installation.

However, at the same time, in order to maintain the flexibility of the present systems, the ability to vary the length of the code as desired must be provided with items of equipment which will be standard at all stations, that is, coding units and code extension equipment must be of an identical design for all stations so that interchangeability is maintained.

If a system of this type is to be provided with variable length codes according to the requirements of the various field stations, with the possibility that even the control and indication codes for any one station may be of different lengths, then some means of synchronizing the stopping of the coding action must also be provided. That is, the coding action at the office must halt on the proper code step for each station regardless of the particular length of the code. This is particularly true during indication codes, when the simultaneous halting of the coding action at both office and field location is necessary for proper resetting of the system to its normal condition and to prevent possible loss or false registry of succeeding codes. Such a means of synchronizing must be capable of effecting such action on a selective basis according to the station for which the code is intended.

An object of my invention, therefore, is to provide, in a system of this type, a method of extending the code to any desired length at any station to provide additional controls or indications without using additional station assignment codes.

A feature of my invention in accomplishing this object is the addition of relays to the counting chains of the coding unit to extend the coding action, thus providing extra code steps in the coding action.

Another object of my invention is to provide an adjustable means of terminating a code on any even numbered step after the station selection has been accomplished, whereby the control and indication codes at a station may be of different lengths, and of a different length than similar codes at other stations, each code including only sufficient steps to convey the desired functions.

A feature of my invention to accomplish this object is the provision of means at the office and each station to energize the last relay of the counting chain as soon as all functions have been transmitted, thus terminating the code.

Still another object of my invention is to maintain identical items of equipment at the various stations while providing the previously mentioned features.

A further object of my invention is to provide a suitable means of synchronizing the resetting of office and field coding units at the end of indication codes so that both the office unit and the station unit terminate the coding action on the same code step regardless of the length of the indication code from any station.

Another object of my invention is to provide for the delivery of all indications at the office without increasing the number of intermediate registry relays in the office unit over the number used in present systems.

A feature of my invention in accomplishing the above objects is that the coding units at all field stations are identical, all code extension units are identical, and all office units, in applications requiring more than one line section, are also identical with each other.

Other objects and features of my invention will be apparent from the following description.

One form of apparatus embodying my invention will now be described and the novel features will then be pointed out in claims.

Certain features of the system shown in the drawings and hereinafter disclosed in describing the operation of the apparatus are not my invention and are not claimed in the appended claims. These certain features are disclosed and claimed in the copending application for Letters Patent of the United States, Serial No. 382,884, filed on the same date as the current application, by Thomas W. Hays, for a Remote Control System.

Figure 1B:
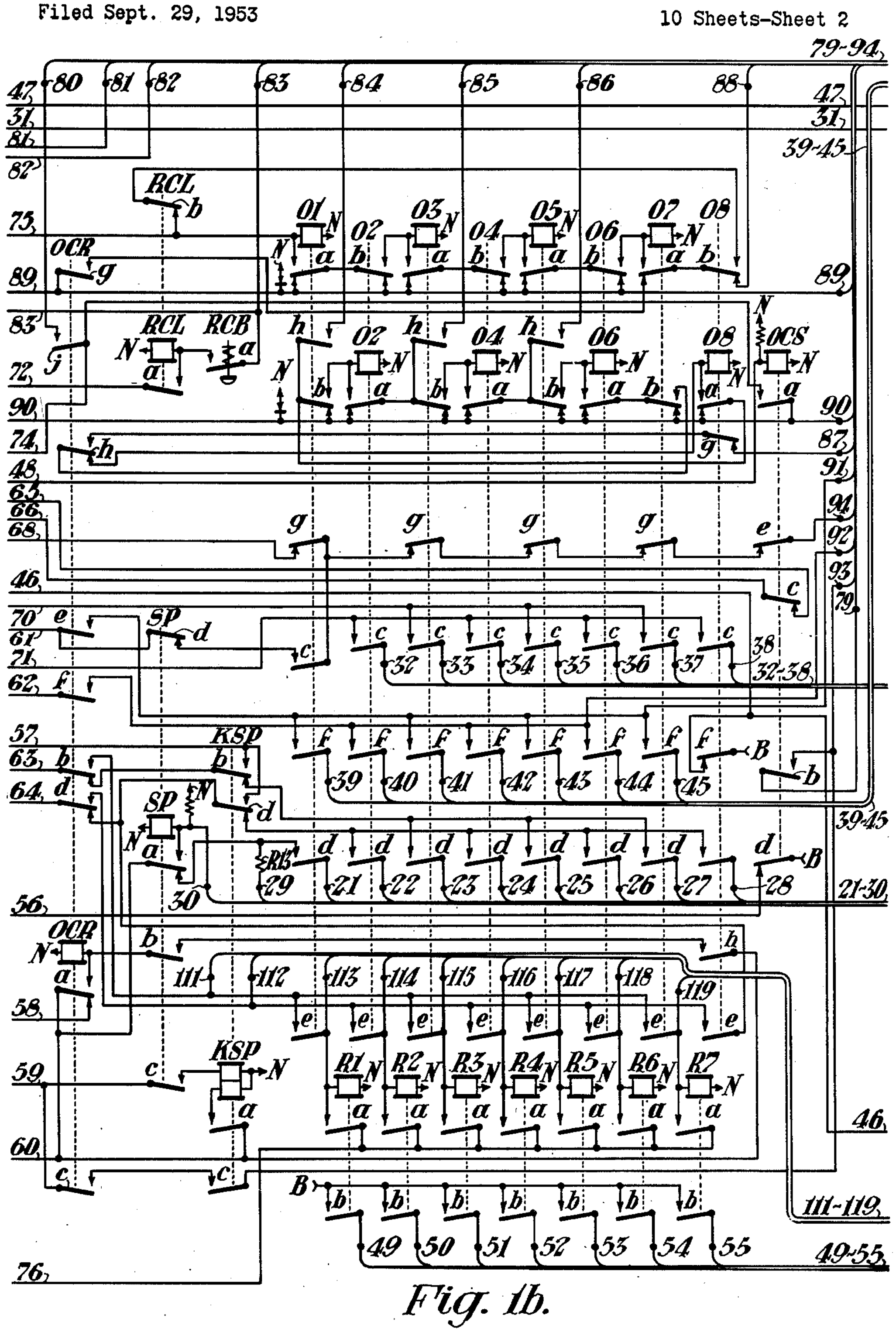
Figure 1C:
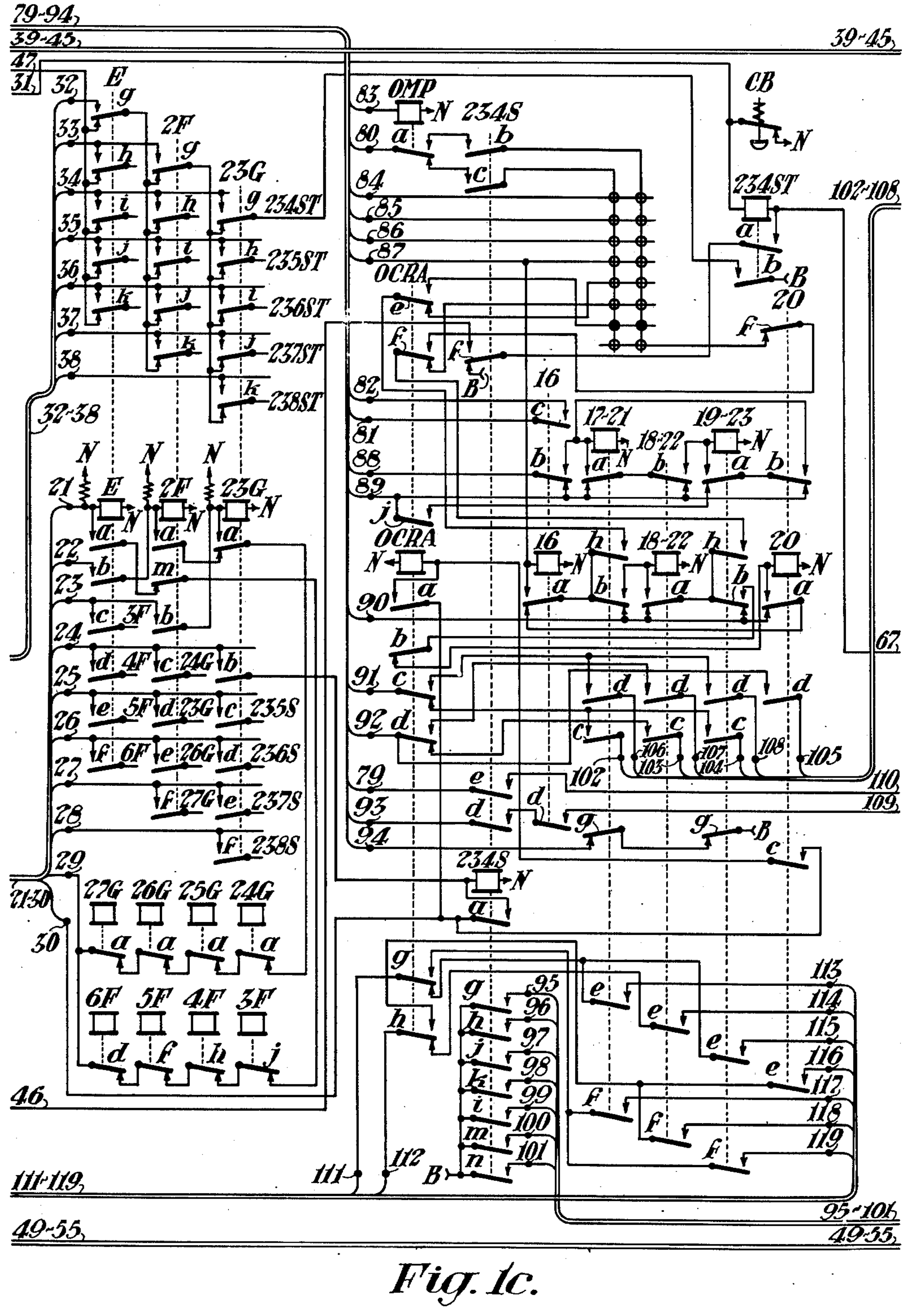
Figure 1D:
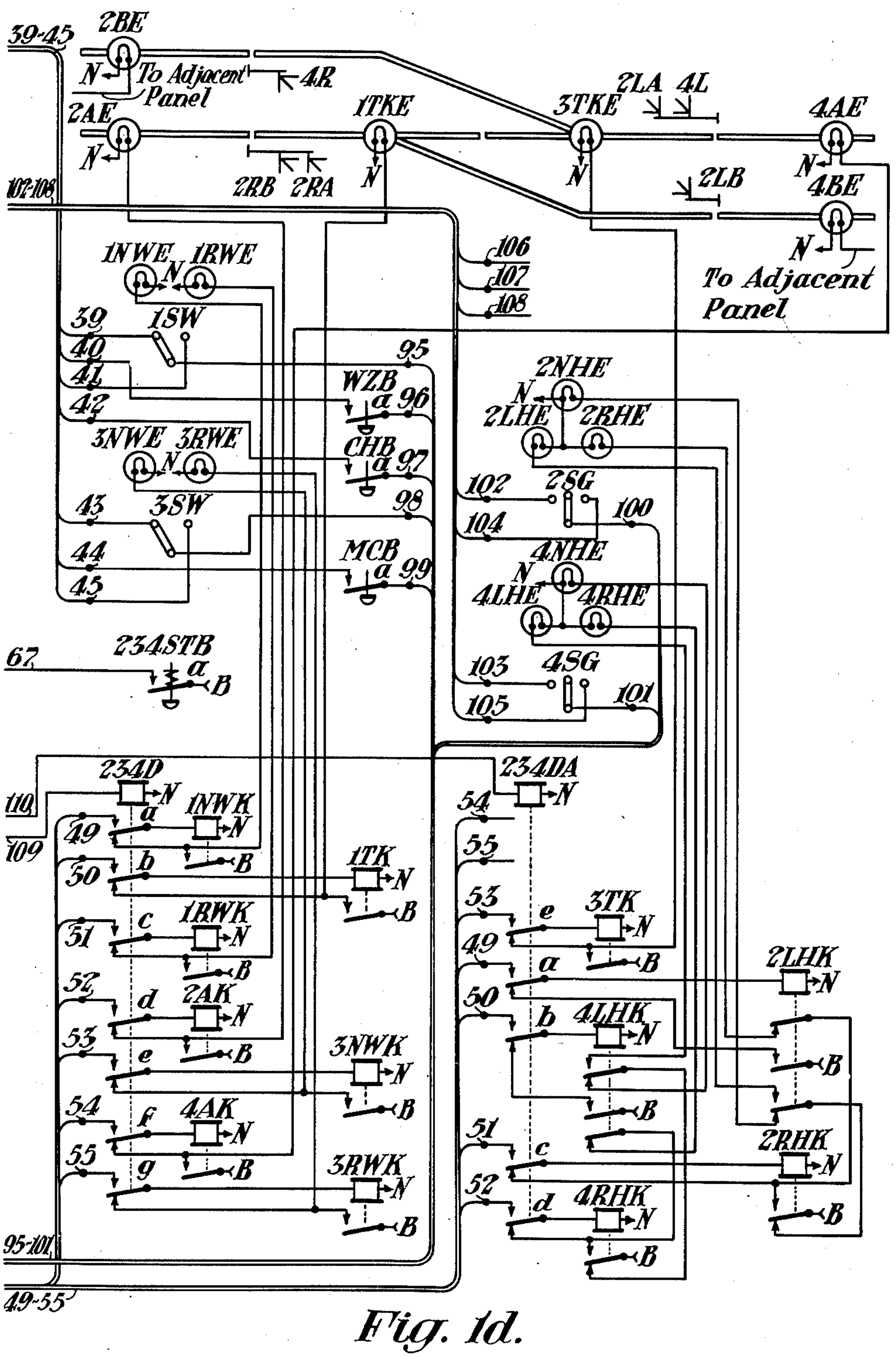

Referring now to the accompanying drawings, Figs. 1*a*, 1*b*, 1*c* and 1*d*, taken together in the order named with Fig. 1*a* on the left, illustrate in condensed form the office equipment employed in one form of centralized traffic control embodying my invention. The apparatus shown in Figs. 1*a* and 1*b* comprises generally the office coding unit, and is contained within a case known as the office line coding unit, hereafter designated OLC for brevity. However, the impulse transformer RT, the batteries, the low pass filter OLPF, and the disconnect button DB, shown in Fig. 1*a*, are preferably mounted outside the OLC unit. The apparatus shown at the left in Fig. 1*c* comprises a portion of the pyramid circuit for the office. At the right of Fig. 1*c*, there is illustrated the circuits and equipment for extending the length of any code, including the adjustable connections to allow the control and indication codes to be of different lengths for any one field station. Fig. 1*d* shows two individual panels of a C. T. C. machine containing the levers, push buttons, track diagram, and lamps for controlling and indicating a typical unit group of traffic governing devices at a field location. The selecting relays for associating these two panels with the office coding unit are shown in the lower right of Fig. 1*c* and in the lower part of Fig. 1*d*. It is to be understood that each panel or group of panels in the C. T. C. machine is similarly connected to the OLC unit but by means of a different arrangement of selecting relays.

Figure 2A:
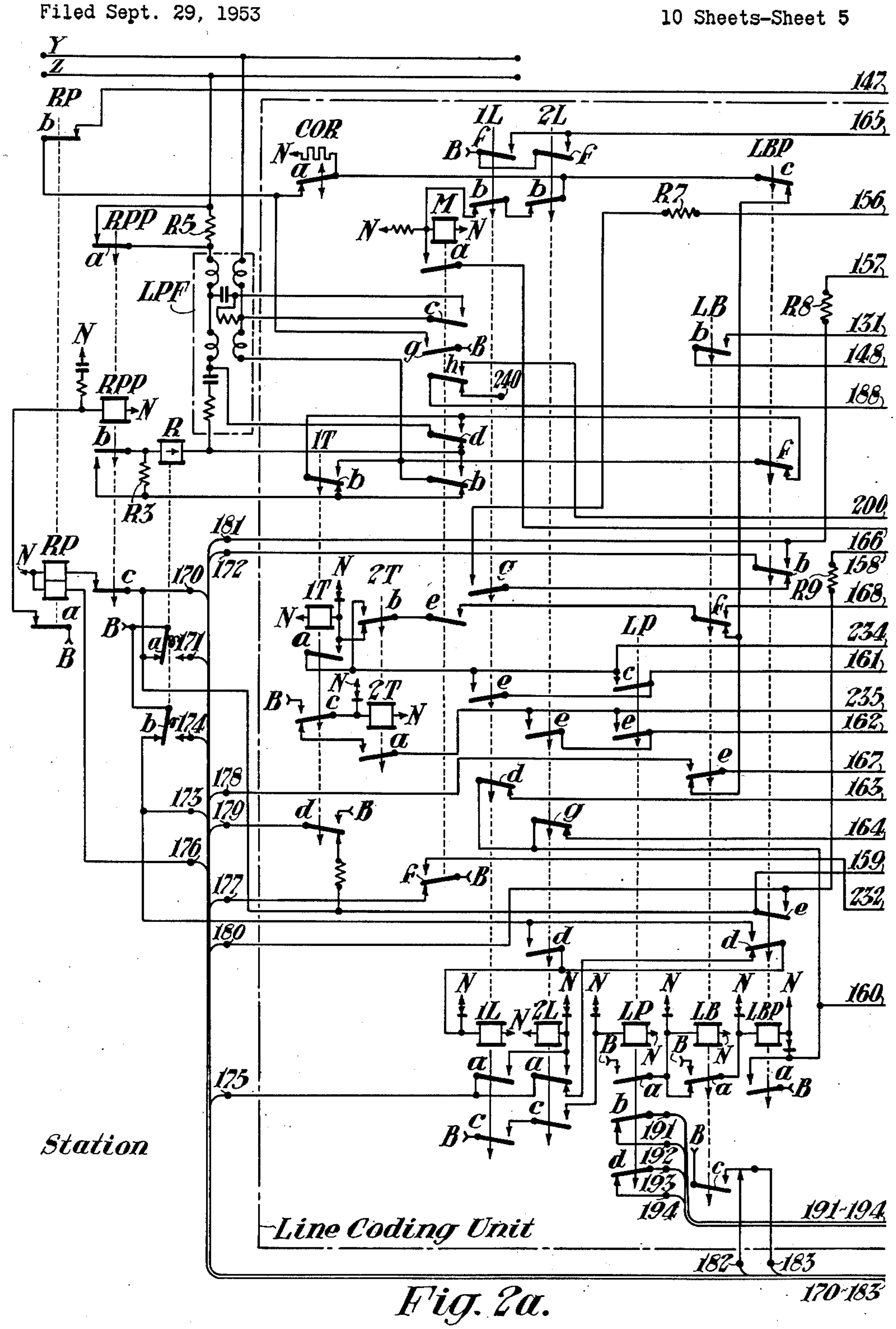
Figure 2B:
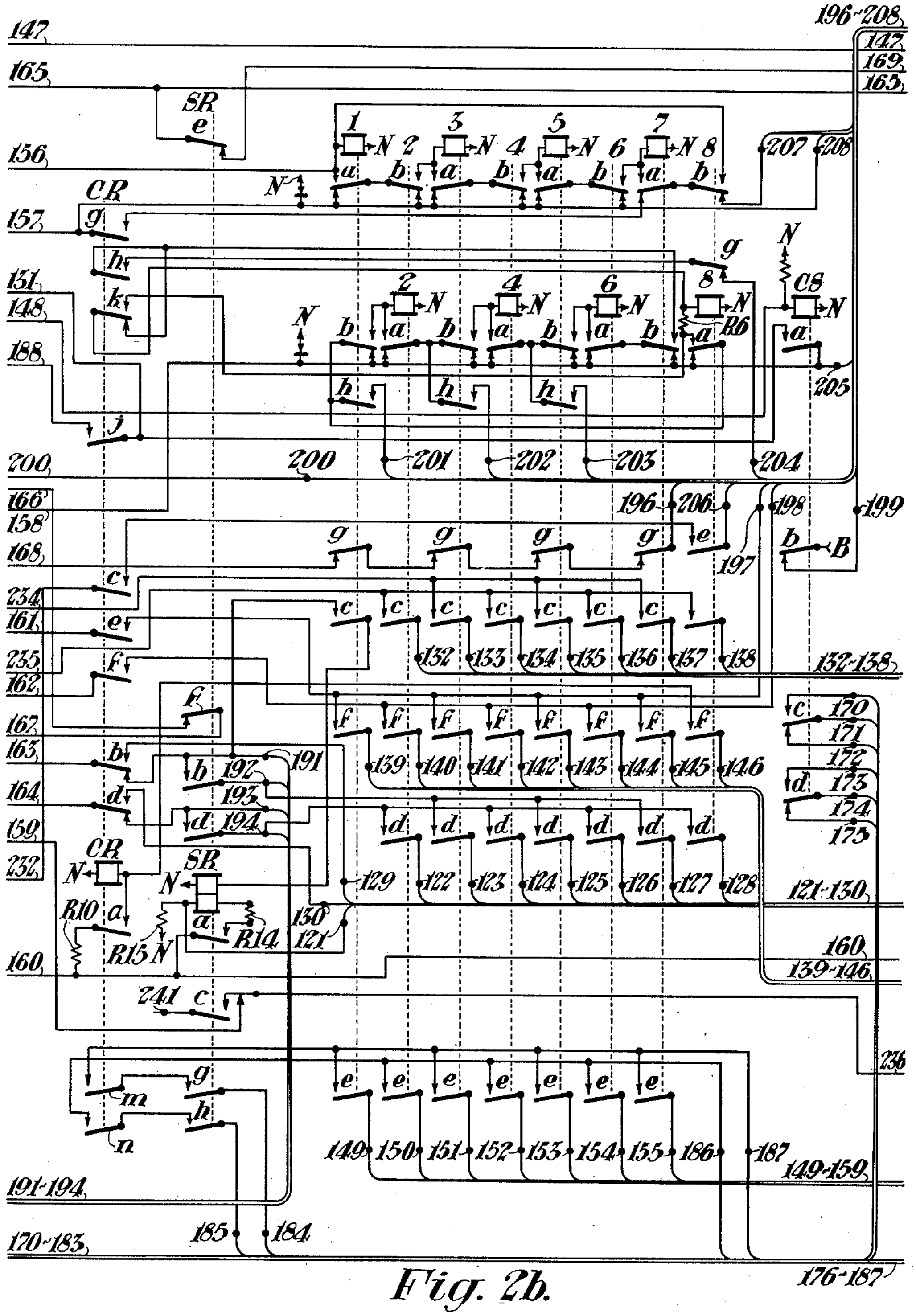
Figure 2C:
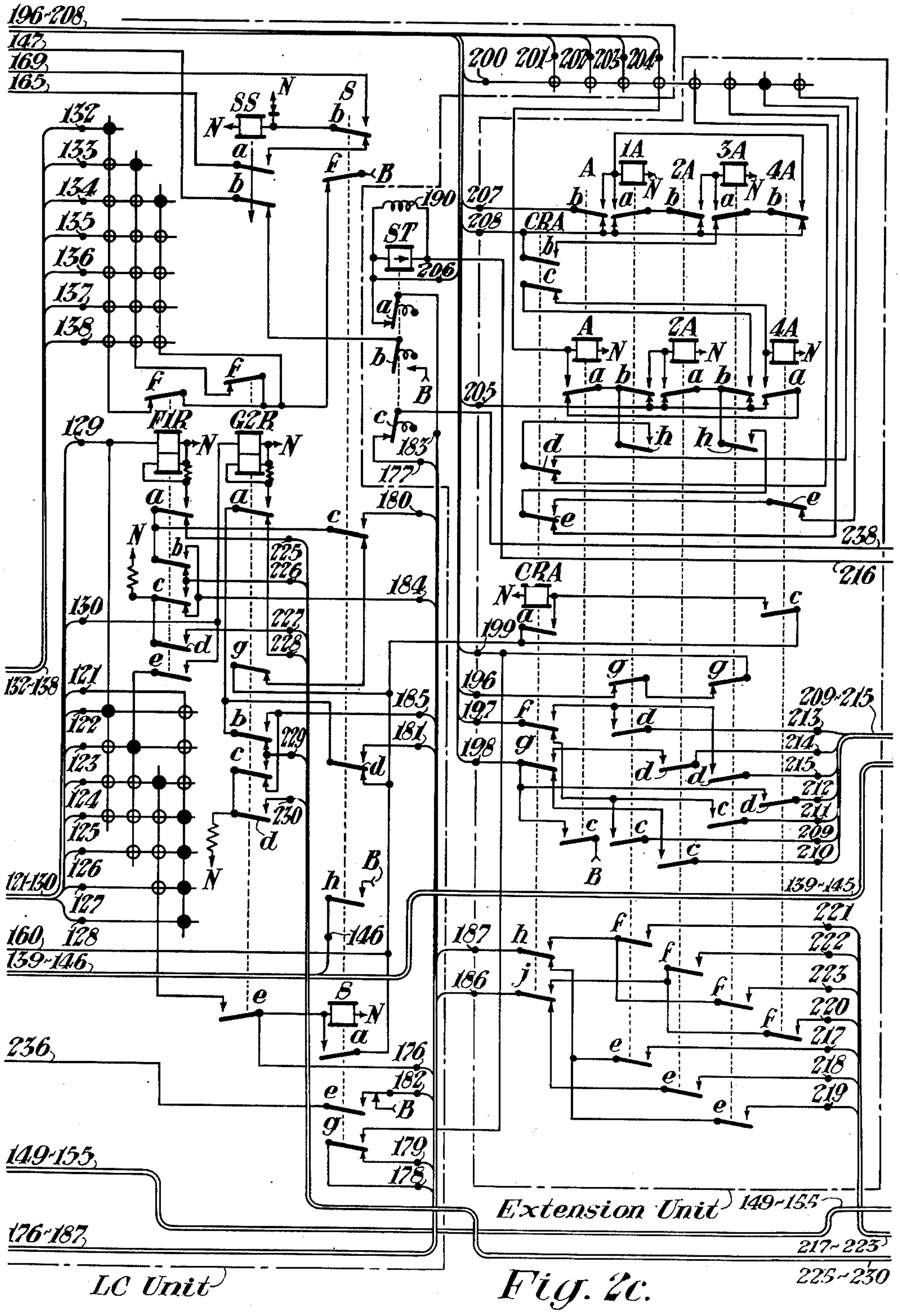
Figure 2D:
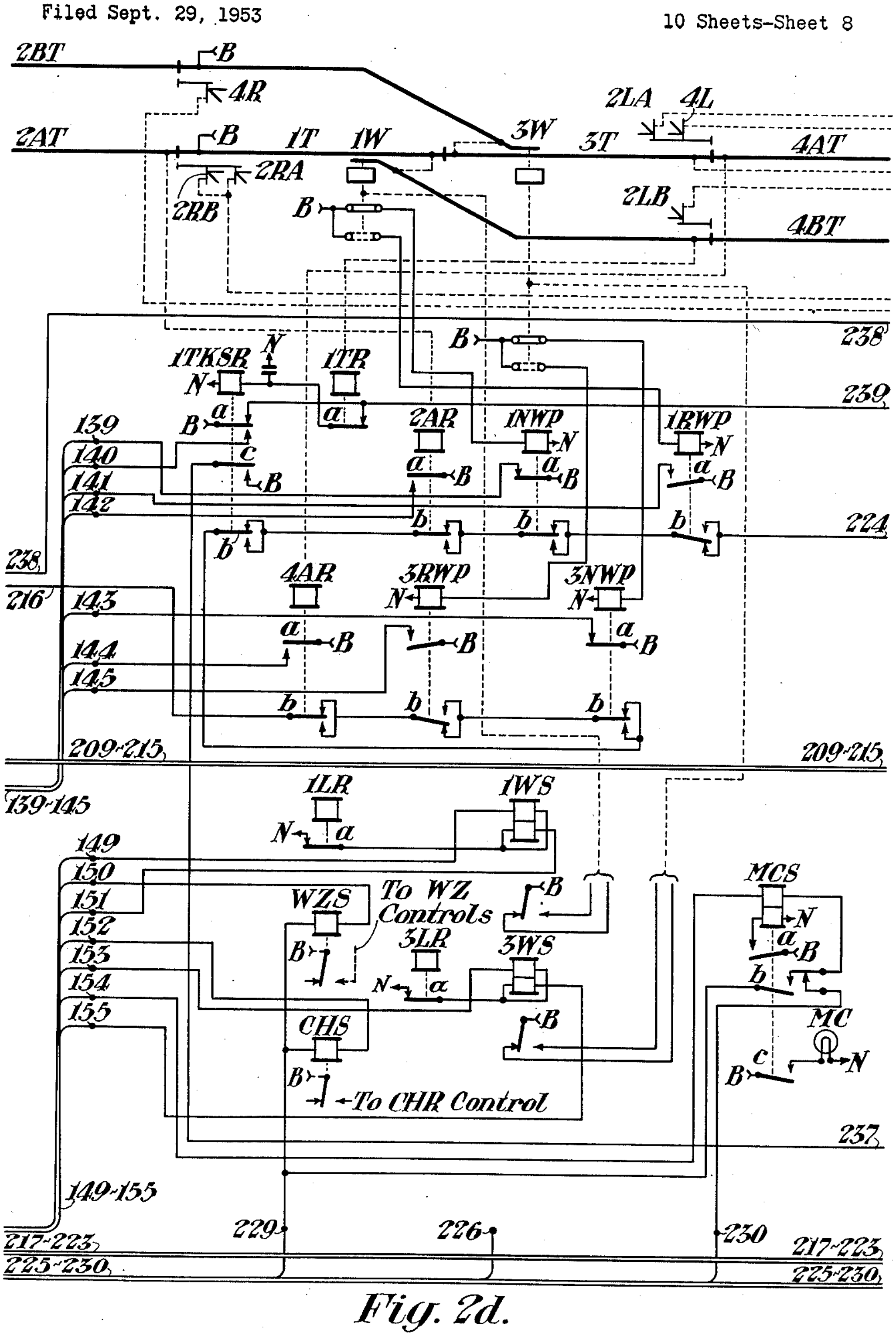
Figure 2E:
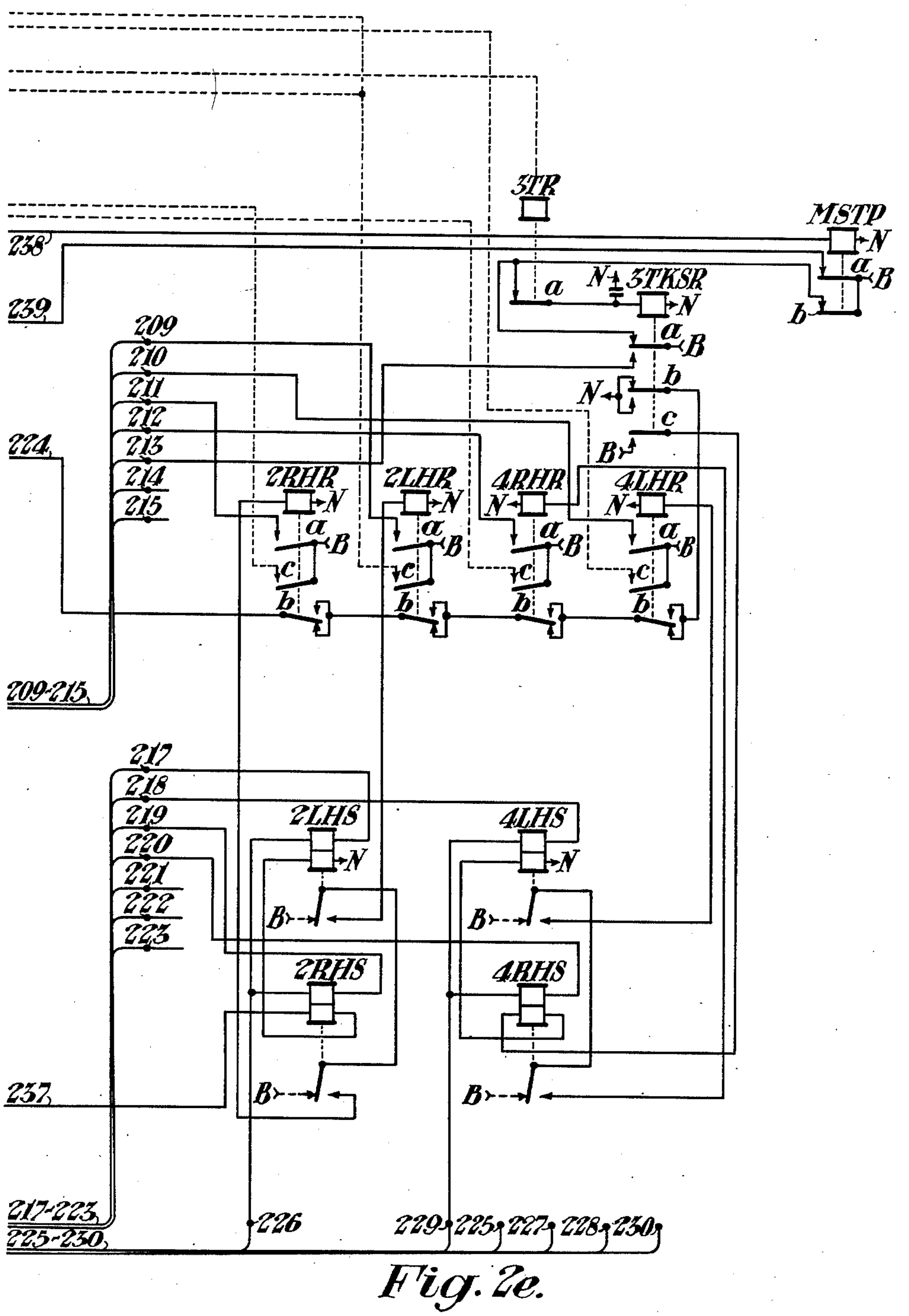

Figs. 2*a*, 2*b*, 2*c*, 2*d*, and 2*e*, taken together in the order named with Fig. 2*a* on the left, illustrate the corresponding apparatus at a typical field location when one code extension only is required to handle the control and indicating devices at that location. The apparatus of Figs. 2*a*, 2*b*, and the left portion of 2*c*, comprises the station coding unit. As indicated by the dot-dash line on Figs. 2*a* and 2*c*, most of this apparatus is usually contained inside the case of a line coding unit, commonly called an LC unit. This LC unit contains the apparatus to the right of the dot-dash on Fig. 2*a*, all of the apparatus on Fig. 2*b*, and the apparatus to the left of the similar dot-dash line on Fig. 2*c*. In the right portion of Fig. 2*c*, there is shown a code extension unit, as indicated by the dot-dash lines, which is added at this field location in order that all of the controls and indications may be carried by one code. Fig. 2*d* includes a track diagram showing a typical installation such as may be controlled by a field station in this system. There is illustrated diagrammatically the necessary power switches and control signals to govern the movement of trains at an interlocking which is the center of a lap-siding arrangement. The remainder of Fig. 2*d* and Fig. 2*e* shows the relays of the station unit suitable for the control and indication of the typical traffic governing devices shown. It is to be understood that only the relays and circuits necessary to illustrate the operation of the coding apparatus have been shown in connection with this track diagram, and that dotted lines have been used, in the accepted manner, to show linkage with the various devices. It will be noted that the interlocking with its wayside devices shown in Fig. 2*d* is that controlled by the C. T. C. machine panels illustrated in Fig. 1*d*.

Figure 3:
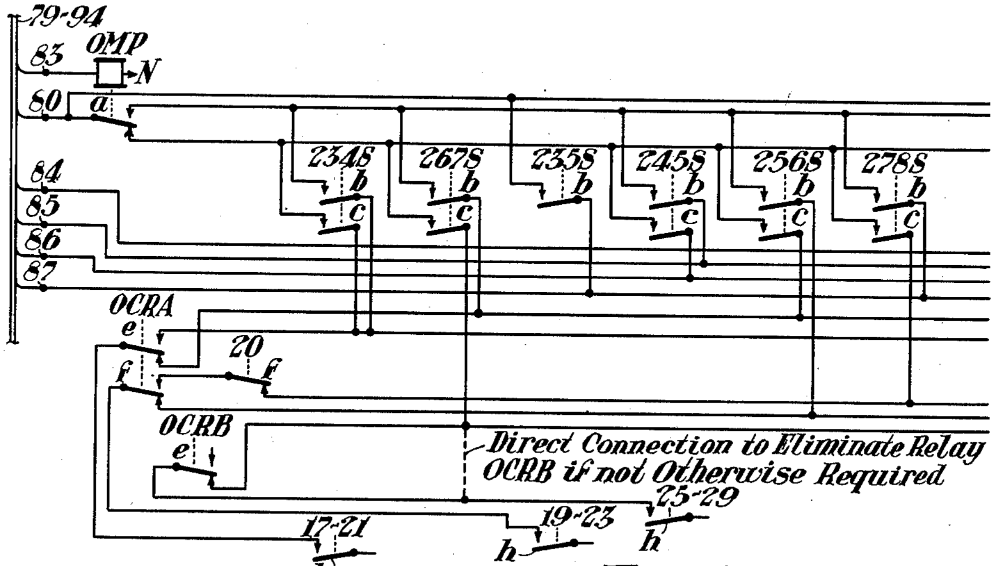

Fig. 3 shows a portion of the code extension circuit shown in the right portion of Fig. 1*c*. To these circuits have been added contacts of additional station selection relays with corresponding adjustable connections for stations other than that shown in Fig. 2. This has been done to facilitate the explanation of the synchronization of code stopping action between the office and field stations to allow for various length codes.

Figure 4:
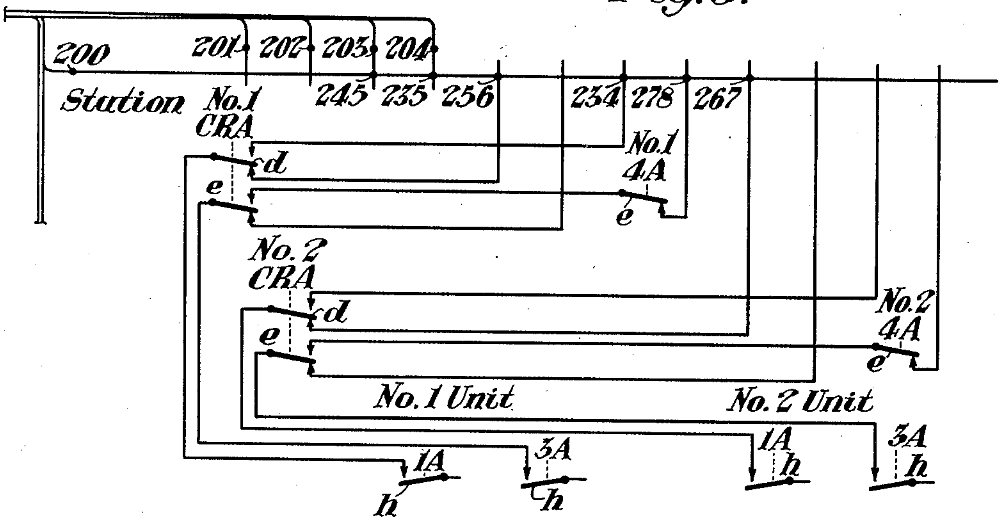

Fig. 4 is a composite showing of the adjustable connections necessary at the field stations having the code calls shown in Fig. 3 to end the indication codes at each station on the selected step.

Similar reference characters refer to similar parts in each of the several views.

Referring now to Fig. 1*a*, the reference characters Y and Z designate a pair of line wires which extend from the office to the several field stations. At the particular field station used in illustrating the operation of the equipment, these line wires Y and Z appear on Fig. 2*a*. These two line wires provide a line circuit for the C. T. C. of my invention and also may be used to provide channels for telephone and telegraph communication, as explained in connection with the similarly designated line wires shown in Letters Patent of the United States No. 2,303,875, issued December 1, 1942, to G. W. Baughman and N. F. Agnew, for a Remote Control System.

This line circuit, as shown, is normally energized by current from the office line battery 77, the positive terminal of which is normally connected to the line wire Y and the negative terminal to the line wire Z, over back contacts *b* and *d* of a pole-changer relay PC, similar contacts of the office transmitter relay O1T, and the coils of a suitable low pass filter OLPF. Control codes are transmitted by opening and closing the line circuit by periodic operation of the relay O1T. The line circuit also includes the office line resistors R1 and R2, and the primary windings of an impulse transformer RT by means of which the office line relay OR is controlled when receiving indication codes.

Relay OR is of the magnetic stick type, as described and claimed in the aforementioned Patent No. 2,303,875. The arrangement for relay OR is such that when current flows through either winding in the direction of the arrow, the relay armature is moved to its normal position, closing normal or left-hand contacts. Current flowing in the opposite direction through either winding causes reverse or right-hand contacts to be closed. Relay OR thus responds to impulses of alternately opposite polarity delivered by the transformer RT when the line current is varied by the operation of a station transmitter relay 1T, such as is shown in Fig. 2*a*. Indication codes are transmitted by operating relay 1T to connect the line wires together periodically through an impedance of relatively low value, in comparison with the normal impedance of the line circuit. This low impedance comprises the coils of a low pass filter LPF, similar to the one at the office, which is interposed between the line and station apparatus.

At each field station, as shown in Fig. 2*a*, a high resistance line relay R is connected across the line wires Y and Z in series with a resistor R3, the connection normally including back contacts *b* and *d* of a master relay M and the coils of the low pass filter LPF. The station line relays R are of the biased type and are normally energized in parallel by current supplied by the office line battery 77. Each relay R closes its left-hand or normal contacts *a* and *b*, as shown, when its left-hand terminal is positive, and closes its right-hand or reverse contacts *a* and *b* when energized in the reverse direction with its right-hand terminal positive, or when deenergized. In other words, when the current flow through the winding of the relay R is in the direction of the arrow, the relay armature is operated to close its normal contacts, the left-hand contacts as shown. When the current flow through the relay winding is in the direction opposite to the arrow, or when no current is flowing, the relay armature is biased to operate to its right-hand or reverse position closing reverse contacts. The connection of the station apparatus to the line wires Y and Z is controlled by a fault relay RPP in a manner hereinafter pointed out, but as this relay is not involved in the normal operation of the system, it may be assumed for the present to remain in its normal energized position as shown.

The system of my invention is arranged to employ codes which have normally 16 steps when transmitting to or receiving from the usual field station which requires only such a normal length code. The system is arranged, however, for the codes to be extended as required at field stations which require additional control or indication steps to transmit all the necessary functions. The codes may also be shortened to less than 16 steps, as will be explained hereinafter.

In each control code delivered by the office transmitter relay O1T, the line circuit is open during each odd numbered step and closed during each even numbered step. The character of each transmitted impulse, that is short or long step, is determined by the interval of time during which the transmitter relay O1T is either picked up or released. More particularly, the office coding unit is placed in condition to transmit a control code by energizing the master relay OM of Fig. 1*a*, which completes circuits for effecting the periodic operation of the associated transmitter relay O1T to open and close the line circuit to operate the line relays R at all stations in unison, both the open and closed periods constituting code elements.

The relay O1T is alternately picked up and released to produce short impulses of code by back contacts of the odd numbered counting chain relays connected in series. As will be explained shortly, the long odd numbered impulses are produced by holding the relay O1T picked up by various stick circuits. To assist in the timing of the code impulses a second transmitter relay, the relay O2T is added, as disclosed in the aforementionad Patent No. 2,442,603. The relay O2T is picked up when relay O1T picks up. Once released, relay O1T cannot pick up again until relay O2T releases. Thus, the even numbered impulse time is determined by the release of relay O2T, which is held up, by stick circuits similar to those for relay O1T, to produce the long even numbered impulses. At the field location the transmitter relays 1T and 2T control the transmission of indication codes in a similar manner, as will be described shortly.

When the line circuit is opened to begin the first element of a code. each line relay R releases and its reverse contact *b* completes a circuit from the positive terminal B of a suitable local source of direct current energy over wire 174, back contact *d* of relay CS, wire 175, back contact *a* of relay 2L, back contact *d* of relay LBP, and the winding of relay 1L to the negative terminal N of the direct current source. The relay 1L then picks up and its front contact *a* completes a circuit from terminal B, at the reverse contact *b* of relay R, over wires 174 and 175 and back contact *d* of relay CS, as just described, through the winding of relay 2L to terminal N, so that the relay 2L picks up, completing an obvious stick circuit at its own front contact *a*. The pickup of relay 2L also completes a circuit from terminal B over front contacts *c* of relays 1L and 2L and through the winding of relay LP to terminal N. The resulting pickup of relay LP in turn completes an obvious circuit over its front contact *a* to energize the relays LB and LBP, which then pick up. Relay LBP becomes energized in tandem with relay LB when front contact *a* of the latter relay is closed so that these relays release successively after relay LP is released.

When relay 2L picks up on the first step of a code, its contacts *a* and *d* shift the connections to the winding of relay 1L from the reverse to the normal contact *b* of relay R, and then the front contact *d* of relay LBP is closed to maintain the latter connection until the code is terminated. It follows that relays 1L and 2L are then energized alternately, relay 1L over the normal contact *b* of relay R, and relay 2L over the reverse contact *b* of relay R, in response to the periodic operation of the armature of relay R. Relays 1L and 2L remain picked up for the duration of short code elements, relay 1L releasing during each odd numbered long element and relay 2L during each even numbered long element. These relays serve, therefore, to indicate code character in a received code and, together with the relay LP, serve to control the length of the long steps of a code generated by the associated transmitter relays 1T and 2T. Relay LB and its repeater relay LBP are bridging relays. Each maintains its front contacts closed for the duration of a code and serves to prepare various local circuits when the code operation of relay R begins and to open them when it ceases.

The office line relay OR, shown on Fig. 1*a*, controls a similar group of timing relays O1L, O2L, OLP, OLB, and OLBP. These relays function in a manner similar to that just described for the field station. Relay OR, however, is normally deenergized and, as a magnetic stick type relay, is adapted to hold its contacts in either position to which it is operated by a momentary impulse. Hence, it may become accidentally reversed. If this occurs, relay OR is restored automatically to normal by the action of the timing relays in a manner hereinafter explained. It may therefore be assumed that relay OR, although deenergized, occupies its normal position corresponding to that of the normally energized station line relay R when the system is at its normal, at-rest condition, that is, no code being transmitted in either direction.

When receiving indication codes, relay OR is operated by impulses of alternately opposite polarity delivered by the transformer RT. During the transmission of control codes, the master relay OM, Fig. 1*a*, is held energized and its contact *c* both short circuits the secondary of transformer RT and disconnects it from relay OR, the relay OR being then operated locally by the transmitter relay O1T. When relay OM picks up, relay OR becomes energized in the normal direction, as shown, over the circuit from the midpoint terminal O of the local battery 78, through the lower winding of the relay, back contact *e* of relay O1T, and front contact *e* of relay OM to the negative terminal N of the local battery source.

Relay O1T becomes energized over front contact *d* of relay OM. Relay O1T picks up and, by closing its front contact *c*, in turn energizes relay O2T. These two transmitting relays are then controlled over wires 61, 68, and 70 and wires 62 and 71, respectively, in a manner hereinafter explained, to generate the code.

Each time relay O1T picks up, it opens the line circuit at its back contacts *b* and *d* to release the line relays R at the stations and connects line wire Y to line wire Z over the corresponding front contacts through a resistor R4 to discharge the line charging current. This latter action is especially desirable when the line or any portion of the line is in a cable. At the same time, relay O1T causes the armature of relay OR to be operated to its reverse position by current flowing through the circuit extending from positive terminal B over front contact *e* of relay O1T, and through the lower winding of relay OR in a direction opposite the arrow to terminal O. Each time relay O1T releases, it closes the line circuit to move normal the armatures of the line relays R, and at the same time operates the armature of relay OR to normal by completing, at its back contact *e*, the circuit extending from terminal O of the local source through the winding of relay OR and also over front contact *e* of relay OM to terminal N. The armature of relay OR thus operates in unison with the armatures of the relays R during the transmission of control codes.

Each line relay controls a chain of counting relays over circuits generally similar to those of the aforementioned Patent No. 2,411,375. Thus the relay OR, by means of its contact *a*, controls the counting chain relays O1 to O8 and OCS, of Fig. 1*b*, and the extension counting chain relays 16, 17—21, 18—22, 19—23, and 20, of Fig. 1*c*. Each relay R controls a similar counting chain. Where no extension unit is used, the station counting chain comprises only the relays 1 to 8 and CS, of Fig. 2*b*. When an extension unit is used as shown on Fig. 2*c*, the relay R also controls the extension counting chain relays A to 4A inclusive.

As will be explained during the following description, certain of the relays of the counting chain, in addition to counting a particular step of a code, have a secondary function of preparing circuits to turn back the coding action to reuse certain of the counting relays or to extend the coding action by the use of the relays of the extension counting chain. Thus the relay O8 at the office, and relay 8 at a station, in addition to counting the eighth step of a code, prepare circuits to turn the coding action back to reuse relays O1 to O7 and 1 to 7, respectively, to count the code steps 9 to 15. Relay 16 at the office and relay A at a station, in addition to counting the sixteenth step of the code, prepare circuits to extend the coding action beyond the sixteenth step through the use of the extension counting chain relays 17—21 to 20 and 1A to 4A, respectively, which count the code steps 17 to 20. Relays 20 and 4A have a secondary function similar to that for relays O8 and 8, that is, the preparation of circuits to reuse relays 17—21 to 19—23 and 1A to 3A, respectively, to count the code steps 21 to 23. If the coding action must be longer than twenty-four steps, a relay 24 at the office and the relay A in a second extension unit at the station function in a manner similar to that of relays 16 and A above. The function and operation of the code stopping relays OCS and CS, which become the final relay in the chain, will be described hereinafter. The number of counting chain relays at a station varies according to the maximum number of code steps required for either the corresponding control or indication code, as will be explained later. At the office the number of relays in the counting chain must match the largest number in the similar chain at any station on the line circuit.

It will also be noted, however, during the following description, that at the end of the first cycle of operation of the counting chain within the coding unit, both the relay O8 and a chain repeat relay OCR, at the office, or relay 8 and a chain repeat relay CR at the selected station, are picked up. The chain repeat relays are necessary, as will become apparent from later description, to prepare for various associated actions which occur on the eighth step and also to help turn back the coding action for a repeat cycle. The chain repeat relay is held up during the remainder of the code to condition other circuits used in extending the coding action and in controlling the delivery of the various functions. Similar chain repeat relays, the relay OCRA at the office and the relay CRA at the field location, are used to condition the circuits to cause a repeat action of the extension counting chain. These relays pick up on the same step as the relay 20 at the office and the relay 4A at the selected field station. Once picked up, they also remain picked up for the remainder of the code to assist in further extension of the coding action and in the delivery of various functions during the extension code steps.

Referring now to Figs. 2*a* and 2*b*, it will be seen that a pickup circuit for relay 1 is closed momentarily in response to the first of a series of operations of the relay R. This pickup circuit extends from terminal B at the reverse contact *a* of relay R over wire 171, back contact *c* of relay CS, wire 172, back contact *b* of relay LBP, front contact *g* of relay 1L, resistor R7, wire 156, and through the winding of relay 1 to terminal N. Relay 1 therefore picks up on the first step of a code upon the energization of relay 1L. When relay LBP picks up, opening of its back contact *b* interrupts the circuit just traced and in turn closes a stick circuit for the relay 1. This stick circuit extends from the terminal B at reverse contact *a* of relay R over wire 171, back contact *c* of relay CS, wire 172, front contact *b* of relay LBP, through resistor R8, wire 157, back contact *b* of relay 2, and front contact *a* and the winding of relay 1 to terminal N. When relay R is operated to its normal position to begin a second step of the code, terminal B is disconnected from relay 1 which, however, remains picked up due to the discharge path provided by the half-wave rectifier connected to wire 157.

A circuit is now closed from terminal B at the normal contact *a* of relay R over front contact *e* of relay LBP, resistor R9, wire 158, back contact *a* of relay 8, front contact *b* of relay 1, through the winding of relay 2 to terminal N. Relay 2 therefore picks up and completes its stick circuit extending to terminal B, at wire 158, over its own front contact *a* and back contact *b* of relay 3. The operation of contact *b* of relay 2 disconnects relay 1 from the half-wave rectifier and closes a second discharge path for relay 1 through the winding of relay 3. Therefore, relay 1 releases shortly after relay 2 picks up but without sparking at its contact *a*, the dropping of which connects relay 3 to wire 157 to condition that relay to respond to the third step of the code. The third step begins when relay R is again operated reverse, closing its reverse contact *a* to place energy on wire 157 over a circuit previously traced as part of the stick circuit for relay 1. This circuit is extended over back contact *a* of relay 1 and front contact *b* of relay 2 through the winding of relay 3 to terminal N. Relay 3 thus picks up.

Relays 4 to 8, inclusive, are similarly controlled, one at a time, by current supplied alternately over wires 157 and 158 in response to the fourth to eighth steps, inclusive, of the code. If the various operations associated with these code steps, as hereinafter described, are properly carried out, a chain repeat relay CR is picked up on the eighth step. This prepares a pickup circuit for relay 1 over front contact *b* of relay 8 so that relay 1 will operate as the next in order after relay 8, this pickup circuit also including front contact *g* of the relay CR and back contact *a* of the relay 7. Relays 1 to 7, inclusive, are then operated through a second cycle on the ninth to the fifteenth steps of the code.

On the sixteenth step of the code, the first relay of the extension counting chain, the relay A, located in the extension unit, is energized in place of the relay 8. The pickup circuit for the relay A extends from wire 158 over back contact *a* of relay 6, front contact *b* of relay 7, front contact *h* of relay CR, back contact *g* of relay 8, wire 204, and through the winding of relay A to terminal N. When the relay A picks up, a stick circuit is completed, over its own front contact *a*, extending from wire 158 over wire 205 and back contact *b* of relay 1A.

When relay A closes its front contacts, a circuit is prepared for the energization of the relay 1A on the seventeenth step of the code. This circuit extends from wire 157 over front contact *g* of relay CR, back contact *a* of relay 7, back contact *b* of relay 8, wire 207, front contact *b* of relay A, through the winding of relay 1A to terminal N. When the relay 1A picks up it establishes a stick circuit over its own front contact *a*, back contact *b* of relay 2A, and wire 208 to wire 157. It can be seen, therefore, that the energization and resultant pickup of relay 1A is similar to the pickup of relay 1 on the ninth step of the code. The equipment is also now prepared for the other relays of the counting chain of the extension unit to pick up in a manner similar to the pick up of relays 2, 3, and 4 of the counting chain in the LC unit. Relays 2A, 3A, and 4A pick up on steps 18, 19, and 20, respectively, in a manner similar to that previously described, as a result of the code following action of the relay R.

In addition, the action upon the pickup of relay 4A is very similar to the action when the relay 8 picks up at the end of the first cycle of operation of the LC unit counting chain. It has already been mentioned that the relay CRA picks up on the same step as the relay 4A, that is, the code step 20. In conjunction with relay 4A, the relay CRA prepares a circuit so that relay 1A will follow the relay 4A in the counting chain action. This circuit may be traced from wire 208 over front contact *b* of relay CRA, back contact *a* of relay 3A, front contact *b* of relay 4A through the winding of relay 1A to terminal N. Thus, when relay R goes reverse on the twenty-first step of the code closing its reverse contact *a*, relay 1A will be energized and will pick up in a manner similar to the pickup of relay 1 following relay 8 on the ninth step of the code.

The relays 2A and 3A will follow the relay 1A if the coding action continues, picking up on the twenty-second and the twenty-third steps of the code, respectively. It is obvious that the coding action of the counting chain could be extended indefinitely by adding extension units. In a second extension unit, a second relay A would pick up on the twenty-fourth step of the code, being energized over a circuit traced from wire 205 over back contact *a* of relay 2A, front contacts *h* and *e* of relays 3A and CRA, respectively, and back contact *e* of the relay 4A. This would then be followed by the pickup of the relays 1A, 2A, and 3A of the number 2 extension unit.

The coding operation of the unit at the field station will continue until, as hereinafter described, the relay OR at the office remains normal so that the field relay R also remains with its normal contacts closed. At this time the apparatus is restored to its normal at-rest condition. It is not necessary when the field station is receiving a control code for the code stopping relay CS to be energized, as the apparatus will reset without operation of this relay. The operation of the relay CS to terminate the transmission of an indication code from the field station will be hereinafter described.

Referring now to Figs. 1*a*, 1*b*, and 1*c*, it will be seen that the office counting chain circuits are similar to those just described for the field station. The relay O1 receives energy on the first step of the code over the wire 75 and picks up. The remaining relays O2 to O8 are operated one at a time by the current supplied alternately over wires 89 and 90 in response to the periodic operation of the relay OR. The office chain repeat relay OCR is energized and picked up on the eighth step of the code to prepare circuits for again energizing relay O1 on the ninth step to initiate a repeat cycle of operation of the relays O1 to O7. Relay OCR also prepares circuits to later energize the relay 16, which is external to the OLC unit. In the office, the relay 16 takes the place of the relay A at the field station. This relay operates on the sixteenth step of the code to prepare circuits to cause the extension counting chain relay 17—21, also external to the OLC unit, to pick up upon the seventeenth step.

The relays 18—22, 19—23, and 20 follow relay 17—21 in order, similar to the relays O2, O3, and O4 of the OLC unit following in order the relay O1. Relay 20 is similar also to the relay O8, having a secondary function in the counting chain action and acting in conjunction with the second chain repeat relay OCRA, which also picks up on code step 20. Circuits are then prepared by these two relays so that relay 17—21 picks up on code step 21 following in order the relay 20. Relays 17—21, 18—22, and 19—23 thus repeat in order on code steps 21 to 23.

It is obvious that the code could be extended for as many steps as desired by adding additional relays to the extension counting chain. A relay 24 would be provided to pickup on step 24 in a manner similar to the pickup of relay 16. The energization of relay 24 would be controlled from wire 90 over back contact *a* of relay 18—22, front contact *h* of relay 19—23, front contact *f* of relay OCRA, and back contact *f* of relay 20. The coding action then would continue until terminated when all of the functions had been received or transmitted.

At the office, however, it is necessary for the office code stopping relay OCS to be energized and to pick up on the final step of each code, both when the office is transmitting a control code and when receiving an indication code. A master relay repeater, the relay OMP, is provided for the purpose of distinguishing between these two types of codes. As will be hereinafter described, circuits are completed over front contacts *h* of the relays O1, O3, or O5, front contact *b* of relay O7, or front contacts *h* of relays 17—21 or 19—23, front contacts of the station selector relays, and a front or back contact of the relay OMP, depending on whether it is a control or indication code, respectively, to energize the relay OCS on the final step of any code. When the relay OCS picks up, the opening of its back contact *d* interrupts the holding circuit for the master relay OM. Release of this relay causes a control code to be terminated. During an indication code, the opening of back contact *c* of relay OCS releases the relay PC which causes the entire system to reset. More detailed explanation of this action will be given hereinafter.

I shall now describe the transmission of a control code step-by-step by the office apparatus of Figs. 1*a*, 1*b*, 1*c*, and 1*d*.

To initiate a control code, the operator momentarily presses a starting button 234STB, shown on Fig. 1*d*, identifying the control panel associated with the station coding unit to which the code is to be transmitted, to thereby pick up a starting relay such as the relay 234ST. The circuit for energizing relay 234ST may be traced from terminal B at the now closed contact *a* of the starting button 234STB over wire 67, through the winding of the relay 234ST, and over the normally closed contact of the cancel button CB to terminal N. The necessity for and use of the cancel button CB will be described shortly. The relay 234ST is held energized by a stick circuit extending from terminal B at the back contact *f* of an associated panel selector relay, the relay 234S, over the front contact *a* of the 234ST relay, and through the winding of the relay to terminal N at the contact of the cancel button CB. This holds the ST relay energized until the desired selection has been effected.

Wire 47, in Fig. 1*c*, is normally connected over back contacts of various selecting relays E, F, and G to branch circuits extending to front contact *b* of the starting relay ST of each panel. The closing of front contact *b* of relay 234ST therefore extends the connection from terminal B at that contact over a particular branch which, as shown, includes back contacts *g* of the relays 23G, 2F, and E to wire 47. If the system is in its normal, at-rest condition so that relays O1L and O2L are released, a circuit is completed continuing over wire 47 and over the back contacts *b* of the relays O1L and O2L through the winding of relay OM to wire 17, and then to terminal N at the normally closed contact of the cancel button CB. Relay OM therefore picks up in response to operation of any starting relay, such as relay 234ST.

The previously mentioned cancel button CB is provided to permit the immediate correction of an error by the operator of the machine. Operation of the cancel button CB disconnects the terminal N from any energized ST relay and this relay will then release. The apparatus then resets and allows the operator to correct his obvious error and start the coding action over again by operation of the associated starting button STB. Since the connection of the relay OM to terminal N of the source is also carried over the cancel button by wire 17, operation of the cancel button at any time in the code causes an interruption of the control code and a resetting of the apparatus. Also, since all ST relays are carried to terminal N over the same cancel button, the entire office apparatus will be reset by operation of the cancel button CB cancelling all code action and releasing all stored start relays.

The pickup of the relay OM completes a pulsing circuit for the office transmitter relay O1T which extends from terminal B at back contact *g* of relay 19—23 over back contact *g* of relay 17—21, wire 94, back contact *e* of relay OCS, back contacts *g* of relays O7, O5, O3, and O1, wire 68, front contact *d* of relay OM, back contact *b* of relay O2T, through the winding of relay O1T to terminal N. Relay O1T therefore picks up to begin the first step of the code, its back contacts *b* and *d* opening the line circuit to release the station line relays R, and its front contact *e* completing a circuit previously traced for operating relay OR to its reverse position. The second transmitter relay O2T is also energized by a simple circuit completed by closing of front contact *c* of the relay O1T.

Operation of relay OR energizes the timing relay chain OL and the first counting relay O1 as already described. When the relays OLB and OLBP pick up, their front contacts *c* complete a stick circuit for the relay OM. This circuit extends from terminal B at back contact *e* of relay OCS over wire 56, front contacts *c*, in multiple, of relays OLB and OLBP, front contact *a* and the winding of the relay OM and then over wire 17 to terminal N at the cancel button CB.

The first step of each control code is a long step to distinguish it from an indication code in which the first step is relatively short. When relay O1T picks up, followed by relay O2T, a stick circuit is completed over front contact *a* of relay O1T, front contact *b* of relay O2T, and front contact *d* of relay OM to wire 68, and thence over the previously described pulsing circuit. When relay O1 picks up on the first step, its back contact *g* opens this pulsing circuit for relay O1T but the relay is held energized over a branch circuit to generate the required long first code step. This branch circuit for holding the relay O1T energized may be traced from terminal B at back contact *g* of relay 19—23 over the previously described pulsing circuit to back contact *g* of relay O3, then over front contact *c* of relay O1, back contact *d* of a relay SP, wire 61, front contacts *e* of relay O1L and *b* of relay OLP, in multiple, and front contact *a* and the winding of relay O1T to terminal N. Relays O1L and OLP then release successively, the opening of front contact *b* of relay OLP opening the stick circuit causing the relay O1T to release. Release of relay O1T to begin the second step of the code closes the line circuit, energizing the line relays R, and operates relay OR to its normal position.

Relay OR operating to its normal position causes relay O2 to pick up and relay O1 to release, as previously described.

The closing of back contact *g* of relay O1 during the second step completes the previously described pulsing circuit for relay O1T over wire 68, this pulsing circuit functioning repeatedly to generate the steps of the code. However, relay O1T cannot pick up until relay O2T releases to close its back contact *b*. Thus, the release time of relay O2T is used to determine the time length of the short even steps of the code, since the even steps are terminated by the picking up of relay O1T. In a similar manner, the release time of relay O1T is used to time the short odd steps of the code since the odd steps are terminated when relay O1T releases. Neither the pick up time of relay O1T or relay O2T materially matters in the timing of the short code elements. This is different from the previously mentioned Patent No. 2,411,375, and results in better timing control of the code steps.

Wires 61 and 70 and wires 62 and 71 provide connections described hereinafter in detail for holding the relays O1T and O2T, respectively, picked up to generate the long steps of the code. During the code steps 2 to 8, inclusive, the supply of energy from terminal B is over wires 70 and 71 and is controlled over contacts of the station selection relays. During the eighth step, the relay OCR picks up, and thereafter the control of energy from terminal B is over the wires 61 and 62 from contacts of the function control levers and thence over front contacts of the relays O1L, O2L, and OLP. Thus the length of these latter code steps is directly determined by the release time of the relay OLP. However it is to be noted that during the code steps 2 to 8, when the pick up of the various station selection relays terminates the supply of energy which holds up the relays O1T and O2T during long steps in the code, operation of these station selection relays is controlled by the relays O1L, O2L, and OLP, as will be shortly described. Thus the timing chain relays also enter into the timing of the long code steps during the station selection portion of the code.

The second to eighth steps of each code may be arranged in any one of thirty-five different combinations of three long and four short steps to form distinctive station code calls which are identified by three digit numbers in which the digits represent the long steps of the code call. Thus the number 234, assigned to the machine panel group of Fig. 1*d* and the corresponding station unit of Fig. 2, is one in which the second, third, and fourth steps of the code are long, and the fifth to eighth steps are short. The code calls are generated by completing connections from terminal B at front contact *b* of the office starting relays ST to wires 70 and 71, these being arranged so that when a plurality of starting relays are energized, their respective codes will be transmitted one at a time in a given order of code superiority. A long element takes precedence over a short one on each step. That is to say, when transmitting, 234 is the most superior code call, 235 the next, and so on, 678 being the most inferior.

The selection of the office panel containing an energized relay ST is effected by the energization of an entry relay E, shown in Fig. 1*c*, in response to the first element of the code, followed by the energization of three relays in sequence by the three long elements of the code call. These three relays comprise a first selector relay F, a group selector relay G, and a station selector relay S, these relays being identified more particularly by prefixes designating the code elements by which their operation is effected. For example, relay 2F is responsive to the second element, relay 23G to the third provided relay 2F has been operated, and relay 234S to the fourth provided relay 23G has been operated. When used to capacity the system will employ five F relays, fifteen G relays, and thirty-five S relays, arranged generally as shown in Figs. 2, 3, and 4 of Letters Patent of the United States No. 2,229,249, issued January 21, 1941, to L. V. Lewis, for a Remote Control System. Since the relation of these relays one to another and the connections for associating the different panels with the coding units may be ascertained from the aforementioned patent, for simplicity I have shown the circuits herein in condensed form, showing the circuits in detail for only one panel and for only one selecting relay of each kind.

Relay E is picked up on the first step of each code over a circuit extending from terminal B at contact *a* of relay OLBP in Fig. 1*a* over wire 60, back contact *a* of relay SP, front contact *d* of relay O1, wire 21, through the winding of relay E to terminal N. Relay E then completes a stick circuit at its front contact *a* extending over back contact *m* of relay 2F, and over back contacts of relays 3F to 6F, if provided, to wire 29, and thence over resistor R13, back contact *a* of relay SP, and wire 60 to terminal B at front contact *a* of relay OLBP.

It is to be understood that each of the branch circuits extending from terminal B at front contact *b* of a starting relay ST to wire 47 identifies a corresponding code call, as indicated by the references 234ST to 238ST, inclusive, adjacent contacts *g* to *k* of relay 23G. When relay E picks up, these branches are all disconnected from wire 47 and divided into groups by contacts *g* to *k* of relay E and connected to wires 32 to 36 to prepare circuits for generating the first digits of the code call.

When relay O2 picks up on the second step, a circuit is completed for holding relay O2T picked up. This stick circuit may be traced from terminal B at the front contact *b* of relay 234ST in Fig. 1*c*, over back contacts *g* of relays 23G and 2F, front contact *g* of relay E, wire 32, front contact *c* of relay O2, wire 71, front contact *a* of relay O2T, back contact *c* of relay O1T through the winding of relay O2T to terminal N, thus holding the relay O2T energized to generate a long second step. Relays O2L and OLP then release, completing a circuit from terminal B at front contact *a* of relay OLBP, over wire 60, back contact *a* of relay OCR, wire 58, back contacts *d* of relays OLP and O2L, wire 64, back contacts *d* of relays OCR and KSP, front contact *d* of relay O2, wire 22, front contact *b* of relay E, through the winding of relay 2F to terminal N. Relay 2F picks up, its front contact *a* completing its stick circuit extending over back contacts *a* of relay 23G and the other G relays of the same group, the relays 24G to 27G, if provided, to wire 29, and thence over a previously traced circuit including wire 60 to terminal B.

When relay 2F picks up, the branch circuits extending from wire 32 to terminal B over contacts of those starting relays which have the number 2 as the first digit of their code calls are disconnected from wire 32 and divided into groups by contacts *g* to *k* of relay 2F and connected to wires 33 and 37 to prepare circuits for generating the second digit of the code call. Interruption of the connection to wire 71 by the opening of back contact *g* of relay 2F allows relay O2T to release. This closes the pickup circuit for relay O1T which picks up to begin the third step.

Relay E is released by the opening of back contact *m* of relay 2F and the resultant opening of front contacts *h* to *k*, inclusive, of relay E disconnects the branch circuits for generating code calls in which the first digit is 3, 4, 5, or 6.

Each of the relays E, F, and G, and certain other relays hereinafter described, are provided with a discharge circuit including a resistor in lieu of the usual half-wave rectifier. These resistors, which are of a relatively high value in comparison with the resistance of the relay winding, provide a slight degree of retardation in accordance with the circuit requirements, and also serve to prevent contact sparking.

When relay O3 picks up, a circuit is completed to retain the relay O1T in its energized position to generate a long step. This circuit may be traced from terminal B at front contact *b* of the 234ST relay over back contact *g* of relay 23G, front contact *g* of relay 2F, wire 33, front contact *c* of relay O3, and thence over wire 70 and front contact *a* and the winding of relay O1T to terminal N. Relays O1L and OLP then release, completing a circuit from terminal B at front contact *a* of relay OLBP over wire 60, back contact *a* of relay OCR, wire 58, back contacts *d* of relays OLP and O1L, wire 63, back contacts *b* of relays OCR and KSP, front contact *d* of relay O3, wire 23, front contact *b* of 2F, and through the winding of relay 23G to terminal N. Relay 23G thus picks up, its front contact *a* completing a stick circuit for this relay extending over back contacts *a*, in series, of the associated G relays to wire 29, and thence to terminal B over a previously traced circuit.

When relay 23G picks up, the branch circuits extending from wire 33 to terminal B over the contacts of those starting relays which have 23 as the first two digits of their code calls are disconnected from wire 33 and divided into branches by contacts *g* to *k* of relay 23G and connected to wires 34 to 38 to prepare circuits for generating the third digit of the calls 234 to 238, respectively. The interruption of the connection to wire 33 by opening of back contact *g* of relay 23G allows relay O1T to release to begin the fourth step.

Relay 2F is released by the opening of back contact *a* of relay 23G. The opening of front contacts *h* to *k* of relay 2F disconnects the branch circuits which these contacts control, thereby limiting the control of the third digit to those starting relays of the group 234 to 238, inclusive.

When relay O4 picks up, the connection from terminal B at front contact *b* of relay 234ST over front contact *g* of relay 23G and wire 34 is extended over front contact *c* of relay O4 to wire 71, and thence as previously described to hold relay O2T picked up to generate the long fourth step of the code call 234. When relays O2L and OLP release, a circuit is completed from terminal B at front contact *a* of relay OLBP over wire 60, back contact *a* of relay OCR, wire 58, back contacts *d* of relays OLP and O2L, wire 64, back contacts *d* of relays OCR and KSP, front contact *d* of relay O4, wire 24, front contact *b* of relay 23G, through the winding of relay 234S to terminal N. Relay 234S then picks up. The closing of front contact *a* of this extends the connection from terminal B at its left-hand winding terminal to wire 30, and thence through the winding of the S repeater relay SP to terminal N, so that the relay SP also picks up. The pickup of the relay SP completes its stick circuit extending from wire 60 and over its own front contact *a* through the winding to terminal N. The closing of front contact *a* of the relay SP also completes a stick circuit for relay 234S extending from the front contact *a* of relay SP over wire 30 and front contact *a* of relay 234S through the relay winding to terminal N.

When relay SP picks up, the opening of its back contact *a* disconnects terminal B from wire 29, thereby releasing relay 23G. The opening of front contact *g* of relay 23G removes energy from wire 34, and thus from wire 71, so that relay O2T releases. Relay O1T then is energized and picks up to end the fourth step and begin the fifth step.

It will be seen therefore that, at the end of the first long step, release of relay O1T is controlled by the opening of a front contact of relay OLP. In the case of the first two long steps of a station code call, however, operation of relay O1T and O2T is controlled by the opening of back contacts of the respective station selection relays, each of which picks up in response to the closing of a back contact of relay OLP. Thus these two long steps are of the same length and are slightly longer than the first step. The final step of a station code call is terminated, not by the pick up of the respective S relay, but by the release of the corresponding G relay. Since the G relay releases only after the S and SP relays, in cascade, have picked up, which occurs after relay OLP has released, the final long step of the station selection is longer than either of the first two. This is particularly necessary when this final step occurs on the eighth step of the code. If the final station selection step in that case was terminated by the pick-up of the S relay, sufficient time would not be available prior to the ninth step for completing the several other actions, to be described shortly, which occur on the eighth step. It also follows that these long steps of the station code call are slightly longer than the other long steps of the code which are terminated, as will hereinafter be described, in the same manner as the long first step.

The opening of front contacts *b* to *f* of relay 23G opens the pickup circuits for relay 234S and other similar relays, 235S to 238S, of the same group, which are not shown. Relay 234S, however, remains energized over its previously described stick circuit. The opening of front contacts *h* to *k* of the relay 23G prevents the generation of long code elements on the fifth to eighth steps when front contacts *c* of the counting relays O5 to O8, inclusive, leading to wires 35 to 38, are successively closed.

The fifth to eighth steps are therefore short. Relay O1T is controlled during these steps over its previously described pulsing circuit, which is opened or closed at the respective back contacts *g* of the relays O5 and O7, and by the release of relay O2T to close back contact *b*. When relay O8 picks up, a circuit is completed from terminal B at front contact *a* of relay OLBP over wire 60, front contact *h* of relay O8, front contact *b* of relay SP, through the winding of the office chain repeat relay OCR to terminal N. Relay OCR therefore picks up on the eighth step, completing a stick circuit over its own front contact *a* to wire 60. Since relay OLBP remains picked up during an entire code, it is obvious that relay OCR, once picked up, will hold up during the remainder of the code.

The opening of back contact *a* of relay OCR disconnects the terminal B from wire 58 and hence from wires 63 and 64, as previously described. The closing of front contact *g* of relay OCR prepares a circuit from wire 89 extending over back contact *a* of relay O7, front contact *b* of relay O8, and back contact *b* of a relay RCL, through the winding of relay O1 to terminal N. This allows relay O1 to be operated as the next in order after relay O8. The pickup of relay OCR also, at its contacts *e* and *f*, closes the control circuits over the wires 61 and 62 to the front contacts *b* and *c* of the relay OLP. The energy from terminal B to hold the relays O1T and O2T energized hereafter is provided, as will be described, over front contacts of the various counting chain relays and wires 39 to 45 or wires 102 to 108 from the various control levers and push buttons on the control panels of the office machine.

When the selector relay 234S picks up, as previously described, its contact *k* transfers the stick circuit for the starting relay 234ST from a direct connection to terminal B to a circuit including wire 46 and extending from terminal B at back contact *f* of relay O8. It follows that the operated starting relay, such as relay 234ST, is released on the eighth step of the corresponding control code. This has the advantage of permitting the starting relay of any panel to be reenergized by a momentary operation of the associated starting button STB to store a second code for transmission even though the button is operated before the first code is completed. During the reception of an indication code, relay O8 and the relay S of the selected panel are also energized as in the case of the control code described, but when receiving, relay OM is not energized and its back contact *g* provides a connection from terminal B to wire 46 to prevent the release of a stored starting relay, such as relay 234ST, in response to the operation of relay O8.

Steps 9 to 15 of the code have now been rendered available for the control of seven of the devices at the selected station in accordance with the positions of the control levers or push buttons of the corresponding panel, such as the one shown on the left in Fig. 1*d*. When relay 234S picks up, terminal B becomes connected over contacts *g* to *k* of this relay and wires 95 to 99, inclusive, to the lever and push button contacts, and thence to wires 39 to 45 leading to front contacts *f* of relays O1 to O7. With relay OCR picked up, the front contacts *f* of the odd-numbered counting chain relays to provide connections over front contact *e* of relay OCR, wire 61, front contacts *e* and *b* in multiple, of relays O1L and OLP, respectively, and thence to the stick circuit for relay O1T. Relay O1T may thus be held energized until relays O1L and OLP release, thereby generating long odd-numbered code elements. The *f* contacts of the even-numbered counting chain relays provide connections over front contact *f* of relay OCR, wire 62, front contacts *c*, in multiple, of relays O2L and OLP, and thence to the stick circuit for relay O2T as previously described. Thus the relay O2T may be held picked up until relays O2L and OLP release, thereby generating long even-numbered code elements. These circuits are obviously available only during the second cycle of operation of the OLC unit primary counting relay chain, and during any operation of the extension primary counting chain.

Before describing the control by the various levers and push buttons in the coding action in the office, let us assume a set of conditions that the operator of the machine desires to accomplish. Referring to the outline of the trackway at the field station as shown in the top of Fig. 2*d*, we shall define that a train moving from right to left through the track arrangement is a westbound train and conversely, that a train moving from left to right is an eastbound train. Let us assume then that a westbound train is approaching this interlocking arrangement on track section 4AT and that the operator desires to move this train into the passing siding, that is, the track section 2BT. This will require that the switch 3W be reversed and that the signal 4L display a proceed indication for the movement. At the same time, we shall assume that an eastbound train is approaching on track section 2AT but that the dispatcher desires to hold this train on the main line at signal 2R, so that this signal must remain in its stop position, and switch 1W will be placed or held normal.

Referring now to Fig. 1*d*, particularly to the top portion of this figure where there is illustrated two panel sections of the control machine at the office with the track diagram at the top with track occupancy lights. The operator, to accomplish the desired moves of the trains through this interlocking arrangement, places the switch control lever 1SW in its left-hand or normal position, that is, the position as illustrated in the drawing. The switch control lever 3SW will be placed in its reverse or right-hand position. The signal control lever 4SG will be moved to its left position to clear the westbound signal. The signal control lever 2SG will remain in its center position to hold the signal 2R at stop. It is assumed that the switch heater control button WZB was previously operated to activate the switch heaters and remains in this position. However, the operator takes no action with the carrier changeover button CHB and the maintainer's call button MCB, which will remain with their contacts in the open position, as shown.

Having completed the necessary operations of the switch and signal control levers and the various traffic control push bottons, the operator then pushes the spring return start button 234STB. In our previous description we have shown what coding action occurred during the first eight steps after the operator has pushed the start button 234STB to close its contact *a* momentarily. On the next or ninth step of the control code, since the switch lever 1SW is normal, energy will be supplied from the battery to hold up the relay O1T to provide a long step in the code. The circuit for this may be traced from terminal B at front contact *g* of the relay 234S over wire 95, the normal or lefthand contact of switch lever 1SW, wire 39, front contact *f* of relay O1, front contact *e* of relay OCR, wire 61, front contacts *b* and *e*, in multiple, of relays OLP and O1L, respectively, and front contact *a* of relay O1T through the winding of this relay to terminal N. The relay O1T is thus held in its picked up position until the relay OLP releases to open its front contact *b* upon which the relay O1T releases to end the long ninth step of the code.

As it is assumed that the switch heater control button WZB has its contact *a* closed, the tenth step of the control code will also be long. Energy is supplied to hold the relay O2T picked up, this circuit being traced from terminal B at front contact *h* of relay 234S over wire 96, the now closed contact *a* of the button WZB, wire 40, front contacts *f* of relays O2 and OCR, wire 62, front contacts *c*, in multiple, of relays O2L and OLP, and thence over the previously described stick circuit for relay O2T. Again, when relay OLP releases during this long step to open its front contact *c*, the relay O2T is deenergized and releases. This allows the relay O1T to become energized and pick up to end the tenth step of the control code.

Since the switch lever 1SW is in its normal position so that its reverse contact is open, no energy is supplied during the eleventh step to hold up the relay O1T, which is then controlled only by its pulsing circuit. Thus when back contact *g* of the relay O3 opens, the relay O1T releases to end this eleventh step. It can be seen from an inspection of the drawing that since the push buttons CHB and MCB have not been operated so that their contacts *a* are open, and since switch lever 3SW is in its reverse or right hand position with its left hand contact open, the steps 12, 13, and 14 of the code are also short since no energy is supplied to hold up the relays O1T and O2T.

However, since the right hand contact of switch lever 3SW is closed, energy is supplied during the fifteenth step to hold up relay O1T to create a long step in the code. This circuit may be traced from terminal B at front contact *j* of relay 234S over wire 98, the right hand contact of switch lever 3SW, wire 45, front contact *f* of relay O7 and thence over the remainder of the circuit as traced during code step 9 to the winding of relay O1T. Again, when relay OLP releases to open its contact *b*, the relay O1T is deenergized and releases to end the fifteenth step of the code.

In the present C. T. C. systems in general use, in order to transmit the remaining control functions required to position the various devices at the field station to permit the desired movements of the trains, it would be necessary to transmit one more complete control code, consisting of sixteen steps, with a separate station selection code call. In my invention, however, these additional control functions may be transmitted by adding additional steps to the original code by the use of the extension counting chain relays.

In order to permit use of the relays of the extension counting chain to provide code steps 17 to 23, inclusive, a relay 16, shown on Fig. 1*c*, is provided to operate during the sixteenth step of the code to prepare circuits to initiate the action of the extension counting chain relays. The relay 16 thus operates on the sixteenth code step in a manner similar to the operation of the relay O8 on the eighth code step.

The circuit for energizing the relay 16 during the sixteenth step of the code may be traced from terminal B at normal contact *a* of relay OR over resistor R12, front contact *d* of relay OLBP, wire 90, back contact *a* of relay O6, front contact *b* of relay O7, front contact *h* of relay OCR, back contact *g* of relay O8, wire 87, through the winding of relay 16 to terminal N. When relay 16 picks up, it completes a stick circuit over its front contact *a* and back contact *b* of relay 17—21 to wire 90. Being similar to the eighth step, which is used as one of the station selection steps, the sixteenth step may be used to carry a control function. However, in the preferred form of my invention, no control function is assigned to code step 16. This maintains the similarity to the indication code in which, for reasons to be shown later, the sixteenth step can not be used to carry an indication function. Since no other need exists for making step 16 of a control code long in this preferred form illustrated herein, it is therefore always short. Relay O2T thus is allowed to release in its usual time and relay O1T then picks up to begin the seventeenth step.

The circuits are now prepared for the relay 17—21 to pick up as the next relay in order in the counting chain. As previously described, this circuit may be traced from terminal B at reverse contact *a* of the relay OR through resistor R11 and over front contact *b* of relay OLBP, wire 89, front contact *g* of relay OCR, back contact *a* of relay O7, back contact *b* of relay O8, wire 88, front contact *b* of relay 16, through the winding of relay 17—21 to the terminal N. Then, also as previously described, the relays 18—22, 19—23, and 20 follow in order in a manner similar to the relays of the primary counting chain in the OLC unit.

Since the signal control lever 2SG is in its normal position with both its left and right hand contacts open, no energy is supplied on code step 17 to hold the relay O1T energized to provide a long code step. Relay O1T then releases in its usual manner when relay 17—21 picks up to interrupt the pulsing circuit at its back contact *g*. However, since the signal control lever 4SG is in its left position, a circuit is completed to hold the relay O2T energized so that the code step 18 will be long. This circuit may be traced from terminal B at front contact *n* of relay 234S over wire 101, the left hand contact of signal lever 4SG, wire 103, front contact *c* of relay 18—22, back contact *d* of relay OCRA, wire 92, front contact *f* of relay OCR, wire 62, front contacts *c*, in multiple, of relays O2L and OLP, and thence over the stick circuit for the relay O2T. Again upon the release of the relay OLP to open its front contact *c*, relay O2T is deenergized and releases allowing the relay O1T to then pick up to begin the ninteenth step of the code.

Since the right contacts of both signal levers 2SG and 4SG are open, no energy is supplied during code steps 19 and 20 to hold up relays O1T and O2T to make these code steps long. Thus the relay O1T is controlled by its pulsing circuit during these code steps. It is to be noted that the relay OCRA also picks up during the twentieth step of the code, which will be described in more detail shortly. Therefore, the circuit for holding the relay O2T up during the twentieth step of the code bypasses the contacts of the relay OCRA as are used in the other similar circuits. To illustrate, the circuit from wire 105 goes directly from front contact *d* of the relay 20 to wire 92 and thence over the previously described circuit to hold up the relay O2T if energy is supplied to the wire 105. This is necessary since the relay OCRA is not energized until after relay 20 has picked up and it is necessary to establish and maintain the stick circuit for relay O2T from the time that relay 20 picks up.

As just mentioned, the relay OCRA is energized when relay 20 picks up and sticks up for the remainder of the code. The circuit for energizing relay OCRA, which includes the front contact *c* of relay 20, has been previously described. Pick up of the relay OCRA prepares circuits to allow relay 17—21 to follow the relay 20 in order. The relay OCRA also shifts the circuits from the control levers or push buttons to wires 91 and 92 from one set of contacts of the extension counting relays to a second set. For example, the contact *c* of the relay OCRA shifts the connection to wire 91 from front contact *c* of relay 17—21 to the front contact *d* of this relay.

The last control function required to field station 234 is carried by code step 20. Thus, additional code steps can serve no useful purpose, although the extension counting chain is prepared to repeat its cycle of operation to provide such additional steps. In order to save coding time, I provide means in my invention to terminate coding action in any control code as soon as the code steps no longer serve a useful purpose. So that the resetting action of the system will occur during line normal period, the stopping of the coding is restricted to the even numbered steps. Since the final step of the code is not available to transmit a control function, the final step of a control code is then the first even numbered step after all of the control functions have been transmitted. As will be described hereinafter, the ending of an indication code is similarly restricted. Thus in the control code here described the final step is the twenty-second step of the code. The twenty-first step of this code then will always be short since there is no control function to be carried on this step.

To accomplish this object, circuits are provided to energize the office code stopping relay OCS, shown in Fig.

1*b*, in multiple with the even numbered counting chain relay which corresponds to the last step of the code. The relay OCS, in effect, becomes the final relay in the counting chain during any coding action regardless of code length. Use is made of contacts of the station selector relay and adjustable connections in order to select different final steps for the various stations. Also, in order that the control and indication codes to and from the same station may be of different lengths if desired, it is necessary in the office to differentiate between such codes since the relay OCS must be energized to terminate the coding action in either code. Thus, for stations at which the control and indication codes have a different number of steps, a separate circuit to energize relay OCS must be provided for each code. Therefore, a repeater relay of the master relay, the relay OMP, must be used to select between the individual circuits over the station selector relay contacts for the control code and the indication code for any one station. The relay OMP is energized during the first step of any control code from terminal B at front contact *f* of relay OM over wire 83 through the winding of relay OMP to terminal N. This relay remains picked up during the entire control code since it repeats the relay OM.

For the control code here being discussed, the relay OCS must pick up at the same time as the relay 18—22, that is, on the twenty-second step of the code. When the line relay OR operates to its normal position at the beginning of the twenty-second step, a circuit is completed from terminal B at normal contact *a* of the relay OR over resistor R12, front contact *d* of relay OLBP, wire 90, back contacts *a* of relays 20 and 16 in series, front contact *h* of relay 17—21, front contact *e* of relay OCRA, thence to an adjustable connection and over front contact *b* of relay 234S, front contact *a* of relay OMP, wire 80, front contact *j* of relay OCR, wire 74, front contact *b* of relay OLB, wire 48, through the winding of relay OCS to terminal N. The relay OCS is thus energized and picks up. Although relay 18—22 also picks up in the usual manner, this action has no effect on the ending of the code.

When relay OCS picks up at the beginning of the twenty-second step, terminal B is disconnected from wire 56 at back contact *d* of relay OCS which deenergizes relay OM, and, before relay 17—21 releases to close its back contact *g*, the pulsing circuit to pick up relay O1T is interrupted at back contact *e* of relay OCS. Consequently, relay O1T remains released when relay O2T releases and relay OR then remains normal. Relay OM also releases. With relay OR remaining normal, the timing relays O2L, OLP, OLB, OLBP, and O1L release in that order. Relay OCS, which is held energized after relay 17—21 releases by a stick circuit from wire 90 including its own front contact *a*, wire 74, front contact *b* of relay OLB, and wire 48, becomes deenergized upon the release of relay OLB and releases. Release of relay OLBP disconnects terminal B from wire 60, thereby releasing relays OCR, SP, OCRA, and the operated selector relays such as 234S. Whereupon the apparatus is in condition to receive a new code. If any other office starting relay has been picked up to store a control code, such code will be initiated upon the release of relay O1L, this relay being last to release. The twenty-second step thus corresponds to the return of the line circuit to its normal closed condition, and in case of the transmission of successive codes, represents a line closed step which is materially longer than any such step occurring within a code.

We shall now consider the operation of the station apparatus of Figs. 2*a*, 2*b*, 2*c*, 2*d*, and 2*e* in receiving the control code just described. It will be understood that the line relay R at each station and the timing relays 1L, 2L, LP, LB and LBP operate in unison with the corresponding office relays. The counting relays at each station operate through the first eight steps in unison with the office counting relays, but only those at the selected station at which the station selector relay S is picked up are operated through their second and extension cycles.

On the first step of the control code a station receiver relay SR is selectively operated in response to the release of relay 1L due to the long character of this step. The circuit may be traced from terminal B at front contact *a* of relay LBP over back contact *d* of relay 1L, wire 163, back contact *b* of relay CR, front contact *c* of relay 1, and through the upper winding of relay SR to terminal N. Relay SR picks up and completes a stick circuit, from terminal B at front contact *a* of relay LBP, over wire 160 and front contact *a* of relay SR, then through resistor R14, the lower winding of relay SR, and resistor R15 to terminal N. The purpose of these two resistors will be described hereinafter.

As shown in Fig. 2*c*, the station coding unit contains a set of three selector relays, F1R, G2R, and S, which may be adjustably connected to respond to any one of the thirty-five code calls, the connections as shown here being arranged so that the relay S is responsive to the code call 234. As will be described hereinafter, the relays F1R and G2R each have a dual purpose in the coding action. In addition to being the first selector relay, the relay F1R is also used later in the coding action as the odd function registry relay. Similarly, the group selector relay G2R is used later in the coding action as the even function registry relay. In other words, these relays are used during the later part of the code to register the character of the odd and the even numbered code steps, respectively. As will become apparent from the following description, these relays are shifted from the initial purpose to the second purpose by the selection of the station relay S and by the energizing of the chain repeat relay CR.

The circuits for these relays as selector relays are generally similar to those for the office selecting relays already described. Circuits for the selector relays which respond on even-numbered steps extend from terminal B at front contact *a* of relay LBP, shown in Fig. 2*a*, over back contact *g* of relay 2L, wire 164, back contact *d* of relay CR, front contact *d* of relay SR, and thence over front contacts *d* of relays 2, 4, 6, and 8 to wires 122, 124, 126, and 128, respectively. As shown, an adjustable connection to wire 122 provides a circuit for energizing relay F1R on the second step, relay F1R then completing a stick circuit extending to terminal B over its own front contact *a*, back contact *c* of relay S, back contact *g* of relay G2R, wire 160, and front contact *a* of relay LBP. The circuits for the selector relays which respond on odd numbered steps extend from terminal B, at front contact *a* of relay LBP, over back contact *d* of relay 1L, wire 163, back contact *b* of relay CR, front contact *b* of relay SR, and thence over front contacts *d* of relays 3, 5, and 7 to wires 123, 125, and 127, respectively. As shown, an adjustable connection to wire 123 provides a circuit over front contact *e* of relay F1R for energizing relay G2R on the third step. The stick circuit for relay G2R extends to terminal B at front contact *a* of relay LBP over its own front contact *a*, back contact *d* of relay S, and wire 160. The opening of back contact *g* of relay G2R releases relay F1R. Similarly, an adjustable connection to wire 124 provides a circuit over front contact *e* of relay G2R for energizing relay S on the fourth step. Relay S completes a stick circuit which is connected directly to wire 160 over its own front contact *a*. The pickup of relay S also releases relay G2R.

It is to be noted that the various selecting relays F1R, G2R, and S are operated directly following the release of relay 1L or 2L when the apparatus is in the receiving condition as described, and consequently these relays are operated prior to the termination of the long step, thereby providing a margin to allow for variations in timing.

It is to be also understood that the relays F1R at the different locations may be connected to any of the wires 122 to 126, and the relays G2R to any of the wires 123 to 127 below the one to which the associated relay F1R is connected. It follows that, when the code call is 234, those relays F1R connected to wire 122 will respond to the second long step, those relays F1R and G2R connected to wire 123 will respond to the third long step, and those relays F1R and G2R connected to wire 124 will respond to the fourth long step, along with relay S at the selected station unit. However, the selection will be completed normally to pick up a relay S at one location only. At the other locations the counting relay operation terminates with the eighth step, and only the line relay R and the timing relays continue in operation through the remainder of the code.

Occasionally, a fourth long code step occurs during the station selection part of a control code. This may be due to a momentary line fault which blanks out a portion of the code, or to faulty operation of the coding equipment. Since, as previously explained, the relays F1R and G2R at more than one location may be selected during any code, a fourth long step may result in the selection of the S relay at one or more stations in addition to the desired station. For example, if code step 7 of the present code were also long due to a fault, the S relay at stations 237, 247, and 347 might also be energized and the station selection completed. Then all four stations would receive the transmitted control functions and a wrong and undesired operation of wayside devices would occur at stations 237, 247, and 347.

The system of the present application neutralizes this incorrect selection of a station. If any station receives a long code step not fitting its station code call pattern, the SR relay is shunted and releases. This opens the circuit to the function registry relays and occurs even though station selection has already occurred. For example, in the control code being described, if any of the remaining code steps prior to the ninth step are long so that relay 1L or 2L at station 234 releases, energy would be applied to one of the wires 125 to 128, inclusive. Since, at the station 234, these wires are connected by adjustable connections to wire 21, energy would then be applied to the left hand terminal of the lower winding of the relay SR. This shunts the lower winding of this relay and causes the stick circuit, previously described, to be ineffective, forcing the relay to release. This action is aided by the low level of energization in the lower winding of relay SR due to the current limiting resistors R14 and R15 placed in the stick circuit. The resultant opening of the front contacts *g* and *h* of this relay interrupt the circuits, described in detail hereinafter, to the function registry relays over the contacts *m* and *n* of the relay CR and front contacts of the various chain relays.

Thus, no function registry can occur due to the incorrect selection of a station because of a fourth long step occurring during the station selection portion of a control code. In fact, all stations, except the one properly selected by the three long station selection steps in any correct control code, are prevented from incorrectly registering a control function by the forced release of the relay SR during the first long step not fitting the station selection pattern at that particular station. In the example described above, whether or not the seventh step is long, the SR relays at the stations 237, 247, and 347 would be forced to release prior to code step 7. This action occurs on step 4 at station 237, on step 3 at station 247, and on step 2 at station 347. However, this release of relay SR at all non-selected stations during a normal control code has no bearing on the operation and may be disregarded. As will be shown later, this action at a station is unlike the office action during the receipt of an indication code when only a fourth long station selection step can cause a rejection of the indication code and force the system to reset.

At the selected station relay S prepares a pickup circuit, which is completed on the eighth step of the code, for a chain repeat relay CR. This circuit extends from terminal B at front contact *h* of relay S over wire 146, front contact *f* of relay 8, through the winding of relay CR to terminal N. When relay CR picks up, closing of its front contact *a* completes a stick circuit extending to terminal B over resistor R10 and wire 160. Also, closing of front contact *g* of relay CR completes a connection from wire 157 over back contact *a* of relay 7 and front contact *b* of relay 8 for effecting the operation of relay 1 next in order after relay 8. Thus the LC unit counting chain relays are ready to be used again, as previously described, to provide the code steps nine to fifteen. In addition, pick up of relay CR, by closing its front contact *h*, completes a connection over back contact *g* of relay 8 for energizing the extension counting chain relay A, in the code extension unit required at this station, on the sixteenth step of a code. This action will be more completely described hereinafter.

Front contact *k* of relay CR, when closed, shunts a resistor R6 which is in the stick circuit for relay 8. The resistor R6 is inserted in the stick circuit for the relay 8 to reduce the energization of relay 8 at the stations at which the relay CR is not picked up. Since the relay CR is picked up only when the station selector relay S is picked up, this means that at all stations except the selected station, the relay 8 will release more quickly because of this reduced energization. If it were not for the resistor R6 it might be possible in cases where the ninth step of the code is also short for the relay 8 to be held up throughout the ninth step and reenergized over its front contact *a* when the relay 1 releases at the beginning of the tenth step and closes its back contact *b*. This would give a long eighth step at that particular station. As was explained hereinbefore, it is possible for the F1R and G2R relays at a station to be picked up without the S relay also being picked up if the two relays are connected to the wires representing long steps in the code. If the relay 8 being held up creates a false long step, it might result in a station selection occurring; that is, the relay S being picked up, on the tenth step of the code. For example, the station 238 may be selected at the same time that the station 234 just described was selected. The counting chains at station 238 then would continue to follow, the coding action, although two steps behind in the code. However, by the use of the resistor R6, the energization of the relay 8 is held at such a low level that the release of relay 8 during a short ninth step is assured at those stations at which the CR relay is not picked up.

The ninth to the fifteenth, seventeenth to the twenty-third, and other similar steps of the control code are employed for the control of a group of function control relays, mostly of the magnetic stick type, in accordance with the position of the corresponding office levers. The manner of operation of these magnetic stick relays when energized with one or the other terminal positive is similar to that already described for relay OR and will not be repeated. Figs. 2*d* and 2*e* show a typical arrangement of such relays including switch control relays WS and signal control relays LHS and RHS. These relays may be used then to control track switches and associated groups of signals shown in the track plan at the top of Fig. 2*d*. One of the function control relays shown, the maintainer's call stick relay MCS, is not of the magnetic stick type but may be a relay of the ordinary neutral type provided, as shown, with stick circuits. The control of these relays by the coding apparatus will be discussed shortly.

It should be understood that the circuits by which the function control relays exercise control of the track switches and the signals form no part of my invention. These circuits may be similar to those described in connection with Figs. 8 and 9 of the previously mentioned Patent No. 2,229,249. For simplicity, the control arrangements are here indicated by dotted lines between the control relay and the apparatus it controls. It may be noted here that the circuits between the various track and wayside apparatus and the corresponding indication relays are also indicated by dotted lines.

The stick relays are operated to normal or reverse or are picked up or released by impulses supplied from the LC unit over wires 149 to 155, inclusive, and by impulses supplied from the extension unit over wires 217 to 223, inclusive. The supply of energy at the proper code step to these wires is controlled by the various chain relays over their front contacts. The supply of energy to the front contacts of the chain relays is controlled by the relay CR over its front contacts *m* and *n*. This limits the impulses of current supplied to the function control relays to the code steps 9 to 15 and later code steps. Also, as was previously mentioned, the supply of energy is interrupted by the opening of front contacts of relay SR if the station in question has been incorrectly selected due to a fault in the line circuit.

Circuits suitable for operating the function control relay stick relays in accordance with the long or short character of the code steps 9 to 15, 17 to 23 and other corresponding groups are obtained by the operation of the pair of registry relays F1R and G2R. These relays are converted from their original function as station selection relays to this second function of registry relays by operation of the relay CR closing its front contacts *b* and *d*. The closing of front contacts *c* and *d* of relay S also changes the stick circuits for these relays from the station selection circuits to the registry circuits.

If relay 1L releases on any odd-numbered step of the groups aforementioned, a circuit is closed from terminal B at front contact *a* of relay LBP over back contact *d* of relay 1L, wire 163, front contact *b* of relay CR, wire 129, and through the upper winding of relay F1R to terminal N. When relay F1R picks up, it is held energized for the duration of the next following even-numbered step by a stick circuit extending from terminal B at normal contact *a* of relay R over front contact *e* of relay LBP, wire 180, front contact *c* of relay S, and the front contact *a* and lower winding of relay F1R to terminal N. Relay F1R releases when normal contact *a* of relay R is opened at the beginning of the next odd-numbered step.

Similarly, if relay 2L releases on any one of the even-numbered steps of the code groups previously mentioned, relay G2R is energized over the circuit including terminal B at front contact *a* of relay LBP, back contact *g* of relay 2L, wire 164, front contact *d* of relay CR, wire 130, and the upper winding of relay G2R to terminal N. When relay G2R picks up, it is held energized for the duration of the next odd-numbered step during which relay R is reversed by a stick circuit extending from terminal B at reverse contact *a* of relay R over wire 171, back contact *e* of relay CS, wire 172, front contact *b* of relay LBP, wire 181, front contact *d* of relay S, and front contact *a* and lower winding of relay G2R to terminal N. Relay G2R releases when the reverse contact *a* of relay R is opened at the beginning of the next even-numbered step.

The circuits which the contacts of relays F1R and G2R provide for the control of the stick relays are of a variety of types, one of which is illustrated by the circuits for the magnetic stick relay 1WS, which relay is controlled in accordance with the position of the switch lever 1SW of Fig. 1*d*. When lever 1SW is normal, as assumed in the present illustration, the ninth step of the control code is long and the eleventh step short. When lever 1SW is reversed, the ninth step is short and the eleventh step long. When lever 1SW is normal, relay F1R is picked up on the long ninth step since relay 1L releases. Then, when relay R is operated to normal to begin the tenth step, its contact *a* connects terminal B to the stick circuit for relay F1R to hold it picked up, and also connects, over the same circuit, terminal B to front contact *b* of relay F1R to complete a circuit momentarily over wire 184, front contacts *g* and *m* of relays SR and CR, respectively, front contact *e* of relay 1, wire 149, through the upper winding of relay 1WS, and front contact *a* of a locking relay LR to terminal N. The direction of current flow in this described circuit would be from left to right in the upper winding of relay 1WS so that the contacts of this relay would be operated to their left-hand or normal position. Relay 1WS is thus energized, in the normal direction, in multiple with relay 2 by an impulse of current which is terminated upon the release of relay 1. Relay F1R is not operated on the eleventh step since the relay 1L remains up. Thus, although at the beginning of the twelfth step, wire 184 is connected momentarily over front contacts *g* and *m* of relays SR and CR, front contact *e* of relay 3, wire 151, the lower winding of relay 1WS, and front contact *a* of relay LR to terminal N, the relay 1WS is not energized because, with relay F1R in its released position, wire 184 is disconnected from terminal B.

Similarly, if lever 1SW is reversed so that the ninth step is short, relay F1R remains released and relay 1WS is not operated on the tenth step. Then, when the long eleventh step is reached, relay F1R picks up so that relay 1WS receives an impulse of current through its lower winding in the direction right to left to operate it to its reverse position during the twelfth step.

Another type of control circuit is illustrated by the one for relay WZS, which is controlled by the office push button WZB so as to be operated to normal or reverse in accordance with the short or long character of a single code step. If the tenth step is short so that relay 2L remains up, relay G2R is in its released position when relay R is operated to the right to begin the eleventh step. A circuit is then closed momentarily from terminal B at reverse contact *a* of relay R over wire 171, back contact *e* of relay CS, wire 172, front contact *b* of relay LBP, wire 181, front contact *d* of relay S, back contact *b* of relay G2R, wire 229, through the winding of relay WZS, wire 150, front contact *e* of relay 2, front contacts *n* and *h* of relays CR and SR, wire 185, back contact *c* of relay G2R to terminal N. It can be seen that the direction of current flow through the winding of relay WZS is such as to operate or to hold this relay in its normal position. If the tenth step is long, as assumed during the control code, relay G2R is picked up, and held energized by relay R for the duration of the eleventh step. Its contacts *b* and *c* then reverse the direction of the flow of current through the relay WZS, so that it will be operated to its reverse position. The circuit for the control of relay CHS on step 12 is similarly controlled by relay G2R.

In the foregoing two types of circuits for controlling magnetic stick relays are described. In the first type, as illustrated by the circuit for relay 1WS, the magnetic stick relay is energized only if a corresponding register relay F1R or G2R is picked up in response to a long step, and is nonresponsive if the step is short. In the second type, as illustrated by the circuit for relay WZS, the magnetic stick relay is energized in one direction if the assigned step is long and in the opposite direction if that step is short. A third type, not shown, is also available and may be obtained by connecting any of the stick relays to wire 225 or 228 leading through back contact *a* of relay F1R or G2R, respectively, instead of to wire 226 or 229. If we assume that one terminal of relay WZS is connected to wire 228 instead of to wire 229, for example, its other terminal being connected to wire 185 through the circuit previously described, it will be seen that relay WZS will be momentarily energized by relay R only when the assigned step is short, so that relay G2R remains released. It follows then that any of the magnetic stick relays may be arranged to respond to a short step but to be nonresponsive when the step is long.

A fourth type of circuit for controlling the stick relays is illustrated by the circuit associated with the relay MCS on Fig. 2*d*. The relay MCS is two-winding, neutral relay in which the upper winding, as shown, is of less resistance than the lower winding so that, when energized from the same source, more current will flow through the upper winding than will flow through the lower winding. The position of relay MCS is controlled by the office push button MCB, shown on Fig. 1*d*, the field circuits being arranged so that the relay is picked up when the code step 14 is of a long character, in which case the relay G2R will be picked up. At the beginning of the fifteenth step of the code, relay MCS is energized through its upper winding by the circuit extending from terminal B, at reverse contact *a* of relay R, over wire 171, back contact *e* of relay CS, wire 172, front contact *b* of relay LBP, wire 181, front contact *d* of relay S, front contact *b* of relay G2R, wire 185, front contacts *h* and *n* of relays SR and CR, respectively, front contact *e* of relay 6, wire 154, through the upper winding of relay MCS, and over its own back contact *b*, wire 230, and front contact *d* of relay G2R to terminal N. As relay MCS picks up, the connection to terminal N is maintained over its continuity contact *b* until the new connection to terminal N at front contact *c* of relay G2R is completed over wire 229 and front contact *b* of relay MCS. Closing of front contact *a* of this relay completes a direct stick circuit from terminal B through the lower winding to terminal N. The maintainer's call signal, here indicated as an electric light, is energized over front contact *c* of the relay.

When it is desired to release the relay MCS from its picked-up position, a short fourteenth code step is transmitted from the office so that the relay G2R is not picked up during this step. At the beginning of the fifteenth step of the code then, a circuit is completed from terminal B, at reverse contact *a* of relay R, over the previously described circuit to contact *b* of relay G2R, but since this relay is in its released position, the circuit is over the back contact *b* of the relay, wire 229, front contact *b* of the relay MCS, through the upper winding of the relay in the direction opposite to that of the current flowing in the lower winding from the stick circuit, then over the previously described circuit, in the reverse order, including wire 185, to terminal N at back contact *c* of relay G2R. The energization of the relay by the current flowing in the upper or operating winding overpowers the current flowing in the lower or stick winding and the relay is forced to release. Upon opening of the front contact *b*, the operating circuit is interrupted, since front contact *d* of relay G2R is open to disconnect terminal N from wire 230, so that relay MCS does not pick up again when the stick circuit is also interrupted. When a relay such as MCS is on an odd-numbered step of the code, the control circuits are over the wires 226 and 227 from the contacts *b*, *c*, and *d* of the relay F1R.

Since the control code transmitted by the office to this station 234 is 22 steps in length, it is obvious that additional steps must be provided in the coding action at this station to match the length of the transmitted code. This is accomplished in a manner similar to the action of the office coding unit, that is, extension relays are added to the counting chain to provide these additional steps. Code steps are added in groups of eight, although under certain conditions only a fraction of these available steps may be used. For each possible eight steps that are added to the code, six additional relays are required. Of these six relays, only five are added to the counting chain, the sixth relay being a chain repeat relay. In order to provide eight steps, part of the extension counting chain is used twice through its cycle of coding action. That is, the three relays 1A, 2A, and 3A are used twice so that with the two remaining counting chain relays, eight code steps are added by the extension group. The chain repeat relay, the relay CRA, is used at the end of the first cycle of the extension chain in conjunction with relay 4A in a manner similar to the relay CR being used with relay 8 in the LC unit.

In my invention, I include the six relays in a unit called an extension unit, one of which is shown in Fig. 2*c*. All such extension units are identical with the appropriate wire leads brought out to terminals for the purpose of making such adjustable connections as are desired to extend the code or to terminate it on a selected even-numbered code step. As mentioned, each extension unit in a field location adds eight steps to the coding action of the regular LC unit, whether the code is a control or indication code. During an indication code, only seven of these code steps are available to carry indication functions. For this reason, as was hereinbefore discussed in connection with the office coding action, preferably only the first seven of these steps are used to carry control functions.

Relay A in the extension unit is picked up on the sixteenth step of the code in a manner similar to the pickup of relay 8 of the LC unit, but the first A relay checks that relays 7 and CR are up and that relay 8 is down. Since relay CR picks up after the station selector relay S has picked up, the station must have selected in order for relay A to be energized. When relay R goes normal at the beginning of the sixteenth step of the code so that energy is applied to wire 158, the circuit is extended to energize the relay A over back contact *a* of relay 6, front contact *b* of relay 7, front contact *h* of relay CR, back contact *g* of relay 8, wire 204, through the winding of relay A to terminal N. Closing of front contact *a* of relay A establishes a stick circuit in the usual manner over back contact *b* of relay 1A and wire 205 to wire 158. The opening of back contact *b* of relay A interrupts the stick circuit for relay 7 which then releases. This, of course, interrupts the pickup circuit for relay A, as previously described, but the stick circuit retains the relay as in the manner for all of the chain relays. The stick circuit for relay A is opened during the next code step when back contact *b* of the relay 1A is opened.

The extension unit relays now follow the code according to the operation of the relay R as has been previously described, relay 4A picking up on the twentieth step of the code. During this step, if the operation has been correct, the relay CRA also picks up, energy being supplied from wire 160 over front contact *c* of relay 4A through the winding of relay CRA to terminal N. The pickup of relay CRA establishes a stick circuit over its own front contact *a* to wire 160 and this relay then remains picked up for the rest of the coding action. Pickup of relay CRA also prepares circuits to pick up the relay 1A again as next in order after relay 4A. The relays 4A and CRA thus function in a manner similar to the function of the relays 8 and CR in the LC unit at the end of the first cycle of the LC unit counting chain action.

Relays 1A to 3A, in order, then repeat their cycle of operation. It is obvious that additional extension of the code is possible by adding another extension unit, the A relay in the number 2 unit picking up on the twenty-four step. The circuit for the number 2 relay A would check, in the number 1 unit, the relays 3A up, 4A down, and CRA up to assure that the twenty-fourth step was the proper one for this relay to be energized.

The control of the function stick relays which are assigned to the code steps 17 to 23 is similar to that already described for those relays assigned to code steps 9 to 15. During steps 17 to 20, circuits are successively completed over front contacts of relays 1A to 4A and wires 217 to 220, respectively, to supply energy to the function stick relays controlled during the corresponding code steps. The energy is supplied to these circuits alternately over contacts of relays F1R and G2R and wires 186 and 187. Depending upon the type of control used, the circuits for these function stick relays are further completed, as previously described, over wires 225 to 230 and other contacts of relays F1R and G2R. It is to be noted that the supply of energy to wires 186 and 187 is interrupted if relays CR and SR are not picked up. During code steps 21 to 23, the supply of energy from wires 186 and 187 is shifted by contacts of relay CRA to circuits completed over other front contacts of relays 1A to 3A and wires 221 to 223. Since, in the preferred form of my invention, code steps 16 and 24 are not used to carry control functions, contacts of such relays A as are required at station for code extension are not used to control the supply of energy to any of the function stick relays.

For example, the relays 2LHS and 2RHS are controlled by relay F1R in a manner similar to that previously described for relay WZS, each by a momentary impulse at the beginning of the step following its assigned code step, that is, the step following the step, the character of which governs its operation. Let us assume that the seventeenth step of a control code, which is assigned to control the relay 2LHS, is long, so that the relay F1R is picked up. At the beginning of the eighteenth step, then, a circuit is completed from terminal B at normal contact *a* of relay R over front contact *e* of relay LBP, wire 180, front contact *c* of relay S, front contact *b* of relay F1R, wire 184, front contacts *g* and *m* of relays SR and CR, wire 187, back contact *h* of relay CRA, front contact *e* of relay 1A, wire 217, through the upper winding of relay 2LHS from right to left, wire 226, and front contact *c* of relay F1R to terminal N. Relay 2LHS would therefore operate to its reverse position. If the seventeenth step is short so that the relay F1R remains released, its contacts *b* and *c* reverse the direction of current flow through the upper winding of relay 2LHS and this relay would remain in or would operate to its normal position. The circuits for the relay 2RHS, controlled by the character of the nineteenth step, are obvious from a study of the drawings. It should be noted that the relays 2LHS and 2RHS are also provided through their lower windings with a local restoring circuit which functions in a manner hereinafter described to energize these relays in the normal direction in response to the release of the track relay 1TR.

The relay 4LHS is controlled in a similar manner by relay G2R over wire 184, front contacts *h* and *n* of relays SR and CR, wire 186, back contact *j* of relay CRA, front contact *e* of relay 2A, and wire 229. Since it was assumed during the discussion of the transmission of the control code that the signal control lever 4GS was in its left-hand position so that code step 18 was long, the relay 4LHS is operated to its reverse position. The relay 4RHS is also controlled by relay G2R over wire 186 and a front contact *f* of relay 4A. It is to be noted, however, that in this circuit it is front contact *j* of the relay CRA that supplies energy to the front contact of the relay 4A. This is necessary since the impulse of current for operating relay 4RHS is received during the twenty-first step, at which time the relay CRA has already been picked up and is stuck up as previously described.

Since the office coding unit terminates its action and resets on the twenty-second step of the code, the field station coding unit must do likewise. When the twenty-second step of the control code is reached, the line relays R remain steadily energized and the various timing relays L at each station release in unison with the corresponding office relays. At the selected station, as shown in Fig. 2, the release of relay LBP releases the relays CR, CRA, SR, and S, as well as whichever one of the counting chain relays is energized. In the present case, this would be the relay 2A. Release of the relay S places the apparatus in condition to receive a new code. Relay 1L is the last of all of the relays to release, and the release of this relay places the apparatus in condition to initiate the transmission of an indication code, assuming that the relay SS, hereinafter described, is not energized.

This completes the transmission of a control code from the office and the receipt at the selected field station of the same control code. As has been described, the desires of the operator of the control machine at the office have now been fulfilled. The function control stick relays have been operated in response to the receipt of the control code to cause the switch 3W to reverse and the signal 4L to display a proceed indication to permit the westbound train to travel through the interlocking over the route desired by the operator. In addition, the signal 2R is at stop to halt the eastbound train assumed to be approcaching on track 2AT. It is to be understood that, although the operation of the control stick relay permitted the signal 4L to display a proceed indication, the actual proceed aspect as displayed by this signal is also controlled by the wayside conditions including the occupancy or nonoccupancy of the track in advance along the route set up for the train and also the complete operation and locking in the reverse position of the switch over which the train must pass. Local checks are also accomplished through various circuits to assure that the opposing signals at the locations are in the stop position, that is, that the signal 4R is at stop as compared with the signal 4L displaying a proceed indication, and that the signal 2RA is also at stop since switch 1W remains normal. Various other circuits and checks are also made to completely assure that all safety conditions have been met over the route for which the signal indication governs.

The station coding apparatus of Fig. 2 is also adapted to transmit indication codes which the office apparatus is adapted to receive. Each indication code comprises an even number of code steps, of which the first is relatively short. The second to eighth steps are arranged in different combinations of three long and four short steps to operate various selection relays F, G, and S at the office and station in accordance with the different code calls already described. The ninth to fifteenth steps are then used for the transmission of seven indication functions from the station. It is a stated object of my invention to enable the station coding unit to extend the action of its counting chain, in a manner similar to that of the office coding unit, to furnish additional code steps to transmit all indications from a station during one code. Thus, the sixteenth, twenty-fourth, thirty-second, and other similar code steps are used to extend the coding action by preparing circuits to use extension counting chains which provide code steps seventeen to twenty-three, twenty-five to thirty-one and similar other groups for transmitting indications to the office. The extension code steps are not available during an indication code to transmit a function, since these steps in an indication code must be of a necessity always be long code steps.

The ninth to fifteenth, seventh to twenty-third, twenty-fifth to thirty-first, and other similar groups of code steps may, however, be made long or short to indicate the condition of movable devices at the station. The character of these code steps is recorded initially at the office by a group of intermediate registry relays 1R to 7R, which are reused during each extension cycle of the counting chain. The recorded characters of the various groups of code steps are transferred to corresponding groups of indication relays K at the selected office panel during the sixteenth, twenty-fourth, and other extension steps of the code.

As has been previously stated, it is also an object of my invention to permit the selection of the next even-numbered code step, after the actual number of steps required to transmit all the desired indications have been sent, as the final step of the indication code. Thus, adjustable connections and circuits are provided, as will be described hereinafter, to allow the termination of both the station and the office coding action on that selected step.

A typical group of such station devices is shown in Figs. 2*d* and 2*e*, illustrated as a group of indicating relays including track storage relays TKSR, approach relays AR, normal and reverse switch repeating relays NWP and RWP, and signal control relays LHR and RHR. The control of these relays by the track conditions and wayside apparatus positions may be in any conventional and well-known manner. For simplicity, I have shown these controls by dotted lines as they form no part of my invention. The switch position repeating relays are shown as being energized over circuits completed by a movable connector which in turn is directly controlled by the position of the switch points.

The station apparatus is arranged to initiate an indication code automatically in response to a change in position of any of the indicating relays. Each such code is stored for transmission, when the line circuit becomes available, by the release of a station starting relay ST, shown in Fig. 2*c*. This relay ST is normally held energized over a stick circuit extending from terminal B at back contact *e* of relay S over wire 182, back contact *c* of relay LB, wire 183, its own normal contact *a* and the winding of relay ST, wire 216, a front or back contact *b* of each of the several indicating relays on Fig. 2*d*, wire 224, and a front or back contact *b* of each of the several indicating relays on Fig. 2*e*, to terminal N. In order to assure the release of the starting relay during the brief period the circuit is open during the transit of the contact *b* of an indicating relay from one position to the other, without requiring a special adjustment on these contacts, a sensitive relay of the biased type is used as the starting relay. In addition, an inductive reactor 190 is connected across the terminals of the relay winding. The energy stored in the coil of the reactor 190, when relay ST is energized, provides a source of induced current for operating relay ST to its reverse position very quickly, to open its stick circuit, in response to any sudden increase in circuit resistance due to the movement of one of the indicating relay contacts *b*. This release action will occur even though the time such an indicating relay contact is actually open is very nearly zero. Thus, no special adjustment of these contacts is required.

During any coding action from the line circuit, the picking up of the relay LB maintains the stick circuit for relay ST from the battery at front contact *c* of the relay LB. Since the contact *c* of relay LB is a continuity type contact, the stick circuit is continuously maintained as the relay picks up or it releases. If the particular station 234 has not been selected by the code, relay LB eventually releases to restore the stick circuit as described in the preceding paragraph. If station 234 has been selected by a control code so that relays S and SR have been picked up, the relay LB will also remain picked up until the final step of the coding action. As previously described during the description of the receipt of a control code, relay LB releases first, that is, before relay S and SR have released. The stick circuit for the relay ST then may be traced from the left-hand winding terminal over front contact *a* of relay ST, wire 183, back contact *c* of relay LB, wire 182, front contact *e* of relay S, wire 236, and front contact *c* of relay SR to terminal 241. Since, as shown in the drawings, there is no energy supplied to this stick circuit at this time, an indication code is automatically stored at the station upon the receipt of any control code since the relay ST would be released. If automatic recall is not desired, that is, if the transmission of an indication code automatically upon the receipt of a control code at a station is not desired, terminal 241 is connected to the normal contact *a* of the relay R over a wire such as wire 159 shown connected to back contact *c* of the relay SR. As previously described, relay R is in its normal position during the last step of the control code and the relay ST would thus be retained until the relay S releases to restore the original stick circuit. Since contact *e* of relay S is also a continuity contact, there would be no interruption of the energy supplied to relay ST in this case. If the relay SR should release before relay S, the wire 159 would maintain the stick circuit for relay ST until the release of relay S. The connection over wire 159 from the normal contact *a* of relay R is also used, as will be explained later, during the normal reset of the LC unit at the station at the end of an indication code. An indication code may also be initiated, as will be explained hereinafter, by transmission of a recall code from the office location by means of which the relay ST may be released upon the opening of front contact *c* of relay LB.

I shall next describe the transmission of an indication code by the apparatus shown in Fig. 2. It will be assumed that this indication code is initiated by the movement of the previously mentioned westbound train past the signal 4L, which was displaying a proceed indication, into the track section 3T, which causes the track relay 3TR to be shunted and to release. It will also be assumed that at the time of the transmission of the indication code the westbound train is still occupying the track section 4AT. Positions of other apparatus are as established by the previously described control code.

The opening of front contact *a* of track relay 3TR opens the normally closed stick circuit for the track storage relay 3TKSR, extending from terminal B at front contact *a* of relay 3TKSR, and also opens the pick-up circuit extending from terminal B at front contact *b* of a relay MSTP. The relay 3TKSR releases and its contact *b* opens the stick circuit for relay ST, causing that relay to also release, in the manner previously described. Release of the relay ST opens its normal contact *c*, interrupting the pickup circuit for the relay MSTP, which is a repeater relay of the starting relay ST and also of the master relay M. The pickup circuit for the relay MSTP may be traced from terminal B at back contact *f* of relay M over wire 177, normal contact *c* of relay ST, wire 238, and through the winding of relay MSTP to terminal N. Thus, it is to be seen that the relay MSTP cannot pick up again once released until the relay M is released, during the final step of the indication code. It follows then that the relay 3TKSR also cannot pick up again until the final step of the indication code. In other words, the relay 3TKSR remains down until the indication of track occupancy has been transmitted to the office. This is necessary in order to insure that the track occupancy indication will be transmitted since track sections such as 3T are very short. Thus, if the line circuit is not immediately available for transmission of the indication code, the train may have passed out of the track section 3T and the relay 3TR picked up before the indication code can be sent. However, as described, the track storage relay 3TKSR will store the indication until it can be transmitted to the office. At the location shown the relay 1TKSR remains stuck up over its associated track relay front contacts.

If the line circuit is available, a starting circuit is closed extending from terminal B at reverse contact *b* of relay ST over back contact *b* of relay SS, wire 147, front contact *b* of a relay RP, back contact *a* of a thermal cutout relay COR, back contacts *b* of relays 1L and 2L, respectively, through the winding of relay M to terminal N. Relay M picks up, completing a temporary stick circuit, over its front contact *a*, wire 166, back contact *f* of relay SR, wire 167, and back contacts *e* and *c* of relays LB and LBP, respectively, in multiple with the back contacts *b* of relays 1L and 2L. Contacts *b* and *d* of relay M reverse the connection of relay R to the line wires Y and Z. Front contact *d* of relay M also closes a low impedance shunt path from line Y over back contact *f* of relay LBP to line Z. Front contacts *b* and *c* of relay M connect the capacitors of the low pass filter LPF directly across the lines so that during transmission its connections correspond to those of the corresponding low pass filter at the office. Normally the impedance across the lines presented by the station apparatus is materially increased, as is desirable, by inserting a high resistance in series with the one capacitor and disconnecting the other from line circuit.

Pickup of relay M also completes the circuit for energizing the relay 1T. This circuit may be traced from terminal B at reverse contact *b* of relay ST over back contact *b* of relay SS, wire 147, front contact *b* of relay RP, back contact *a* of relay COR, back contact *c* of relay LBP, back contact *f* of relay LB, front contact *e* of relay M, back contact *b* of relay 2T through the winding of relay 1T to terminal N. The pickup of relay 1T begins the first code step. Also the closing of front contact *c* of the relay 1T completes the circuit for energizing relay 2T and this relay also picks up.

When the line circuit is shunted by relay M, the associated line relay R releases. Also the increase in current delivered by battery 77 at the office causes the transformer RT, shown in Fig. 1*a*, to deliver an impulse to operate relay OR to its reverse position substantially in unison with the relay R. Relay R operates the associated timing relays and relay 1. Closing of front contact *e* of relay LB transfers the temporary stick circuit for relay M, to terminal B at front contact *d* of relay 1T, over wire 178, back contact *g* of relay S, and wire 179.

At the office the relay OR operates the timing relays OL, the relay O1, and relay E, as on the first step of a control code. In addition, a circuit is completed from terminal B at reverse contact *a* of relay OR over back contact *h* of relay OLBP, back contact *b* of relay OM, wire 65, back contact *c* of relay OCS, wire 66, through the winding of relay PC, wire 17, and the normally closed contact of cancel button CB, shown in Fig. 1*c*, to terminal N. Relay PC therefore picks up and its contacts *b* and *d* reverse the polarity of the current delivered to the line, while its front contact *e* completes a circuit energizing a slow release repeating relay PCP.

The sudden variation in the line current due to the operation of relay PC in pole changing the polarity of the line current is devoid of effect upon relay OR for two reasons. The first reason is that, when relay PC picks up, the secondary of transformer RT is momentarily short circuited over the front contact *c* of relay PC and back contact *c* of relay PCP. Secondly, the lower winding of relay OR is energized in the reverse direction over the circuit extending from terminal B, at back contact *b* of relay PCP, over front contact *f* of relay PC and back contacts *e* of relays OM and OT, through the lower winding of relay OR to terminal O.

Relay PC is held energized by a stick circuit from terminal B, at its own front contact *a*, over front contact *h* of relay OLBP, and thence over the remaining portion of the pickup circuit for this relay as previously described, terminating at terminal N at the normally closed contact of the cancel button CB. Relay PC thus remains in its picked-up position until relay OCS picks up on the final step of the code.

The shunt across the line wires Y and Z applied by relay M at the transmitting station, as previously described, will also short circuit and consequently release line relays R at stations more remote from the office. If the transmitting station is at a considerable distance from the office, it may be that the voltage across the line, which varies from nearly the full voltage of battery 77 at the office to substantially zero at the point where the shunt is applied, will remain sufficient to keep the relays R picked up at stations near the office. These relays, however, will be released by the reversal of line polarity by relay PC. It follows that all line relays R release substantially in unison when any relay M picks up to initiate a code, each relay R operating its timing relays L and first counting relay 1. At each station at which relay M is not operated, relay R remains released, holding relay 2L energized but allowing relay 1L to release to pick up relay SR and then relays LP, LB, LBP, 1, and SR release in that order.

At the transmitting station the closing of front contact *f* of relay LB completes the pulsing circuit for relay 1T, this circuit extending from terminal B at back contact *b* of relay CS, over wire 199, back contacts *g* of relays 3A and 1A, wire 196, back contacts *g* of relays 7, 5, 3, and 1, wire 168, front contact *f* of relay LB, front contact *e* of relay M, back contact *b* of relay 2T and through the winding of relay 1T to terminal N. When the pulsing circuit functions as a stick circuit for relay 1T, the back contact *b* of relay 2T is replaced by front contact *b* of relay 2T and front contact *a* of relay 1T in series.

Relay 1T transmits a code by the operation of its contact *b*. This contact *b* of relay 1T is rendered effective for transmitting the indication code when relay LBP picks up on the first step of the code to open its back contact *f* which is in parallel with front contact *b* of relay 1T. Each time relay 1T picks up, a low resistance shunt path is closed from line Y over front contact *b* of relay T and front contact *d* of relay M to line Z. At the same time, the circuit for relay R which extends from the now positive wire Z over front contact *d* of relay M, back contact *b* of relay 1T, resistor R3, through the winding of relay R, then over front contact *b* of relay M to wire Y is opened by relay 1T at its back contact *b*, thereby releasing relay R more quickly than if it were merely short circuited by the closing of front contact *b* of relay T.

Although the first step of an indication code is short in comparison with the first step of a control code, it is slightly longer than other short steps. This first step begins when the relay M picks up, closing its front contact *d*, which is slightly before relay 1T picks up, and ends when the relay 1T is released by the picking up of relay LB to open, at its back contact *f*, the initial stick circuit for relay 1T, which occurs shortly after the relay 1 picks up to open the normal pulsing circuit for relay 1T.

The response of the apparatus at the transmitting station, as required to allow the transmission to continue, is also dependent upon the conditions at the office. Since the connections of relay R to the line have been reversed by relay M, relay R picks up to begin the second step only if relay PC has been picked up to reverse the polarity of the line current, thus indicating that the office apparatus is in the proper receiving condition with relay OM released.

The code call steps of the indication code are generated by relays 1T and 2T in the same manner as by the relays O1T and O2T during the control code already described. Assuming this to be 234, the second step is prolonged by the closing of a holding circuit for relay 2T. This circuit may be traced from terminal B at back contact *f* of relay S over back contact *f* of relay F1R, an adjustable connection, wire 132, front contact *c* of relay 2, wire 235, front contact *a* of relay 2T, back contact *c* of relay 1T, through the winding of relay 2T to terminal N. On the second step, relay F1R picks up in response to the release to the release of relays 2L and LP, the circuits being similar to that described for the same relay during the receipt of the control code at this station. It will be noted, however, that the front contact *d* of relay SR in the previously traced circuit is now replaced by back contact *d* of the relay LP. Thus the pickup of the relay F1R is delayed beyond the similar pickup of the relay during the second step of the control code. This is necessary to alow for variations in timing between this station and the office coding unit, since it is the pickup of the relay F1R which initiates the action to end the length of this second code step. That is, when relay F1R picks up, its back contact *f* interrupts the holding circuit for the relay 2T which then releases. Release of the relay 2T allows relay 1T to be energized over its pulsing circuit and to pick up to end the second step.

The third step of the code is then prolonged by the operation of the holding circuit for relay 1T. This circuit extends from terminal B at back contact *f* of relay S over back contact *f* of relay G2R, an adjustable connection, wire 133, front contact *c* of relay 3, wire 234, front contact *a* and the winding of relay 1T to terminal N. The relay 1T is then held up until relay G2R picks up to open its back contact *f*. The circuit for energizing relay G2R is again similar to the circuit for energizing this relay during the control code. Once again the front contact *b* of relay SR is replaced by a back contact *b* of the relay LP so that the pickup of the relay G2R is delayed to provide sufficient time for this code step. Relay 1T then releases to end the third step and to begin the fourth step.

Like the second, the fourth step is prolonged by the operation of a holding circuit for relay 2T. The circuit for generating this fourth long step is similar for that for the second long step except it includes only the back concontact *f* of relay S and then wire 134 and front contact *c* of the relay 4. During the fourth step, the station selector relay S picks up in response to the release of relays 2L and LP, the circuit being similar to that for the relay F1R. The relay S in picking up completes a stick circuit, over its own front contact *a* and wire 160, from terminal B at front contact *a* of relay LBP. The opening of back contact *f* of relay S allows relay T2 to release which in turn allows the relay 1T to pick up to begin the fifth step.

When relay S picks up, its contact *g* transfers the stick circuit for the relay M from the second temporary circuit to terminal B at back contact *b* of relay CS over wire 199. This stick circuit then continues until the relay CS picks up on the last step of the indication code to release the relay M, as will be described hereinafter. In connection with the second temporary stick circuit for the relay M over wire 179 to front contact *d* of relay 1T, it is to be noted that when relay 1T released during the normal operation of the first steps of the indication code, the relay R was in its normal position so that energy was supplied over normal contact *a* of the relay R and back contact *d* of relay 1T to wire 179 to hold the M relay energized. If, when the relay 1T had released, the relay R wire, for any reason, not energized, the relay M would be deenergized and would release to interrupt the indication code. This would be appropriate since with relay 1T down and relay R released, the conditions on the line circuit or at the office would not be proper for receiving the indication code.

Since the pulsing circuit for relay 1T functions in the same manner as that for the relay O1T, already described, it will be clear that if relay S is operated on the fourth step, the fifth to eighth steps will be short steps generated by the operation of relay 1T over its normal pulsing circuit, in conjunction with the release of relay 2T. Relay CR is energized during the eighth step through the circuit extending from terminal B at front contact *h* of relay S over wire 146, front contact *f* of relay 8, and the winding of relay CR to terminal N. Relay CR picks up, completing its stick circuit, extending to terminal B at front contact *a* of relay LBP over resistor R10 and wire 160, by closing its own front contact *a*.

When relay CR picks up, it completes a pickup circuit for the starting relay ST, extending from terminal B at front contact *f* of relay M over wire 232, front contact *c* of relay CR, front contact *e* of relay 8, wire 206, through the winding of relay ST and reactor 190 in multiple, wire 216, and thence over the front or back contacts *b* of the various indicating relays, shown on Figs. 2*d* and 2*e*, and wire 224 to terminal N. Relay ST then picks up and establishes a temporary stick circuit extending from terminal B at front contact *c* of relay LB over wire 183 and its own normal contact *a* through the relay winding and reactor 190 and thence, as traced above, to terminal N.

The pickup of the relay CR on the eighth step also establishes circuits to render the next seven steps of the code available for indicating the positions of the wayside apparatus or the movable devices previously discussed. The relay CR, by closing its front contacts *e* and *f*, establishes the connections from terminal B at various contacts *a* of the indicating relays of Fig. 2*d* over wires 139 to 145 and completed successively over front contacts *f* of the relays 1 to 7 on the ninth to fifteenth steps of the code, to hold up the relay 1T or 2T, as the case may be, until the relay LP releases. Such a long step in the code may then be considered to be a "positive" indication, since the movable device is active or is in its active condition. For example, since the switch 1W is in its normal position as controlled by the operator during the control code, the ninth step of the indication code must be made long to carry this information to the office. The relay 1NWP, shown on Fig. 2*d*, is in an energized condition so that it is picked up, the energy being furnished from terminal B over the movable connector associated with this switch, which is now occupying the position shown on the drawing, through the winding of the relay to terminal N. The circuit for holding the relay 1T picked up to make the ninth step long may then be traced from terminal B at front contact *a* of the relay 1NWP, over wire 139, front contact *f* of relay 1, front contact *e* of relay CR, wire 161, front contacts *c* of relay LP and *e* of relay 1L in multiple, front contact *a* and the winding of relay 1T to terminal N. Relav 1T is thus held picked up until the release of the relay LP, generating a long ninth step.

Similarly, the fourteenth step is made long by holding up the relay 2T with energy supplied from terminal B at back contact *a* of relay 4AR on Fig. 2*d*, this relay being shunted and released by the train assumed to be occupying track section 4AT. The circuit is further traced over wire 144, front contacts *f* of relays 6 and CR, wire 162, front contacts *e*, in multiple, of relays 2L and LP, front contact *a* of relay 2T, back contact *c* of relay 1T, through the winding of relay 2T to terminal N. This holds the relay 2T in the picked-up position until relay LP releases and opens its front contact *e*, thus generating a long fourteenth step.

The code step 15 must also be long to indicate that the switch 3W is in its reverse position as controlled by the operator during the control code. The relay 3RWP shown on Fig. 2*d* is in its energized condition so that it is picked up, the energy being furnished from terminal B over the movable connector associated with this switch, which is now occupying the position shown dotted on the drawing, through the winding of the relay to the terminal N. The circuit for holding relay 1T picked up is similar to that used in holding relay 1T picked up for the long ninth step, except that front contact *a* of relay 3RWP, wire 145, and front contact *f* of relay 7 are in the circuit. Steps 10 and 12 in this indication code will be short since track sections 1T and 2AT, respectfully are unoccupied. However, if the eastbound train assumed to be approaching the interlocking should occupy this track section 2AT before the twelfth code step is sent, the indication of this occupancy will be sent with this indication code. If this indication is sent, it may be possible, as will be described shortly, that a second code will not be initiated by this indication.

In order to transmit to the office the indications from the relays shown on Fig. 2*e*, it is necessary to extend the coding action beyond its usual termination at the sixteenth step. This is again accomplished, as it was with the control code, by extending the counting relay chain. The same extension unit as was used to permit the extending of the code action upon the receipt of a control code is used to extend the length of the indication code. Each extension unit again adds eight steps to the code, seven steps of which are available for the transmission of indications. The sixteenth, twenty-fourth, and similar steps are not available for the transmission of codes but are used only to prepare circuits for the extension counting chains.

During the code step 16, relay A of the extension unit is picked up, being energized over the same circuit as previously described during the receipt of the control code. This circuit checks that the relays 7 and CR are picked up and that the relay 8 is down; in other words, that it is the proper code step for the relay A to pick up. However, because of certain necessary relay action at the office coding unit, the sixteenth step of an indication code must always be long. Energy is supplied from terminal B at front contact *c* of relay A over wire 198 and front contact *f* of relay CR to the previously described holding circuit for the relay 2T. The relay 2T is held energized until relay LP releases. This holds the relay 2T up and the relay 1T released to create a long sixteenth step. Upon the release of relay 2T, relay 1T picks up to begin the seventeenth step. Relay A as before prepares a circuit for relay 1A to be picked up during the seventeenth step.

The extension unit counting chain action is the same as previously described. The relay CRA picks up on step 20 to turn back the coding action to reuse relays 1A, 2A, and 3A. As before, if code steps in addition to the twenty-four now available are required, a second extension unit is provided, its relay A being picked up during the twenty-fourth step of the code over the circuit previously described which includes the front contact *h* of relay 3A, front contact *e* of relay CRA, and back contact *e* of the relay 4A.

The code steps 17 to 23 are available to carry to the office additional indications from the field station. Again energy is supplied over the front contacts *a* of the various indication relays shown on Fig. 2*e*, wires 209 to 215, inclusive, and front contacts of the relays 1A to 4A. The contacts *f* and *g* of relay CRA are used to differentiate between the front contacts of relays 1A to 3A that are used during code steps 17 to 19 and 21 to 23, respectively. It will be noted that the front contact *d* of relay 4A is connected directly to the wire 198. This is necessary since relay CRA picks up during this twentieth step so that its transfer contacts must be by-passed by the circuit used for holding the relay 2T up during this step if it is desired that the code step be long. Also, since the relay 4A is used for this purpose only once during the coding action, it is not necessary to differentiate between two front contacts of this relay.

For an example, when the signal 4L was cleared by the dispatcher during the control code, the relay 2T was held up, during the immediately following indication code, over the circuit which may be traced from terminal B at front contact *a* of relay 4LHR, shown on Fig. 2*e*, over wire 210, front contact *c* of relay 2A, back contact *g* of relay CRA, wire 198, front contact *f* of relay CR, and thence over the previously traced holding circuit for the relay 2T. However, when the train passed the signal 4L, which was displaying a proceed indication, this signal was returned to its stop position and the relay 4LHS was returned to normal. The circuit for the latter operation may be traced from terminal B at back contact *c* of the relay 3TKSR and from left to right through each of the lower windings of relays 4RHS and 4LHS in series to terminal N. Therefore, relay 4LHR is now deenergized and has released. Thus, during the presently described indication code, the code step 18 will be short since no energy is supplied to the holding circuit for the relay 2T.

The only long step of the extension code group in the present indication code is the twenty-first, the track circuit 3T being occupied. The circuit for holding the relay 1T up during this step may be traced from terminal B at back contact *a* of relay 3TKSR over wire 213, front contact *d* of relay 1A, front contact *f* of relay CRA, wire 197, front contact *e* of relay CR, and thence over wire 161 and the remainder of the previously traced holding circuit for the relay 1T. The relay 1T is thus held up until the relay LP releases which deenergizes the relay 1T. This relay then releases to end code step 21.

As can be seen by an inspection of Fig. 2*e*, there is no need at this station for the code steps 22 and 23, as there are no other indications to be transmitted to the office. Therefore, the code can be ended after the twenty-first step in order to conserve coding time on the line circuit. Again, for proper reset action of the equipment both at the office and at this station and at other field stations, the code must end with the line relays R normal. This limits the final step of an indication code to even-numbered steps only. Thus, at the station shown in Fig. 2, the indication code will terminate on the twenty-second step.

In order to terminate the indication code, the code stopping relay CS must be energized on the final step in multiple with the particular counting chain relay corresponding to that code step, that is, the relay CS must become the final relay in the counting chain. In order that the coding unit at each field station may be identical, adjustable connections are provided, over front contacts *h* of relays 1, 3, 5, 1A, and 3A, or front contact *b* of relay 7 if the code is to end on the sixteenth step similar to the picking up of the first A relay, to energize the relay CS on the desired code step. Since at this station the code is to end on the twenty-second step, the adjustable connections for energizing the relay CS on the final step of the code are made so as to include front contact *h* of relay 1A.

When the twenty-second step of the code is reached, relay R at the transmitting station operates to its normal position, energizing the relay CS over a circuit which may be traced from terminal B at normal contact *a* of relay R over front contact *e* of relay LBP, resistor R9, wires 158 and 205, back contacts *a* of relays 4A and A, front contact *h* of relay 1A, front contact *d* of relay CRA, an adjustable connection, wire 200, front contact *h* of relay M, wire 188, front contact *j* of relay CR, wire 131, front contact *b* of relay LB, wire 148, through the winding of relay CS to terminal N. When relay CS picks up, it completes a stick circuit extending over wire 148, front contact *b* of relay LB, wire 131, and its own front contact *a* to wire 158.

Relay CS opens its back contact *b* to disconnect terminal B from wire 199 and, over front contact *g* of relay S, wire 178. Relay 1T thus remains released when relay 1A releases to close its back contact *g* in the normal pulsing circuit for relay 1T. Relay M also releases, reversing the line connections at its contacts *b* and *d* to render relay R responsive now only to line current of normal polarity.

At the office, relay OR is operated to normal, energizing relay OCS. This relay, by opening its back contact *c*, releases relay PC, thereby restoring the line polarity to normal so that relay R at this station will remain steadily energized after relay M releases. This relay action at the office will be more fully described hereinafter. It suffices here to say that the relay PC releases relay PCP and relay OR releases relays O2L, OLP, OLB, OLBP, and O1L in order.

Relay OR remains in its normal position and is not affected by the operation of relay PC because, when this change of line polarity occurs, the secondary of transformer RT is short circuited over back contact *c* of relay PC, and front contact *c* of relay PCP. Relay OR is also held energized in the normal direction until relay PCP releases over the circuit extending from terminal O, through the lower winding of relay OR in the direction from left to right, back contacts *e* of relays O1T and OM, back contact *f* of relay PC, and front contact *a* of relay PCP to terminal N.

The restoration of the line polarity to normal by relay PC causes the line relay R at each of the other stations to pick up. At these stations, relays 1L, LP, LB, and LBP pick up and then relays 2L, LP, LB, LBP, and 1L release in that order.

At the transmitting station, even though relay M releases at the exact instant that the line polarity is restored to normal, relay R may momentarily be deenergized. However, since relay CS is picked up, its front contacts *c* and *d*, over wires 170 and 171, and 173 and 174, respectively, connect the normal and reverse contacts at *a* and at *b* of relay R together so that the circuits controlled by relay R remain in the same condition as if relay R remained steadily energized. Consequently, the timing relays L at that station release in order, substantially in unison with those at the office and slightly in advance of those at the other stations. Relay CS is released by the opening of its stick circuit at front contact *b* of the relay LB. Relays CR, CRA, and S are released when front contact *a* of relay LBP opens to disconnect terminal B from wire 160.

It will be seen from previous discussion that all coding units are restored to normal and placed in the proper receiving condition prior to the release of relays O1L and 1L to condition the system for transmission of the next code.

The release of relay M completes a circuit for energizing relay MSTP, shown on Fig. 2*e*. This relay, a repeater of the M and ST relays, is energized over a circuit which may be traced from terminal B at back contact *f* of relay M over wire 177, normal contact *c* of relay ST, wire 238, through the winding of relay MSTP to terminal N. The relay MSTP picks up and prepares circuits for picking up the various TKSR relays, especially in this case the relay 3TKSR, when the corresponding TR relay is again picked up. The circuit for picking up relay 3TKSR may be traced from terminal B at front contact *b* of relay MSTP over front contact *a* of relay 3TR, through the winding of relay 3TKSR to terminal N. Thus, when the train clears the track section 3T so that the shunt is removed and relay 3TR picks up, the relay 3TKSR may also pick up. This, of course, would again release the relay ST initiating another code. If the relay 3TR is already picked up when the transmission of the indication code is completed and the relay MSTP picks up, the relay 3TKSR would pickup immediately. Since the resultant release of the relay ST, as described, would also result in the release of the relay MSTP, a condenser C is added in multiple with the winding of the relay 3TKSR to assure sufficient energy storage to complete the pickup of this relay under such conditions. When the relay 3TKSR is picked up, it completes a stick circuit from terminal B at its own front contact *a* over front contact *a* of relay 3TR through the relay winding to terminal N. Use of these track indication storage relays, such as the relay 3TKSR, assures the transmission to the office of the indication of track occupancy for these short sections, for the purpose of recording such occupancy in the office by pen magnets which are usually provided in systems of this type.

Each of the various relays TKSR also controls a circuit for restoring the magnetic stick signal control relays to normal when a train enters a track section to release the corresponding relay TR. This prevents the clearing of the signals automatically when a train vacates the short track section without requiring additional repeating relays. The circuits for restoring the signal stick control relays to normal, one of which was previously traced, are obvious from an inspection of the drawings.

A change in position of one of the indicating relays may occur during the transmission of the indication code just described. If this occurs prior to the transmission of any of the indicating steps, that is, prior to step nine, the relay ST will be reenergized on the eighth step and but one code will be transmitted. Since the pickup circuit for relay ST is opened at the beginning of the ninth step, the temporary stick circuit by which relay ST is held energized will be opened to cause it to release again if a change in the position of any of the indicating relays occurs subsequent to the transmission of the eighth step. Thus, a new indication code will be transmitted to indicate the new condition. This will occur even though the new indication may already have been included in the initial code, as was assumed in the previous description of the transmission of the track occupied indication for track section 2AT on the twelfth step of the code. As has been previously indicated, when the relay LB releases and prior to the release of relay S, the ST relay is held energized over the temporary stick circuit from terminal B at the normal contact *a* of relay R, wire 159, back contact *c* of relay SR, wire 236, front contact *e* of relay S, wire 182, back contact *c* of relay LB, wire 183, the normal contact *a* and the winding of relay ST and thence over wire 216 and the previously traced circuit for the relay ST to terminal N. It may also occur, however, that due to a fault the transmission of the indication code is interrupted so that the office coding unit does not complete its coding action simultaneously with the termination of the code at the field station. Then, when the relay CS is picked up at the field to release the M relay, the office line coding unit will begin a normal drop out with the relay PC still picked up. This maintains the reverse polarity of the line circuit so that the relays R are held reversed. Thus, when the relay LB releases, the temporary stick circuit for the relay ST is open at normal contact *a* of the relay R so that the relay ST is deenergized and releases to store another indication code for transmission as soon as the line circuit is available. If relay OCS in the OLC unit should pick up ahead of relay CS at the field station, the PC relay at the office would be released, restoring normal polarity to the line circuit. The R relay would then be energized with reverse polarity due to the reversal of its line connections by the M relay contacts. The LC unit at the field station would not be able to complete its coding action and would stall with the R relay reverse. Again, when the relay LB releases, the temporary stick circuit for the ST relay would be opened and this relay again releases to store the indication code. Thus if a line fault prevents the OLC and LC units from completing their coding action simultaneously, the start relay at the field station is released to store another indication code to assure that the entire code is received at the office. Only if the OLC unit completes its coding action at the proper time, so that the relay PC restores normal polarity to the line circuit, is the relay ST at the field station held energized over the stick circuit until the relay S releases to complete the permanent stick circuit.

I shall now describe the operation of the office apparatus of Fig. 1 in receiving an indication code. It will be understood that relay OR is operated through transformer RT to the right or reverse position on each odd-numbered step and to the left or normal position on each even-numbered step. The relay OR thus operates its timing and counting relays through the code steps in unison with the corresponding relays at the transmitting station.

On the first step, relays O1L, O1, E, PC and PCP pick up, as already described, as well as relays O2L, OLP, OLB, and OLBP. However, relay O1L does not release because the first step is relatively short. Selected ones of the office F, G, and S relays pick up on the steps corresponding to the digits of the station code call. More particularly, in response to code call 234, relays 2F and 23G are operated on steps 2 and 3, and relays 234S and SP on step 4. In the receiving condition, back contact *d* of relay OLP in the circuits for these relays is bridged by front contact *f* of relay PCP so that these relays are picked up upon the closing of back contact *d* of relay O1L or O2L, respectively, on the long steps.

The pickup of relay PCP also prepares a circuit extending from terminal B over front contacts *c* of relays O1L and O2L, front contact *e* of relay PCP, wire 59, front contact *c* of relay SP, through the upper winding of the office indication S repeater relay KSP to terminal N. Since relay SP is picked up over a back contact of relay O1L or O2L, the circuit for relay KSP is held open on the step on which the relays S and SP are operated and closes as soon as the relays O1L and O2L are both picked up at the beginning of the next step following the final digit of the station code call, that is, on the fifth step when the code call is 234. When relay KSP picks up it completes a stick circuit over its own front contact *a*, and through its lower winding, extending over wire 60 to terminal B at front contact *a* of relay OLBP. This relay KSP prepares circuits, to be discussed hereinafter, to interrupt the indication code if a fourth long step is received during this station selection portion of the code; that is, the first eight steps. It also prepares a circuit, also described later, for energizing the various delivery relays which control the delivery of the received indications to the proper machine panels.

Relay OCR picks up on the eighth step, as previously described. Front contact *f* of relay PCP maintains the connection from terminal B at front contact *a* of relay OLBP over the back contacts *d* of relays O1L and O2L to wires 63 and 64 after relay OCR picks up. The closing of front contacts *b* and *d* of relay OCR prepares circuits extending from these wires 63 and 64 to front contacts *e* of relays O1 to O7, inclusive, whereby a series of intermediate registry relays R1 to R7 are rendered responsive to the character of the ninth to fifteenth steps of the code. In other words, when terminal B is connected to any one of the wires 139 to 145, shown in Fig. 2*c*, over a contact of an indicating relay, the corresponding step of the transmitted code will be prolonged, that is, a "positive" indication transmitted, and at the office the corresponding one of the registry relays R1 to R7 will be picked up. For example, if the ninth code step is long, as was assumed during the description of the indication code, relay O1L will release, closing its back contacts to complete a circuit from terminal B at front contact *a* of relay OLBP over front contact *f* of relay PCP, back contact *d* of relay O1L, wire 63, front contact *b* of relay OCR, front contact *e* of relay O1 through the winding of relay R1 to terminal N. Relay R1 picks up, and completes a stick circuit from terminal B at back contact *b* of the relay RR, shown on Fig. 1*a*, over front contact *j* of relay OLBP, wire 76, front contact *a* and the winding of relay R1 to terminal N. Relay R1 also closes its front contact *b* to connect terminal B to wire 49. It is to be noted that the registry reset relay RR is not picked up prior to this time, the energizing circuit including front contact *c* of relay 16.

Since the fourteenth step of the indication code as described was also assumed to be long, the relay R6 will likewise be picked up on this step over a circuit similar to that described for relay R1 but including back contact *d* of relay O2L, wire 64, front contact *d* of relay OCR, and front contact *e* of relay O6. The stick circuit for relay R6 is as described for the relay R1 except including the front contact *a* of relay R6. Then, step fifteen being long, relay R7 is energized and picks up, the circuit being similar to that for relay R1 and obvious from a study of the drawing.

On the sixteenth step of the code, which is a long step, the relay 16 picks up, energized over the same circuit previously described during the discussion of the control code. When relay 16 picks up, it closes a circuit from terminal B over front contacts *c* of relays O1L and O2L, front contact *e* of relay PCP, wire 59, front contacts *c* of relays OCR and KSP, wire 93, front contacts *d* of relays 234S and 16, wire 109, and through the winding of the associated delivery relay 234D to terminal N. Relay 234D therefore picks up to allow operation of the indication relays K, of the group which it controls, in accordance with the positions of the registry relays R1 to R7. Relay 234D opens the stick circuits for these relays K at its back contacts *a* to *g*, inclusive, and prepares over the similar front contacts the pickup circuits for each of these relays. These pick up circuits extend over wires 49 to 55 to terminal B at front contacts *b* of the aforesaid relays R1 to R7, respectively, whose positions indicate the position of the station indicating relays of the group controlling the transmission of the code. For example, we have already described that, since the ninth step of the code is long, relay R1 is in its picked-up position. A circuit is completed then from terminal B over front contact *b* of relay R1, wire 49, front contact *a* of relay 234D, through the winding of relay 1NWK to terminal N. Since relays R6 and R7 are also picked up, the relays 4AK and 3RWK will be picked up over similar circuits.

When any of the indication relays on Fig. 1*d* are picked up, as has just been described, they cause lamps to be lighted on the panel in the office to produce a visual display of the positive indications transmitted by the field station. For example, the picking up of the relays 1NWK and 3RWK causes the lamps 1NWE and 3RWE, respectively, to be lighted. Likewise, the picking up of relay 4AK causes the lamp 4AE in the track diagram to become lighted. The circuits supplying energy to the lamps over front contacts of the indication relays are obvious by inspection of the drawings. The indication is thus displayed for the operator that the switch 1W is in its normal position, switch 3W is in its reverse position, and the track section 4AT is occupied. The system of indicating relays and indication lamps, as shown in Fig. 1*d*, is a typical system for displaying such indications. It should be understood that other methods may be used. Additional indications and recorders may also be added as illustrated in Fig. 1*c* of the aforementioned Patent 2,411,375. In that drawing there are shown recording pens, bells, and buzzers for causing audible indications or a permanent record. Such may be used with the system shown here. Since these indicating circuits are not part of my invention, they are shown as simply as possible in order to merely illustrate the end result of the codes and operation of the coding units herein described.

It is to be noted that, as herein shown, the pickup circuit for relay 234D passes first over front contact *d* of relay 234S and then over front contact *d* of relay 16. By so doing, the circuit shown in Fig. 1*c* was simplified. In actual practice, however, the position of these two contacts will generally be reversed, in order to reduce the number of contacts required on relay 16. Since each of the possible 35 stations on a line circuit must be represented by a D relay, a possible 35 similar pickup circuits are required at the office. It becomes simpler then to connect from wire 93 to the heel of contact *d* of relay 16 and branch from the corresponding front contact to front contact *d* on each of the possible 35 S relays, which must be provided anyway for station selection, and thence to the winding of the corresponding relay D. Also, for those stations which require indication codes of considerable length, a front contact *d* of a relay 24 and of possibly a relay 32 must each be connected in multiple with front contact *d* of relay 16 to provide pickup circuits for relays DA and DB for those stations. For example, when the office is receiving an indication code from the station 267, at which the indication code is 26 steps in length, as will be discussed hereinafter in connection with code stopping circuits, a circuit is completed on the twenty-fourth step, similar to that already traced for relay 234D to wire 93, and then over front contact *d* of relay 24, a front contact of a relay 267S, through the winding to relay 267DA to terminal N. Relay 267D picks up, and completes circuits to deliver the indications received during code steps 17 to 23. As shown for station 234 however relay 234DA picks up on the last step of the indication code, as will be described shortly.

Since step 16 of the indication code is a long step, the relay O2L releases. Opening of front contact *c* of relay O2L opens the pickup circuit for relay 234D which then releases. This disconnects the various indication relays from the front contacts of the relays R1 to R7, inclusive. The various indication relays K which were picked up over front contacts of relay 234D, now stick up from energy at terminal B at their own front contacts over corresponding back contacts of the relay 234D. This maintains the indications as received from the field location.

Since the indication code transmitted by the station 234 is longer than 16 steps, additional code steps must also be provided at the office in order to receive this particular indication code. This is done in a manner similar to the addition of code steps during the control code. The office coding unit again uses the relays 16, 17—21, 18—22, 19—23, and 20 in order to add code steps, these relays being added to the counting chain of the OLC unit. These relays pick up in order after the relay 16. Relay 20 completes a circuit for the pickup of relay OCRA and then the relays 20 and OCRA cause a repeat action of the relays 17—21, 18—22, and 19—23. In all, the coding action of these extension relays provides code steps 17 to 23.

At the beginning of code step 17, when the line relay R operates to its reverse position, a circuit is completed for energizing the registry reset relay RR. This circuit may be traced from terminal B at reverse contact *a* of relay R over wire 81, front contact *c* of relay 16, wire 82, through the upper winding of relay RR to terminal N. When the relay RR picks up it completes a stick circuit through its lower winding over its own front contact *a* and front contacts *c* of the relays O1L and O2L to terminal B. Opening of back contact *b* of relay RR interrupts the stick circuit for the intermediate registry relays R1 to R7, and these relays then release. Relay RR is then released during the first long step in the code following its pick up, including the code step 17. When either relay O1L or O2L releases during this long step, the opening of front contact *c* of the released relay interrupts the stick circuit for relay RR which then releases. In the code here being described, code step 21 is the first long step in the extension group. Thus relay RR is here deenergized when relay O1L releases during this long step, and soon releases.

It is to be noted that if an indication code is longer than 24 steps, the relay RR is also energized at the beginning of code step 25. The circuit is similar to that described above, with front contact *c* of relay 16 being replaced by a front contact of relay 24. In practice, front contacts of each of such relays as 16, 24, 32, etc. as are required for the installation are connected in multiple in the pick up circuit for relay RR, so that this relay will be energized at the beginning of code steps 17, 25, 33, etc.

The release of the intermediate registry relays prepares them for reuse during code steps 17 to 23. During these code steps, these relays are energized over front contacts of the relays 17—21 to 20, inclusive. For example, it was described during the transmission of the indication code that code step 21 was long. Therefore, the relay R5 is picked up by energy supplied over the circuit traced from terminal B at front contact *a* of the relay OLBP over front contact *f* of relay PCP, back contact *d* of relay 1L, wire 63, front contact *b* of relay OCR, wire 111, front contact *g* of relay OCRA, front contact *f* of relay 17—21, wire 117, through the winding of relay R5 to terminal N. Upon picking up, relay R5 completes a stick circuit over its own front contact *a*, wire 76, and back contact *b* of relay RR, now reclosed, to terminal B at front contact *j* of relay OLBP, which is identical to the stick circuits for these relays during the code steps 9 to 15.

During the code steps 17 to 23, the relay OCRA differentiates between the front contacts of the relays 17—21, 18—22, and 19—23 used during the code steps 17 to 19 and 21 to 23, respectively. It is to be noted that the pickup circuit for relay R4 which includes front contact *e* of relay 20 also includes the front contact *h* of the relay OCRA. This is possible since both these relays are picked up closing front contacts prior to the release of relay O2L to complete the pickup circuit for the relay R4.

However, the field station 234, as previously described, transmits only 22 steps in its indication code. The office coding unit must therefore also reset on the twenty-second step simultaneous with the reset of the field station. This is necessary in order that the line circuit may properly return to its normal at-rest condition. In order to terminate the action of the office coding unit, it is necessary to energize the relay OCS so that it picks up. This is similar to the method of terminating the control code, as was previously described. However, since for some stations the indication code is of a different length than the control code, a slightly different circuit is necessary to energize the relay OCS during indication codes. As is shown in Fig. 1*c*, adjustable connections are provided in the office for this purpose. Also, a back contact of the relay OMP is included in the circuit to differentiate from the similar control code circuit, when a front contact of relay OMP is used. The relay OMP remains deenergized during an entire indication code since its pick up circuit is open at front contact *f* of relay OM.

The circuit for energizing the relay OCS on the twenty-second step of the indication code may be traced from terminal B at normal contact *a* of relay OR over resistor R12, front contact *d* of relay OLBP, wire 90, back contacts *a* of relays 20 and 16, front contact *h* of relay 17—21, front contact *e* of relay OCRA, an adjustable connection, front contact *c* of relay 234S, back contact *a* of relay OMP, wire 80, front contact *j* of relay OCR, wire 74, front contact *b* of relay OLB, wire 48, and through the winding of the relay OCS to terminal N. Relay OCS thus picks up and completes a stick circuit extending to wire 90 over wire 48, front contact *b* of relay OLB, wire 74, and its own front contact *a*.

Closing of front contact *b* of the relay OCS completes a circuit traced from terminal B over front contacts *c* of the relays O1L and O2L, front contact *e* of relay PCP, wire 59, front contacts *c* of the relays OCR and KSP, front contact *b* of relay OCS, wire 79, front contact *e* of relay 234S, wire 110, through the winding of relay 234DA to terminal N. The relay 234DA then picks up to complete a circuit for energizing the indication relays K of the final group. Thus the relays K of the final group of indicating relays are energized on the last step of the code over front contacts of the relay 234DA and wires 49 to 55 according to the relays of the registry group R1 to R7 that are picked up, the circuits being obvious from an inspection of the drawing. In the present case, the relay R5 is in the picked-up position so that the relay 3TK would be energized and would pick up. This causes the indication lamp 3TKE to be lighted, indicating to the operator that this track section is occupied.

The opening of back contact *c* of relay OCS releases relay PC, which in turn releases the relay PCP. The release of relay PC restores the line polarity to normal. the relay OR being held normal by a previously described circuit, including back contact *f* of relay PC, and front contact *a* of relay PCP, until relay PCP releases. The office timing relays then release in the normal order, relay O1L being the last to release. Release of the relay O2L deenergizes relay 234DA and the release of this relay, closing back contacts *a* to *g*, reestablishes the stick circuits for the indication relays K of the final group that were energized. Release of relay OLB interrupts the stick circuit for relay OCS and this relay then releases. Opening of front contact *a* of relay OLBP deenergizes the relays OCR, KSP, OCRA, SP, and 234S. The opening of front contact *j* of relay OLBP releases the energized relays of the registry relay group R1 to R7. This completes the resetting of the office coding equipment and, since the field station that transmitted the indication code reset at the same time, the entire system is now in its normal at-rest position and is prepared for the transmission of additional codes.

This completes the transmission of an indication code by a field station and its receipt by the office coding unit. It was shown that indications of the position or condition of all of the wayside devices shown in Fig. 2*d*, which determine the position of the indication relays of Figs. 2*d* and 2*e*, have been transmitted to the office and recorded on the proper panels of the office machine, in this case the panels shown in Fig. 1*d*. Only one code, using one station code call, was required to transmit the information. It is to be seen, then, the information thus displayed on the machine panels provides the dispatcher with a current record of the conditions at the field location.

In the preceding paragraphs, the circuits and operations of the relays determining the length of both the control and indication codes have been discussed in connection with the general operation of the coding units. It was previously stated that it was a feature of the apparatus that a code may be ended as desired on any even numbered code step, beginning with the tenth step. At the particular station illustrated, that is the station 234, both the control code and the indication code ended on the twenty-second step. However, it was shown that the length of the control and indication code were relatively independent of each other, that is, it is the adjustable connections at the office and at the field station which determine the length of the code. It was only the requirement in the number of control and indication functions for the station 234 that caused both the codes for the station to be 22 steps in length. As will be shown shortly, the control and indication codes at a station may contain a different number of code steps.

In order to illustrate the feature of terminating the code as desired, several examples of code termination at different stations will be described in which the codes are of different lengths. Referring now to Figs. 3 and 4, there is shown therein circuits for terminating the code for several stations, each station having a code of different length. For purposes of clarity in discussing the drawings, the station code calls have been selected as 234, 267, 235, 245, 256, and 278. Except for stations 234 and 235, the control and indication codes are also of different lengths at each station. For purposes of this illustration, I shall assume that the code lengths are as shown in the following tabulation:

| Station | Length of Code | |
|---|---|---|
| | Control | Indication |
| 234 | 22 | 22 |
| 267 | 18 | 26 |
| 235 | 16 | 16 |
| 245 | 12 | 14 |
| 256 | 20 | 18 |
| 278 | 16 | 24 |

The length of the codes at the station 234 shown here are exactly the same as those of the station 234 in the previous discussion. This is done in order to provide a point of continuity between the previous discussion of the coding action and the illustration here of the termination of the various codes.

The office circuits necessary to provide the code terminations listed in the preceding paragraph are shown in Fig. 3. This drawing is used in place of the upper right portion of Fig. 1*c* during the following discussion. The terminations of the various wires shown at the left of Fig. 3 serve to provide a point of connection between this drawing and the remainder Fig. 1*c*. Front contacts of the station selector relays S for the various stations used in this illustration are shown. The relay windings and control circuits for these relays are not shown. However, the control and energization of these relays is similar to that shown and previously described for the relay 234S and need not be repeated here.

As has been previously described, in order to terminate either a control or indication code at the office, it is necessary to energize the relay OCS which then picks up to cause the coding action to terminate. Thus, front contact *b* of relay 245S, when closed, establishes a connection between wire 85 and wire 80 over front contact *a* of relay OMP to energize relay OCS on the twelfth step and thus terminate the control code to that station. The front contact of the relay OMP in this circuit determines that it is a control code and, as previously described, the front contact *j* of the relay OCR in the circuit between wire 80 and the relay winding prevents the relay OCS from being energized on the fourth step of the code. Similarly, front contact *c* of relay 245S establishes a connection between wire 86 and wire 80 over back contact *a* of relay OMP to energize the relay OCS on the fourteenth step of an indication code. Again, the back contact of the relay OMP in this circuit establishes the fact that the office is receiving an indication code and the front contact *j* of the relay OCR prevents the relay OCS from being energized on the sixth step of the code. This action synchronizes the reset of the office coding unit with the coding unit at field station 245, and both units terminate their coding action during the indication code on the same code step in a manner previously described.

Similarly, front contact *b* of relay 235S establishes a direct connection between wire 87 and wire 80. Thus both the control and the indication codes for that station terminate on the sixteenth step. No contacts of the relay OMP are required since both codes terminate on the same step. The control code for station 278 also ends on the sixteenth step but since the indication code in this case is longer, the connections for terminating this control code extend from wire 87 over front contact *b* of relay 278S and front contact *a* of relay OMP to wire 80.

Since both control and indication codes for the stations 234, 267, and 256, and the indication code only for station 278 are each longer than the normal sixteen steps, it is necessary to use the relays of the extension counting chain during the coding action to and from these stations. Therefore the pickup of the relay OCS is controlled over contacts of these extension chain relays. For example, for the station 234 energy for picking up the OCS relay is controlled over front contact *h* of relay 17—21 as was previously described during the discussion of the coding action at the office. The circuit is extended over front contact *e* of the relay OCRA, front contact *b* of relay 234S, and front contact *a* of relay OMP to wire 80. This circuit causes the relay OCS to pickup on the twenty-second step of the code. As shown, a similar circuit is used to terminate the coding action for the indication code with the exception that front contact *c* of relay 234S and back contact *a* of relay OMP are used. If desired, the circuit arrangement could be similar to that used for the station 235 where only a single front contact of the S relay is used since both codes end on the same step. That is, the contacts of the relay OMP are bypassed, the connection being from a single front contact of the S relay direct to wire 80.

In a similar manner for the station 256, energy is supplied to relay OCS during the control code over front contact *h* of relay 19—23, back contact *f* of relay OCRA, front contact *b* of relay 256S, and front contact *a* of relay OMP to wire 80. This causes relay OCS to pick up on the twentieth step. Since relay OCS picks up at the start of code step 20, and immediately establishes a stick circuit, the pick up of OCRA during code step 20 has no effect on relay OCS. At this station the indication code is shorter than the control code, being terminated on the eighteenth step. The circuit for then supplying energy to relay OCS may be traced over front contact *h* of relay 17—21, back contact *e* of relay OCRA, front contact *c* of relay 256S, and back contact *a* of relay OMP to wire 80. Thus it may be seen that the indication code may be shorter than the control code to a station if the requirements of the wayside devices are such as to require more control functions than indication functions. For the station 267, the control code is shown terminated on the eighteenth step, the circuit being similar to that just described for the termination of the indication code for station 256 with the exception that front contact *b* of relay 267S and front contact *a* of relay OMP are used in the circuit. The indication code for station 278 requires 24 steps. Here the circuit for energizing relay OCS may be traced over front contact *h* of relay 19—23, front contact *f* of relay OCRA, back contact *f* of relay 20, front contact *c* of relay 278S, and back contact *a* of relay OMP to wire 80. The back contact *f* of relay 20 is required in this circuit to prevent relay OCS from picking up on step 20. That is, except for back contact *f* of relay 20 being open, after the relay OCRA picks up during this twentieth step, the front contacts of relay 19—23 would still be closed for sufficient time to energize relay OCS.

It was designated that the indication code for station 267 would be longer than 24 steps, 26 steps being required for this code. Thus it would be necessary to add additional extension counting chain relays at the office. It has been previously indicated that such relays would be added in a manner similar to those already shown in Fig. 1. To terminate the indication code on the twenty-sixth step, the normal circuit for energizing the relay OCS would be traced over front contact *h* of a relay 25—29, back contact *e* of a relay OCRB, front contact *c* of relay 267S, back contact *a* of relay OMP to wire 80. The relay 25—29 would be the first relay in the additional extension counting chain with the relay OCRB being used to prepare circuits to cause a repeat action of the relay 25—29 for code step 29. However, if no other code in the particular line circuit required more than 28 steps or more than 26 steps as here indicated, the relay OCRB could be eliminated since no repeat action of the second extension counting chain would be required. The circuit for energizing relay OCS would then be connected directly from contact *h* of relay 25—29 to the front contact of the S relay, this connection being indicated on Fig. 3 by the dotted line.

Referring now to Fig. 4, there is shown therein a composite circuit arrangement illustrating the code termination connections at the various field stations as listed above. The drawing in Fig. 4 is similar to the upper right portion of Fig. 2*c*. Again the wire terminals shown at the left and top of the drawing in Fig. 4 serve to provide a point of connection between this drawing and the Fig. 2*c*. The connections which are necessary to terminate the indication codes on the proper code step are indicated between the wire 200 and wires 201 to 204 or the wires from the various contacts of the CRA relays by heavy dots. The numbers associated with each connection shown serve to designate the field station at which the connection is made, it being understood that this is a composite drawing of several field stations and not the circuit at any one location.

As has been previously described, at a field station the relay CS is energized to terminate the coding action only on an indication code. It is not necessary to energize the relay CS during the control code, since the reset action in that case does not depend upon this relay. During an indication code, however, energy must be applied to wire 200 in order that the relay CS may pick up and thus cause the proper reset action at the field station.

At field station 235 a connection is made between wires 204 and 200 to cause the relay CS to pick up on the sixteenth step code, thus terminating the indication code. At this station, although the control code also terminates on the sixteenth step, the relay CS would not be energized on the final step of the control code because of the front contact *h* of the relay M which is included in the circuit for the relay CS, as previously described. Since the relay M remains released during the control code, this contact would be open to interrupt the pickup circuit for relay CS. At field station 245, a connection is made between wire 203 and wire 200 to cause the CS relay to pick up on the fourteenth step of the code and thus end the indication code at this station on that step. The previously described front contact *j* of relay CR in the pick up circuit for the relay CS would prevent the energizing of this relay during the sixth step of the code. It may also be noted that if it is desired to make the control code to this station 245 sixteen steps in length instead of the twelve steps as designated, the front contact *h* of the relay M in the pickup circuit for the relay CS would allow proper termination of the indication code and at the same time prevent the coding action during the control code from terminating too soon. Thus it is to be seen that the control code to a station may be longer than the indication code if desired even though both codes are 16 steps or less in length.

At station 256, energy is supplied during an indication code over front contact $h$ of relay 1A–1 and back contact $d$ of relay CRA–1 to wire 200 to energize the relay CS on the eighteenth step of the code. At field station 234, it is desired to energize relay CS on the twenty-second step of the indication code. Energy is thus supplied over front contact $h$ of the relay 1A–1 and front contact $d$ of relay CRA–1 to wire 200, as already described during the previous discussion of the complete indication code. At station 278, relay CS picks up on the twenty-fourth step with energy supplied over front contact $h$ of relay 3A–1, front contact $e$ of relay CRA–1, back contact $e$ of relay 4A–1 and thence to wire 200 and to the winding of the relay CS. The back contact $e$ of the relay 4A–1 is included in this circuit to prevent relay CS from being energized on the twentieth step of the code, since the relay CRA–1 would pick up during this step while the relay 3A–1 still had its front contacts closed, as was described for the similar case in the office coding unit.

At station 267, it is designated that twenty-six steps are necessary in the indication code. This requires that a second extension unit be used at this station, the unit No. 2 as indicated in Fig. 4. The circuit for energizing the relay CS on the twenty-sixth step of the code is then traced over front contact $h$ of relay 1A–2, back contact $d$ of relay CRA–2, and thence over the adjustable connection to wire 200 and thus to the winding of relay CS. It is desirable that the extension units added at the field stations all be identical as to internal wiring and outside connections. Thus, even though the relay CRA–2 will never be energized at this station, it is not possible to eliminate the contact of this relay from the circuit for relay CS at station 267 as was done at the office where the relays are added only as needed in the extension counting chain.

Thus, it has been shown that the coding action at any station can be terminated on any even-numbered code step, as desired, without regard to the length of the code at the other stations. Also, the control and indication codes at a station may be of different lengths, as desired, and as necessary to transmit the control functions and the indications between the office and the field location. By providing a system of adjustable connections, it is possible to use identical coding units and extension units at each of the field stations. The desired length of the code is then determined by the proper installation of jumpers between the various terminals provided for establishing the various adjustable connections. Also, at the office, the length of the code and the synchronizing of the office and the field during an indication code is not dependent upon the office coding unit itself but upon external relays and connections which are completed as required to provide the desired operation in terminating the various codes. A very flexible remote control system using standard items of equipment can thus be installed to give a desired operation at each location.

I shall next describe how the system is restored to normal in the case of a fault.

A control code may be terminated on an odd-numbered step due to a fault, relay O1T being held energized over wire 68, for example. Relay OR is then held reversed until the timing relays O1L, OLP, OLB and OLBP release, relay O2L remaining energized. Relay OLBP then releases relay OM and opens the counting and selecting relay circuits. The release of relay OM with relay OR reversed allows relay PC to pick up, which in turn, picks up relay PCP. Release of relay OM also deenergizes relay O1T, which releases shortly.

At each station, relay R remains released and the timing relays release in the same order, relay 2L remaining energized. Relay LBP opens the counting and selecting relay circuits to prevent further reception. The release of relay O1T closes the line circuit, but the relays R do not pick up because the line polarity has been reversed by relay PC.

When relay PCP picks up, relay OR is operated to normal over the circuit from terminal O through its lower winding, back contacts $e$ of relays O1T and OM, front contacts $f$ and $b$ of relays PC and PCP, respectively, back contact $f$ of relay OLBP, front contact $f$ of relay O2L, and back contact $f$ of relay O1L to terminal N. The office timing relays are thereby reenergized and relay PC is deenergized, relay PC releasing before its stick circuit is completed by relay OLBP picking up. Release of relay PC deenergizes relay PCP. The office timing relays then release in the normal order due to the deenergization of relay O2L, relay O1L being the last to release.

When relay PC releases, it restores the line polarity to normal so that all the line relays R operate to normal in unison and slightly behind relay OR reenergizing their timing relays. The timing relays at each station then release in the normal order due to the deenergization of relay 2L, relay 1L being the last to release.

If a control code is terminated on an even-numbered stop prior to the desired final step, due to the failure of relay O1T to pick up, relay OR is held normal and the timing relays release in the normal order, relay OLBP releasing the counting and selecting relay circuits and also releasing relay OM. Relay O1L is, as usual, the last to release. The station line relays R remain steadily energized and their timing relays release in the normal order as at the end of a complete code, relay 1L being the last to release. This action is similar to that which occurs when a control code is purposely terminated on a selected even numbered step, except that relay OCS does not pick up.

If an indication code is terminated on an odd-numbered step, as for example, would be the case if relay 1T remained picked up due to a fault, relay OR remains reversed until relay OLBP releases, relay O2L remaining picked up. Relay OR is restored to normal upon the closing of back contact $f$ of relay OLBP over the circuit previously traced which includes front contacts of relays PC, PCP, and O2L, and back contacts $f$ of relays OLBP and O1L.

At the transmitting station, relay R remains released, and the timing relays 1L, LP, LB, and LBP release. Opening of front contact $e$ of relay LB releases relay M, which in turn releases relay 1T. This removes the line shunt applied by contact $b$ of relay T, while contacts $b$ and $d$ of relay M reverse the line connections for relay R so that relay R remains released, since relay PC at the office is still picked up. Thus the apparatus assumes the same condition as at the other stations where relay R and the timing relays stand released with relay 2L picked up.

When relay OR is restored to normal, the office timing relays are energized and relay PC is deenergized and releases before relay OLBP picks up. The office timing relays then release in the normal order, relay O1L being the last to release. When relay PC releases, it restores the line polarity to normal so all the line relays R pick up in unison, reenergizing their timing relays. The timing relays at each station then release in the normal order, relay 1L being the last to release.

If an indication code is terminated on an even-numbered step other than the selected step, due to the failure of relay 1T to pick up, relay OR remains normal until the timing relays O2L, OLP, OLB, and OLBP release. The closing of back contact $f$ of relay OLBP completes a circuit, for operating relay OR to reverse, extending from terminal B at front contact $d$ of relay PCP over back contacts $f$ of relays O2L and OLBP, front contact $b$ of relay PCP, front contact $f$ of relay PC, back contacts $e$ of relays OM and OT, through the lower winding of relay OR to terminal O.

At the transmitting station, relay R remains picked up and the timing relays 2L, LP, and LB release. Relay LB releases relay M which reverses the connections for relay R. Relay R operates to its reverse position, since the line is still reversed, reenergizing the timing relays which then release in the order 1L, LP, LB, and LBP, the apparatus assuming the same condition as at the other stations where relay R and the timing relays stand released, with relay 2L picked up.

At the office, since relay OR is reversed upon the release of relay OLBP, the pickup circuit for relay PC is closed when its stick circuit opens and this relay remains picked up. The office timing relays are reenergized and then release in the order O1L, OLP, OLB, and OLBP, relay O2L remaining picked up. Relay OR is restored to normal upon the closing again of back contact $f$ of relay OLBP over a circuit previously traced which includes front contacts of relays PC, PCP, and O2L, and back contacts of relays OLBP and O1L. When relay OR is restored to normal, the office timing relays are reenergized and relay PC deenergized, relay PC releasing before relay OLBP picks up. The office timing relays then release in the normal order. Relay PC restores the line polarity to normal to pick up the station line relays, the station timing relays then being reenergized and releasing in the normal order, as in the preceding examples.

It will be seen that in each case, regardless of their initial positions, the line relays OR and R are all restored to normal at substantially the same time so that each releases its timing relays in the normal order to place all fore relay O1L or any of the relays 1L release to permit the initiation of the next code. Generally the office has a preferred chance to send the next code because relay O1L releases slightly before the relays 1L release.

It has already been explained that, if due to a fault, an indication code is interrupted after the station starting relay ST is reenergized, relay ST will be released again due to release of relay LB before relay S releases. It will be clear, therefore, that each interrupted indication code will be reinitiated for transmission in its entirety after the line becomes again available. This is true of a control code only in the event the interruption occurs before the office starting relay ST is released, as occurs on the eighth step of the station code call. Otherwise a second operation of the starting button STB is required.

It may also happen that relay OR is operated by one or more impulses of foreign current, or as the consequence of a temporary line cross or open when the system is in its normal at-rest condition. In this case the first reversal of relay OR picks up relay PC, reversing the line polarity and releasing the line relays R to prevent the initiation of a code by any station. When the interference treminates, the system restores itself to normal in the same manner as in the case of an interrupted indication code, as described above.

I shall next describe the means for preventing interference and for transmitting codes one at a time in the desired order, when two or more transmitters have codes stored for transmission. The inclusion of the back contacts *b* of relays 1L and 2L in the pickup circuit for each relay M, and the similar circuit for relay OM, prevents the initiation of a code except when the line is free, as has already been made clear, but it may readily happen that the office and one or more stations initiate codes at substantially the same time. If relay OM picks up, the control code will prevail, since the back contact *b* of relay OM will open the circuit for relay PC and the long line open step generated by relay O1T will hold the line relays R released to pick up the station receiver relay SR at each station as in the control code already described. At any station at which relay M has been picked up to initiate an indication code, this relay is released by the opening of back contact *f* of relay SR. Consequently all station coding units are conditioned to receive the control code on the first step, the indication codes being stored for transmission subsequently.

In the event the coding units at two or more field locations initiate indication codes at the same time and by their joint action place the office coding unit in the receiving condition, the shunts applied to the line by that relay 1T which is nearer the office will govern the operation of the line relays R at more remote locations as well as that at the same location. The relays 1T will operate in unison as long as corresponding steps of the respective code calls are of like character. When one relay 1T holds a shunt applied to the line to generate a long odd-numbered step, it will overrule any relay 1T which releases at a more remote location for which the code call requires a short step. When relay 1T at the nearer station picks up to apply a shunt to the line, terminating a short even-numbered step, it will overrule any relay 1T which is held released by relay 2T at a more remote station as required for a long even step. In either case, the relays R and 1T at the more remote locations will occupy their released positions simultaneously on one of the steps of the station code call, that is, prior to the selection of the local S relay. This interrupts the temporary stick circuit for relay M extending from terminal B at normal contact *a* of relay R over back contact *d* of relay 1T, wire 179, back contact *g* of relay S, wire 178, front contact *e* of relay LB, back contact *f* of relay SR, front contact *a* and the winding of relay M to terminal N. Relay M will therefore release and reverse the line connections of relay R. Since the line is now supplied with current of reverse polarity, the release of relay M renders the associated relay R at the inferior station nonresponsive to the remainder of the code, causing the timing relays L and the energized counting chain relay at that station to release, its code being stored for subsequent transmission when the line is again free.

It will be seen, therefore, in respect to line action, a long odd-numbered step takes precedence over a short one and a short even-numbered step takes precedence over a long one. For this reason it is desirable to assign the code calls to the several locations in a geographical order so that each call is superior to those for more remote locations and inferior to those for stations nearer the office. In respect to line action, the order of superiority of the code calls is as shown by the following table, in which each code call is superior to those below it in the same column and to all those in other columns to the right.

| | | | | | | |
|---|---|---|---|---|---|---|
| 357 | 368 | 578 | 458 | 235 | 257 | 268 |
| 358 | 345 | 567 | 456 | 237 | 258 | 245 |
| 356 | 347 | 568 | 478 | 238 | 256 | 247 |
| 378 | 348 | 678 | 467 | 236 | 278 | 248 |
| 367 | 346 | 457 | 468 | 234 | 267 | 246 |

It will be noted that a different order prevails when the codes are transmitted from the same location, which case a long step takes precedence over a short step. For example, if all the office starting buttons are operated at the same time, the code call 234 will be the first, and 678 the last to be transmitted.

In order to provide a further safeguard against the transmission of indication codes from two stations at the same time, in the event of a fault, an additional circuit including the lockout and synchronizing relay XS is provided at the office. Relay XS serves to interrupt the transmission in the event a code call is received which contains more than three digits. For example, it may be assumed that one station may be allowed to transmit the code call 235 and another the code call 245 at the same time. If this occurs, the selector relay 234S will be operated on the fourth step to select a panel which belongs to neither station, and relay KSP will be operated on the next step, the fifth in this instance, as hereinbefore described. When relay KSP picks up, its contacts *b* and *d* shift the connections of wires 63 and 64 from the *d* contacts of the counting relays to wire 57. If the fifth step then is long, a circuit is completed, when relay O1L releases, from terminal B at front contact *a* of relay OLBP over front contact *f* of relay PCP, back contact *d* of relay O1L, wire 63, back contact *b* of relay OCR, front contact *b* of relay KSP, wire 57, through the winding of relay XS to terminal N. Relay XS picks up and completes a stick circuit over its front contact *a* to terminal B at front contact *k* of relay OLBP. Relay XS will also pick up on the seventh step over the circuit described, if this is the fourth digit of the received code call. Relay XS may like-wise be picked up on the sixth step, over the circuit from the terminal B at front contact *a* of relay OLBP and completed over back contact *d* of relay O2L, wire 64, back contact *d* of relay OCR, and front contact *d* of relay KSP to wire 57. On the eighth step, relay OCR picks up, opening the circuits traced above to prevent the operation of relay XS during the second cycle of operation of the OLC counting relays. However, in case this eighth step is the fourth long step of a received code call, relay OCR prepares a circuit, for energizing relay XS, which extends from wire 64 over front contact *d* of relay OCR, front contact *e* of relay O8, and front contact *d* of relay KSP to wire 57 and thence through the winding of relay XS to terminal N.

It follows that if a code call is received at the office containing more than three long steps, relay XS is picked up on the fourth of these long steps received. When relay XS picks up, it completes a circuit to energize the relay O1T which also picks up. This circuit may be traced from terminal B at front contact *b* of relay XS over back contact *d* of relay OM, back contact *b* of relay O2T, through the winding of relay O1T to terminal N. Relay O1T opens the line circuit at its back contacts *b* and *d* to release the line relays R at the transmitting stations, if these are picked up, and to interrupt the indication code. Then, depending upon whether the fourth long step is received on an even or an odd step of the code, the action is similar to the reset and synchronization action previously described when an indication code is interrupted by some type of fault.

It will be clear from the foregoing that no interference occurs when a plurality of starting relays ST at the office and stations are operated at the same time, or when the line is in use, and that the codes will be transmitted one at a time in order in accordance with the relative superiority of their respective code calls.

The system of my invention also includes provisions for preventing those stations having superior code calls from monopolizing the use of the line under conditions of heavy traffice, or in the event the station starting relay ST fails to pick up at the end of a code. This is accomplished by the provision of a station sequence relay SS in each station coding unit. Relay SS serves to prevent the initiation of a second code by any station coding unit which has transmitted a code as long as any other station coding unit has a code stored for transmission.

Referring to Fig. 2, it will be seen that relay SS is picked up during an indication code on a step representing the third digit of the station code call. The energy is supplied from terminal B at front contact *f* of relay 1L or front contact *f* of relay 2L over wire 165, back contact *e* of relay SR, wire 169, front contact *b* of relay S, through the winding of relay SS to terminal N. It is to be noted that during the coding action, either relav 1L or 2L is always in its picked up position so that energy is continuously supplied to this circuit. When relay S releases during the final step of a code, relay SS is then held energized over a stick circuit, including back contact *b* of relay S, its own front contact *a*, and wire 165, extending to terminal B at the same front contacts *f* of relays 1L and 2L. This stick circuit is opened by relay 1L when the system assumes its normal at-rest condition at the end of a code. Relay SS is slow to release and its back contact *b* holds open the starting circuit for an additional interval during which another station may initiate a code, and thereby hold relay SS picked up since relay 2L remains up during coding action at another station. It follows that when relay SS has been picked up, the station coding unit is rendered incapable of initiating a second code until after the line has been free for a time which is longer than the normal interval between successive codes. Each station coding unit having a code stored, at which relay SS has not be actuated, is given access to the line upon the release of relay 1L at the end of a code. Consequently, each such coding unit will transmit one code during which its relay SS becomes energized. At the end of this series of codes, a longer period will elapse to allow the relays SS to release, whereupon the station units will be again conditioned to transmit codes one at a time in sequence.

In the event a control code is interposed in a sequence of indication codes as above described, for the purpose of operating a particular device, and the relay SS of the station coding unit governing that device has been picked up, this relay SS will be released by the operation of the station receiver relay SR and the station selector relay S in response to the control code. That is, at the station selected by the control code, when relay S picks up and interrupts the stick circuit for relay SS at its back contact *b*, the normal pickup circuit for relay SS which would be completed over front contact *b* of relay S is now open at the back contact *e* of relay SR so that the relay SS is deenergized and eventually releases prior to the end of the control code. The coding unit at this station will be thereby conditioned to indicate the condition of the operated device more promptly.

It will also be evident that each relay SS serves also to prevent continued initiation of incomplete codes by a station storage unit due to a fault, if other units have codes stored for transmission. This is true provided the fault is not of such a nature as to prevent relay SS from becoming energized, as would be the case, for example, if the code transmitted by a station coding unit having a superior code call does not progress far enough to pick up the station relay S at that station.

To protect against this and other recurrent start conditions, a thermal cutout relay COR is provided, arranged as shown in Fig. 2*a*. Relay COR is energized whenever an indication code is initiated by the coding unit, from the time the starting relay ST releases to initiate the code until the code is fully transmitted. Until the relay SS is energized by relay S on the station selecting step of the code, relay COR is energized over the circuit extending from terminal B at reverse contact *b* of relay ST over back contact *b* of relay SS, wire 147, front contact *b* of relay RP, and back contact *a* and the heating element of relay COR to terminal N. When relay M picks up, it provides a connection from terminal B over its front contact *g* for energizing relay COR until the end of the code.

The time relay COR is energized may exceed the time required to transmit a code from the associated coding unit, even if no fault exists, by the time required to transmit one code from each coding unit having a more superior code call. On the other hand, in the event of a fault which prevents the reenergization of relay ST, relay COR is energized substantially continuously. Relay COR is made selectively responsive to a fault by adjusting it to open its contact *a* after it has been energized for a time interval of about two minutes, the opening of its contact *a* deenergizing its heating element and also interrupting the pickup circuit for relay M. Contact *a* of relay COR is of the snap action type and remains open for about two minutes, and after reclosing, if terminal B remains connected to wire 147, will operate cyclically with closed periods of one minute and open periods of two minutes, approximately. It follows that relay COR operates in such a manner as to prevent the defective transmitter from obtaining access to the line for periods of about two minutes during each three minute interval, as long as the fault persists.

The system of my invention also includes a fault relay RPP by means of which any station coding unit may be readily isolated from the line. This is of utility, for example, in the event of a short circuit in the line connections, in case of faulty operation due to abnormally low local battery voltage, or to terminate the cyclic operation of relay COR. This feature is disclosed and claimed in Letters Patent of the United States No. 2,376,569, issued May 22, 1945, to George W. Baughman, for Remote Control Systems. Relay RPP is a slow release relay which is maintained normally energized by a stick repeater relay RP of the line relay R. Relay RP is operated in accordance with the code operation of relay R, as long as relay RPP remains picked up. In the usual operation of the system, relay R may remain steadily released for a maximum time of about six seconds, this being the time required to transmit a thirty-two step indication code from another station. Relay RPP is made sufficiently slow release to bridge this time interval by connecting the capacitor-resistor snub across its terminals. The energy stored in condenser C2 should provide a release period of from ten to fifteen seconds, so that relay RPP will not release unless relays R and RP remain released for an abnormal length of time, as would be the case if a short circuit developed between the front and back contacts *d* of relay M, for example.

Relay RPP at each station may be released manually from the office by pressing the disconnect button DB, of Fig. 1*a*, for a suitable length of time, say fifteen seconds. This energizes relay O1T over back contact *d* of relay OM and back contact *b* of relay O2T, and relay O1T picks up. This opens the line circuit at back contacts *b* and *d* of relay O1T, thereby releasing relays R, RP, and RPP, in turn. When relay RPP releases, its back contact *b* short circuits the resistor R3, in series with relay R. At the same time, however, front contact *a* of relay RPP opens to insert a similar resistor R5 into the circuit for relay R at a point adjacent the line wires Y and Z. It follows that if the system is incapacitated due to a short circuit within the coding unit the line fault is removed by the insertion of a relatively high resistance in series therewith, the resistors R3 and R5, in practice, usually having a value on the order of 10,000 ohms each. The transmitting portion of the coding unit is thus effectively isolated from the system. At the same time the starting circuit including wire 147 is opened at front contact *b* of relay RP to prevent the further energization of relays COR and M. At each station at which no fault exists, relay R will pick up in response to the release of the disconnect button DB, since as far as relay R is concerned, the effect of the release of relay RPP is to merely replace the resistance R3 by an equivalent resistance R5 in its circuit. Relays RP and RPP, however, will remain released after relay R becomes energized, the holding circuit for relay RP being open at front contact *c* of relay RPP, and that for relay RPP at front contact *a* or relay RP.

The operator at the control office may now restore the system to operation, leaving one or more station coding units isolated, by transmitting control codes in turn to each of the coding units which he desires to include in the system as restored. On the step of a control code when the station selector relay S is energized, as hereinbefore described, a connection from front contact *e* of relay G2R over wire 176 through the lower winding of relay RP provides a circuit for energizing relay RP, which picks up. Closing of front contact *a* of relay RP in turn energizes relay RPP to complete the holding circuit for relay RP, thereby restoring the coding unit to normal operation. It will be evident that a control code will not be received by a station at which relay R is short circuited, for example, and that consequently such station will remain isolated.

In order to facilitate the restoration of the system as above described, a "recall" push button RCB, Fig. 1*b*, is provided at the office by means of which the operator may send a special recall code to any station without operating any of the station devices. This recall code is terminated after the transmission of the station selection portion of the code, that is to say, on step nine. The recall code is also effective to initiate the transmission of an indication code from the selected station, and thus provides means by which the operator may obtain new indications without causing any change in the condition of the station devices.

To initiate a recall code, the operator presses the recall button RCB and also the starting button STB of the control panel for the station to which the code is to be sent, thereby picking up the corresponding starting relay, such as relay 234ST. This in turn picks up relay OM as already described, whereupon a circuit is completed from terminal B at front contact *f* of relay OM over wire 83, the now closed contact *a* of push button RCB, through the winding of the recall stick relay RCL to terminal N. Relay RCL picks up, completing a stick circuit extending over its front contact *a* and wire 72 to terminal B at front contact *e* of relay OLBP. Push button RCB may then be released and the transmission will continue through eight steps during which the office selector relay 234S and the corresponding relay S at the selected station will become energized as in the control code already described. When the ninth step is reached relay O1 does not pick up, its second pick up circuit being open at back contact *b* of relay RCL. Consequently relay O1T is held energized over wire 68 until relay OLBP at the office and relay LBP at the selected station release.

At the selected station, when relay LB releases, the stick circuit for relay ST over wire 183 is transferred from terminal B at front contact *c* of relay LB to terminal 241 over back contact *c* of relay LB, wire 182, front contact *e* of relay S, wire 236, and front contact *c* of relay SR. Since relay R is reversed on the ninth step, this stick circuit is opened by the release of relay LB whether or not terminal 241 is connected to normal contact *a* of relay R as previously discussed. Since both relays SR and S are picked up, the relay SS is already released, if previously energized, and the release of relay ST therefore places the station coding unit in condition to initiate an indication code as soon as the line is again free. It will be seen that, on the ninth step of the recall code, relay RCL is released by relay OLBP, and that the system is then in the same condition as when a control code is interrupted on an odd-numbered step, due to a fault. It follows that the system will be restored to its normal condition by the same sequence of operations as hereinbefore described for this condition.

In the preceding description of the transmission of a control code by the system of this invention, it has been pointed out that all the signals, switches, and other devices at an interlocking such as shown in Fig. 2*d* may be remotely controlled from an office location by the transmission of only one code requiring only one selective station code call. Likewise, it was shown that indications of the position of the signals and switches, the occupancy or nonoccupancy of track sections, and the condition of other devices may all be transmitted from the field location to the office during one indication code, using only the one selective code call to assure that the indications will be displayed on the proper group of office machine panels. These codes may be of any length desired or required to transmit the necessary functions. Also, the control and indication codes for any one station may consist of a different number of code steps.

In the systems most generally in present use for providing such remote control, the length of the codes is fixed, both the control and indication codes usually being 16 steps long. Thus, to handle the arrangement of Fig. 2*d*, two codes would be necessary in each direction, each code 16 steps in length. Two selective code calls would be required to select between the various groups of devices handled by each code. This at once reduces the total number of field locations that can be accommodated by one office coding unit. Because certain of the available code calls cannot be combined at one station without considerable additional equipment, the geographical position of a remote location such as here illustrated may be such as to prohibit the economical use of the code calls normally next in order of sequence in the system. This results in a further reduction in the number of stations assignable to the one office coding unit.

In the earlier systems, with each code consisting of the same number of steps, synchronizing the office and station reset action at the end of a code was relatively easy and was primarily accomplished by maintaining the release timing of the various relays relatively equal in all code units. With different code lengths for different stations, the problem of halting the office coding action on the proper step is more difficult. As has been shown, this is accomplished by the novel use of adjustable connections to provide a variable selection of the code step on which coding action is halted and by the provision of a relay at the office location which differentiates between two adjustable connections for any one station. Then, by including contacts of the office station selector relay for a particular station in each adjustable circuit connection for that station, the coding action of both the office and field units, particularly during indication codes, may be halted on the same code step so that synchronization of the reset action at both locations is possible.

The system of the present application, even though providing additional code steps in the indication code when required, does not require an additional group or groups of intermediate registry relays at the office to register the "positive" indications received prior to their delivery to the indication relays. By means of a novel circuit arrangement including one relay, the single group of intermediate registry relays is reset at the end of each group of eight code steps which carry indication functions, and is reused during the succeeding group of similar code steps.

The system of my invention, therefore, has several distinct advantages over those of similar types in present use. First, both the control and indication codes may be of any desired length necessary to transmit all the control or indication functions for one field location in one code. This of course allows more locations to be controlled by one office coding unit since only one station code call is required per location. Even while providing these advantages, less additional equipment is required at a field location in my system than for an equivalent field location in prior systems. Synchronization between office and stations is maintained, although code lengths may be different, by the use of adjustable connections and a synchronizing relay. With these advantages, the items of equipment used are still maintained identical for all field locations.

Although I have herein shown and described but one form of my invention, it will be understood that various changes and modifications may be made therein within the scope of the appended claims without departing from the spirit and scope of my invention.

Having thus described my invention, what I claim is:

1. In a remote control system, including an office and a plurality of stations connected by a line circuit, said office and each said station equipped with similar code transmitter-receivers for the transmitting and receiving of selective codes between said office and any particular one of said stations, each said code comprising, as a first part, a plurality of code steps arranged to form a distinctive code call to select a particular one of said stations and, as a second part, a plurality of code steps to control certain devices at said particular station or to indicate at said office the condition of said certain devices, said second part capable of having a different number of code steps at each of said stations and a different number of code steps in said control code and said indication code at said particular station; each said transmitter-receiver including a master relay which occupies a first position when said unit is transmitting and a second position when said unit is receiving, a relay counting chain to produce said pluralities of code steps, and a code stopping relay which when energized halts the coding action of said relay counting chain; said office also including a selector relay for each of said stations, said selector relay for said particular station being operated during said first part of said codes between said office and said particular station; means to synchronize the halting of coding action of said office transmitter-receiver simultaneously at the end of a code with the halting of the similar coding action of said transmitter-receiver at said particular station, regardless of the length of said second part of said code; said means comprising a circuit, in multiple with the operating circuit for a particular relay of said counting chain which corresponds to the desired final code step, including an operated position contact of another relay of said counting chain one in advance of said particular relay, an operated position contact of said selector relay for said particular station, a first or second position contact of said master relay of said office transmitter-receiver according as said code is a control or an indication code, and the winding of said code stopping relay of said office transmitter-receiver; whereby said office code stopping relay is energized during the final code step of any code for said particular station and office coding action halts simultaneously with station coding action.

2. In a remote control system, including an office and a plurality of stations connected by a line circuit, said office equipped with a code transmitter-receiver for sending control codes to and receiving indication codes from said stations, said control codes for governing the position of certain devices at said stations, said indication codes to govern a display in said office showing the position of said devices, each said code comprising, as a first part, a plurality of code steps arranged to form a distinctive code call to select the desired station or office display panel, and as a second part, a plurality of code steps for control of or indication from said devices, the number of code steps in said second part varying according to the requirements for each said station; said code transmitter-receiver having a selector relay for each of said stations, a relay counting chain, a code stopping relay, and a master relay, said relay counting chain operating to record said code steps until said operation is terminated in response to the operation of said code stopping relay; in combination with said code transmitter-receiver, means to terminate said codes for any one station on any desired even-numbered code step, determined by the number of code steps required to or from said any one station; said means comprising a master relay repeater, operable to a first position during said control codes and biased to a second position at all other times, and circuits, adjustable as desired, to operate said code stopping relay to said operated position to terminate coding action, said circuits including an operated position contact of a relay in said counting chain next in advance to said desired code step, an operated position contact of said selector relay for said any one station, and a first or a second position contact of said master relay repeater, according as code to be terminated is a control or an indication code, respectively, whereby operation of said code transmitter-receiver terminates simultaneously with that of said any one station.

3. In a remote control system including an office and a plurality of stations connected by a line circuit, in combination with a code receiver at said office adapted to receive selective codes from said stations to indicate the condition of certain devices at said stations, each said code comprising a first part, a plurality of code steps arranged to form a distinctive code call for a particular station, and a second part, a plurality of code steps arranged to form said indications for said particular station designated in said first part, said second part capable of having a different number of code steps for each said station; said code receiver including a relay counting chain which operates through a sufficient number of code steps to receive said code from any one of said stations regardless of the length of said code, said office also having a number of selector relays, one relay representing each said station, each relay energized to occupy an operated position only when said first part of a particular one of said codes includes said distinctive code call for said station which said selective relay represents; means for synchronizing the termination of coding action of said code receiver with the termination of coding action at any one of said stations to thus enable said remote system to be reset properly, said means comprising a code stopping relay, energized during a final step of any of said codes received by said receiver to thereby halt coding action, and several circuits, one corresponding to each said station, each circuit to energize said code stopping relay in multiple with a particular one of said counting chain relays which correspond to said final code step from said station which said circuit represents; each said circuit including, in said multiple portion, an operated position contact of the counting chain relay next preceding said particular counting chain relay and an operated position contact of said selector relay energized during said first part of said code from said station which said circuit represents.

4. In a remote control system including an office and a plurality of stations connected by a line circuit, said office being equipped with a code transmitter-receiver adapted to transmit selective codes to said stations to control certain devices at said stations and to receive similar codes from said stations to indicate at said office the condition of said devices, each said code comprising, as a first part, a plurality of code steps arranged to form a distinctive code call for each said station, only one such code call being included in each said code, and, as a second part, a plurality of code steps arranged to control or indicate said devices, said second part from the various stations varying in length according to the requirements of the station, and also at any one of said stations capable of having a different number of code steps for said control and said indication codes; said transmitter-receiver including a relay counting chain arranged to operate through sufficient code steps to provide the proper number of steps for said code to or from any station, said office also including one station selector relay assigned for each said station, a particular selector relay being energized to close operated position contacts during said first part of a particular code only when said distinctive code call for a particular station to which said particular selector relay is assigned is included in said particular code; means to enable said office to terminate the coding action of said transmitter-receiver during said particular code on a final code step required or transmitted by said particular station regardless of the length of said second part of said particular code; said means comprising a code stopping relay, which, when energized, halts the coding action of said transmitter-receiver, a master repeater relay, which occupies a first position only during any control code and a second position at all other times, and circuit means to energize said code stopping relay in multiple with a counting chain relay which corresponds to said final step of said particular code, a particular circuit including, in the portion in multiple with said counting chain relay, an operated position contact of another counting chain relay next preceding said counting chain relay in order of operation, a first position or a second position contact of said master repeater relay, according as said particular code is a control or an indication code, respectively, an operated position contact of said particular selector relay energized during said first part of said particular code, and the winding of said code stopping relay; whereby said code stopping relay is energized during said final step of said particular code to halt coding action of said transmitter-receiver and permit said remote control system to properly reset.

5. In a remote control system including an office and a plurality of stations connected by a line circuit, said office being equipped with a code transmitter-receiver adapted to transmit selective codes over said line circuit to control various devices at said stations and to receive similar selective codes over said line circuit from said stations to indicate the condition of said devices at said stations, each said code comprising a first part, a plurality of code steps arranged to form a distinctive code call to select a particular station, and a second part, another plurality of code steps to control or indicate said devices at said particular station, said control code for said particular station capable of having a different number of code steps than said indication code, and both said codes for said particular station capable of having a different number of code steps from similar codes for any other station; means to enable said code transmitter-receiver at said office to terminate its coding action during any code on the proper code step corresponding to the last code step required by said particular station selected by said first part of said code, said means comprising a code stopping relay, a master repeater relay, which occupies a first position during said control codes and a second position during said indication codes, a station selection relay for each said station, a particular station selection relay being operated to a first position during said first part of said codes only when its distinctive code call is included in said first part, and a circuit to energize said code stopping relay and thus terminate the coding action, said circuit including a first position contact of said particular station selection relay and a first or second position contact of said master repeater relay, according as said code to be terminated is a control or an indication code, respectively.

6. In a remote control system, including an office and a plurality of stations connected by a line circuit, in combination with a code transmitter-receiver at said office said transmitter-receiver including a chain of counting relays, timing relays, a master relay and having associated therewith selector relays, one for each of said stations, said code transmitter-receiver adapted to receive over said line circuit a code comprising, as a first part, a plurality of code steps arranged to form a distinctive code call, thus causing a particular one of said selector relays to be energized, according to a particular station originating said code; said code further comprising, as a second part, a plurality of code steps to indicate the position or condition of certain devices at said particular station, the number of code steps in said second part of said code varying according to said particular station originating said code; means to assure that code following operation of said code transmitter-receiver terminates simultaneously with the final step of said received code; said means comprising, first, a repeater relay of said master relay, energized or deenergized, respectively, as said code transmitter-receiver is transmitting or receiving code, and second, a circuit to supply energy to a final code stopping relay of said counting chain in multiple with a specified relay corresponding to said code step on which said code ends, said circuit being closed over energized position contacts of one of said timing relays, a counting chain relay one in advance of said specified relay, and said selector relay for said particular station, and a deenergized position contact of said master relay repeater relay, whereby said coding operation of said code transmitter-receiver is terminated simultaneously with said final step of said received code.

7. In a remote control system, including an office and a plurality of stations connected by a line circuit, said office equipped with a code transmitter-receiver for at times receiving over said line circuit a code from any one of said stations, said codes from the various stations being of different lengths, each code comprising as a first part, a plurality of code steps arranged to form a distinctive code call to identify a particular station, and, as a second part, a plurality of code steps to indicate the position or condition of a plurality of devices located at said particular station, a long code step denoting a positive indication for a device, said second part being divided into groups of code steps, each group being of the same length as said first part; said code transmitter-receiver having a relay counting chain operating to receive said code, said relay counting chain adapted to receive all of said groups of code steps in said second part of said code; said code transmitter-receiver also having a group of intermediate registry relays to temporarily store the positive indications received during each of said group of code steps for delivery during a final step of each said group of code steps, a positive indication causing a corresponding intermediate registry relay to occupy an operated position; means to reset said intermediate registry relays to a nonoperated position at the end of each said group of code steps during said second part of said code whereby said intermediate registry relays may be used again during a subsequent group of code steps to again temporarily store positive indications received; said means comprising, first, a registry reset relay normally occupying a first position and operated to a second position during the first code step of the second and each subsequent group of code steps during said second part of said code, said registry reset relay being returned to its first position during the first long step in the corresponding group of code steps; said means further comprising a stick circuit for each of said intermediate registry relays, each said stick circuit being closed when said corresponding intermediate registry relay operates in response to receipt of a positive indication if said registry reset relay is occupying said first position, and all said stick circuits being opened in response to the operation of said indication reset relay to its second position; thus resetting said intermediate registry relays to their nonoperated position at the end of each group of code steps during said second part of said code.

8. In combination with a code receiver, adapted to be connected to a line circuit to receive from a remote station a code to indicate the position or condition of various devices; said code comprising, as a first part, a plurality of code steps arranged to form a distinctive code call identifying said station and, as a second part, a plurality of code steps carrying said indications, one indication being assigned to each code step, a positive indication being determined by a long code step, the code steps in said second part being greater in number than the number in said first part and being divided into groups of code steps each group equal in length to said first part of said code; said code receiver having a relay counting chain adapted to receive all of said code and a group of intermediate registry relays to temporarily store said positive indications during each said group of code steps, each said intermediate register relay being operated to a storing position in response to a positive indication being rendered by a corresponding relay of said primary counting chain; a registry reset relay, normally occupying a first position to which it is biased and operable to a second position in response to the operation of each relay of said counting chain which operates during the last step of any of said groups of code steps, and a stick circuit to hold each said intermediate registry relay in said storing position, each said stick circuit being closed when said registry rest relay occupies its first position and being opened in response to said registry reset relay occupying its second position, thus resetting all said intermediate registry relays to their nonstoring position at the end of each group of code steps during said second part of said code.

9. In combination with a code transmitter-receiver adapted for use at an office location in a remote control system comprising said office and a plurality of stations connected by a line circuit, said code transmitter-receiver including one or more relay counting chains arranged to receive codes of varying length from each of said stations, said codes being divided into equal length groups of code steps, and a group of intermediate registry relays to temporarily store indications received during said second and subsequent groups of code steps from said stations prior to final delivery to a selected group of indicating relays in said office; means to enable said group of intermediate registry relays to be reused during each said subsequent group of code steps, said means comprising a registry reset relay and a stick circuit for each said intermediate registry relay, said registry reset relay occupying a first position when deenergized and a second position when energized, said registry reset relay being energized at the beginning of each said subsequent group of code steps during which said indications are received from said station; each said stick circuit for said intermediate registry relays including a first position contact of said registry reset relay, whereby said stick circuits are interrupted and said intermediate registry relays released after the end of said second and each subsequent group of code steps.

10. In combination with a code receiver at an office location in a remote control system comprising said office and a plurality of stations connected by a line circuit, said code receiver at times receiving over said line circuit a code from any one of said stations, each said code comprising a first part, a first group of an even number of code steps, arranged to form a distinctive code call to identify a particular station, and a second part, a second and subsequent groups of code steps, each group of the same length as said first group, to indicate the position or condition of devices located at said particular station, a long code step being a positive indication for a device assigned to that code step; said code receiver comprising a line relay which occupies a reverse position during odd-numbered steps of said code and a normal position during even-numbered steps, a timing relay chain including a first and a second timing relay each normally occupying an energized position during said code and releasing during said odd and even-numbered long code steps, respectively, a relay counting chain operating to receive said code and adapted to receive all of said groups of code steps during a particular code, and a group of intermediate registry relays to temporarily store the positive indications received during said second and subsequent groups of code steps, a positive indication causing a corresponding intermediate registry relay to occupy an operated position; a registry reset relay which normally occupies a first position and which occupies a second position when energized, a pickup circuit for said registry reset relay including a reverse position contact of said line relay and operated position contacts, in multiple, of each of said counting chain relays which are operated on the last code step of each of said second and subsequent groups of code steps, thereby energizing said registry reset relay at the beginning of each said subsequent group of code steps; a stick circuit for said registry reset relay including energized position contacts, in series, of said first and second timing relays, to hold said registry reset relay in its second position until a positive indication is received; a stick circuit for each said intermediate registry relay including a first position contact of said registry reset relay, whereby each said intermediate registry relay occupying its operated position is released after the end of said second and each subsequent group of code steps so that said group of intermediate registry relays may be reused during each following group of said subsequent groups of code steps to again temporarily store said positive indications received.

11. In combination with a code transmitter-receiver at an office location in a remote control system comprising said office and a plurality of stations connected by a line circuit, each said station having a similar code transmitter-receiver for receiving or transmitting selective codes which said office transmitter-receiver is capable of transmitting or receiving, respectively, each said code comprising a first part, a plurality of code steps arranged to form a distinctive code call to select a particular one of said stations, and a second part, a plurality of code steps to control certain devices at said particular station or to indicate at said office the condition of said devices, said second part capable of having a different number of code steps at each of said stations and a different number of code steps between said control and indication codes at said particular station according to the identity of the station receiving or originating the code; said office code transmitter-receiver including a master relay which occupies a first position during each control code and a second position during each indication code, a relay counting chain, including a code stopping relay, to produce said pluralities of code steps in transmitting or receiving said codes, said code stopping relay when energized halting the coding action of said counting chain, and a timing relay chain, and having associated therewith a group of selector relays providing one selector relay for each of said stations, said selector relay for said particular station being energized and occupying its operated position during said first part of said control and said indication codes to and from said particular station; a repeater relay of said master relay, occupying a first and a second position, respectively, during said control and indication codes, and circuits to energize said code stopping relay during a final code step for codes to and from said particular station, each said circuit including a contact closed during coding action by one of said timing chain relays, an operated position contact of a primary counting chain relay operated during the code step next preceding said final code step, an operated position contact of said selector relay for said particular station, a first or second position contact of said repeater relay, according as the code is a control or indication code, respectively, and the winding of said code stopping relay, whereby coding action of said office transmitter-receiver is halted during the required final code step of either code for said particular station and the reset action at said office and said particular station is synchronized.

12. In combination with a code receiver at a station in a remote control system comprising an office and a plurality of said stations connected by a line circuit, said received adapted to receive codes from said office over said line circuit, each said code comprising a first plurality of code steps to select a particular station and a second plurality of code steps to control certain devices at said particular station, said receiver including a line relay operable alternately to a normal and to a reverse position for selected time intervals, a timing relay chain including a first and a second timing relay controlled by said line relay, said first timing relay releasing if said line relay remains in its reverse position and said second timing relay releasing if said line relay remains in its normal position for more than a predetermined time interval as during a long code step, a counting relay chain, and a station selector relay which is energized when said particular station is selected during said first plurality of code steps; a first and a second station selection and function registry relay, a first pickup circuit for each said station selection and function registry relay to energize said relays during said first plurality of code steps during a first and a second long code step, respectively, each said first pickup circuit including a contact closed by said timing chain during any coding action, a released position contact of one of said timing relays, and a front contact of said counting chain relay corresponding to the code step during which said relay is to be energized, a first stick circuit for each said selection and registry relay, each said first stick circuit including said contact closed by said timing chain and a deenergized position contact of said station selector relay, a second pickup circuit for said first selection and registry relay including a released position contact of said first timing relay, a second pickup circuit for said second selection and registry relay including a released position contact of said second timing relay, a second stick circuit for said first selection and registry relay including a normal contact of said line relay and an energized position contact of said station selector relay, and a second stick circuit for said second selection and registry relay including a reverse position contact of said line relay and an energized position contact of said station selector relay, whereby said station selection and function registry relays are used to effect the selection of said particular station during said first plurality of code steps and to record the character of alternate code steps during said second plurality of code steps.

13. In a remote control system comprising an office and a plurality of stations connected by a line circuit, said office adapted to transmit over said line circuit a code of relatively short or long elements comprising a first plurality of code steps to select a particular one of said stations and a second plurality of code steps to control certain devices at said particular station, said particular station including a line relay alternately operable to a normal and a reverse position in response to successive steps of said code, a relay counting chain, a first and a second timing relay, energized during said code and releasing when said line relay operates to its reverse or normal position, respectively, during said long code steps, and a station selector relay energized during said first plurality of code steps when said particular station is selected; a first and a second station selection and function registry relay, a first and a second pickup circuit, and a first and a second stick circuit for each said selection and registry relay, each said first pickup circuit including a released position contact of one of said timing relays and a contact closed during operation of said relay counting chain, said second pickup circuits for said first and said second selection and registry relay including a released position contact of said first and said second timing relay, respectively, each said first stick circuit including a deenergized position contact of said station selector relay, and said second stick circuits for said first and said second selection and registry relay including an energized position contact of said station selector relay and a normal and a reverse position contact, respectively, of said line relay.

14. In combination, at a particular station in a remote control system comprising an office and a plurality of stations connected by a line circuit, said office adapted to transmit over said line circuit codes of relatively short or long elements which said stations are adapted to receive, each said code comprising a first part, a plurality of code steps including three long steps to select said particular station, and a second part, a plurality of code steps to control certain devices at said station; a line relay operable alternately to a normal and a reverse position in response to successive code elements, a relay counting chain having contacts closed one at a time in sequence to count the successive steps of said code, a timing chain including a first and a second timing relay, normally energized during coding action and reelasing when said line relay remains in its reverse or normal position, respectively, for more than a predetermined time as during said code steps; a station selector relay energized during said third long code step of said first part of said code if said particular station is selected, a first and a second station selection and function registry relay, a first pickup circuit for each said station selection and function registry relay to energize said relays during said first and said second long code steps, respectively, of said first part of said code, each said first pickup circuit including a contact closed during coding action by said timing chain, a released position contact of one of said timing relays, and a contact of said counting chain closed during the corresponding code step; a first stick circuit for each said selection and registry relay including said contact closed by said timing chain, a deenergized position contact of said station selector relay, and a front contact of said selection and registry relay; a second pickup circuit for each said selection and registry relay to energize said relays during alternate code steps of said second part of said code when said steps are long, each said second pickup circuit including said contact closed by said timing chain and a released position contact of said first or said second timing relay, respectively; a second stick circuit for each said selection and registry relay to hold said relays energized during the succeeding code step, each said second stick circuit including a front contact of said selection and registry relay, an energized position contact of said station selector relay, and a normal or a reverse position contact, respectively, of said line relay; whereby said station selection and function registry relays are effective during said first part of said code to record the selection of said particular station, and are effective during said second part of said code to record said long or short character of said code steps to provide proper control of said devices at said particular station.

15. In combination with a code receiver at a particular station in a remote control system comprising an office and a plurality of such stations connected by a line circuit, said code receiver adapted to receive from said office codes of relatively long and short elements, each said code comprising a first part, a plurality of code steps including three long steps to select said particular station, and a second part, a plurality of code steps to control certain devices at said station; said code receiver including a line relay operable alternately between two positions in response to successive steps of said code, a timing chain including relays released during said long code steps, a counting chain, and a station selector relay energized during said third long code step of said first part of said code when said particular station is selected; two station selections and function registry relays, means to energize said selection and registry relays successively during said first and said second long steps, respectively, of said first part of said code, said selection and registry relays when energized in succession being effective to control the energization of said station selector relay on said third long step, said means including circuits effective during said first part and completed by said counting chain and by release of one of said timing relays and holding circuits completed over deenergized position contacts of said station selector relay; and other means to energize said selection and registry relays alternately on odd and even-numbered steps during said second part of said code when said steps are long and to hold said selection and registry relay energized during the succeeding code step, said other means including circuits effective during said second part of said code and closed by the release of one of said timing relays, and holding circuits controlled by said line relay and completed over energized position contacts of said station selector relay, whereby said station selection and function registry relays are effective during said first part of said code to determine station selection and during said second part of said code to register the character of said control functions received at said particular station.

References Cited in the file of this patent

UNITED STATES PATENTS

| Number | Name | Date |
|---|---|---|
| 2,169,479 | Powell | Aug. 15, 1939 |
| 2,259,561 | Hailes | Oct. 21, 1941 |
| 2,273,231 | Snavely | Feb. 17, 1942 |